(12) United States Patent
Rouquette

(10) Patent No.: US 7,176,589 B2
(45) Date of Patent: Feb. 13, 2007

(54) ELECTRICAL POWER DISTRIBUTION AND COMMUNICATION SYSTEM FOR AN UNDERWATER CABLE

(75) Inventor: Robert E. Rouquette, Kenner, LA (US)

(73) Assignee: Input/Output, Inc., Houston, TX (US)

( * ) Notice: Subject to any disclaimer, the term of this patent is extended or adjusted under 35 U.S.C. 154(b) by 692 days.

(21) Appl. No.: 10/021,275

(22) Filed: Dec. 19, 2001

(65) Prior Publication Data

US 2003/0117025 A1   Jun. 26, 2003

(51) Int. Cl.
    *H02J 3/00* (2006.01)
(52) U.S. Cl. ....................................... 307/17
(58) Field of Classification Search ............... 307/17
    See application file for complete search history.

(56) References Cited

U.S. PATENT DOCUMENTS

| | | |
|---|---|---|
| 2,923,916 A | 2/1960 | Woodworth |
| 3,371,311 A | 2/1968 | Cholet et al. |
| 3,434,446 A | 3/1969 | Cole |
| 3,605,674 A | 9/1971 | Weese |
| 3,660,809 A | 5/1972 | Pearson |
| 3,774,570 A | 11/1973 | Pearson |
| 3,930,254 A | 12/1975 | Pavey, Jr. |
| 3,931,608 A | 1/1976 | Cole |
| 3,961,303 A | 6/1976 | Paitson |
| 3,996,553 A | 12/1976 | Siems et al. |
| 4,033,278 A | 7/1977 | Waters |
| 4,092,629 A | 5/1978 | Siems et al. |
| 4,296,481 A | 10/1981 | Weiss |
| 4,463,701 A | 8/1984 | Pickett et al. |
| 4,477,887 A | 10/1984 | Berni |
| 4,694,436 A | 9/1987 | Gelfand |
| 4,709,355 A | 11/1987 | Woods et al. |
| 4,745,583 A | 5/1988 | Motal |
| 4,840,448 A * | 6/1989 | Thiennot ................ 385/20 |
| 4,967,400 A | 10/1990 | Woods |
| 5,206,835 A | 4/1993 | Beaducel |
| 5,301,096 A * | 4/1994 | Klontz et al. ............ 363/37 |
| 5,341,280 A | 8/1994 | Divan et al. |
| 5,388,040 A * | 2/1995 | Hall ........................ 363/16 |
| 5,443,027 A | 8/1995 | Owsley et al. |
| 5,489,897 A | 2/1996 | Inoue |
| 5,504,685 A | 4/1996 | Wapner |
| 5,532,975 A | 7/1996 | Elholm |
| 5,579,286 A | 11/1996 | Skorheim |

(Continued)

FOREIGN PATENT DOCUMENTS

EP    0 168 959 A1    1/1986

(Continued)

OTHER PUBLICATIONS

U.S. Appl. No. 09/551,832, filed Apr. 18, 2000, Olivier et al.

*Primary Examiner*—Robert L. Deberadinis
(74) *Attorney, Agent, or Firm*—Leydig, Voit & Mayer, Ltd.

(57) ABSTRACT

An underwater cable arrangement includes systems and method for distributing and/or transferring power and/or data to internal devices and external devices disposed along an underwater cable. Under water coupling systems and underwater electrical devices may be used in the distribution and/or transfer of the power and/or data.

62 Claims, 30 Drawing Sheets

U.S. PATENT DOCUMENTS

| | | |
|---|---|---|
| 5,619,474 A | 4/1997 | Kuche |
| 5,631,874 A | 5/1997 | Mastin et al. |
| H1650 H | 6/1997 | Olson |
| 5,841,205 A | 11/1998 | Webb |
| 6,011,752 A | 1/2000 | Ambs et al. |
| 6,011,753 A | 1/2000 | Chien |
| 6,016,286 A | 1/2000 | Olivier et al. |
| 6,091,670 A | 7/2000 | Oliver et al. |
| 6,144,342 A | 11/2000 | Bertheas et al. |
| 6,292,436 B1 | 9/2001 | Rau et al. |

FOREIGN PATENT DOCUMENTS

| | | |
|---|---|---|
| EP | 0 241 608 A1 | 10/1987 |
| GB | 2 301 328 A | 12/1996 |
| WO | WO 93/03402 | 2/1993 |
| WO | WO 98/28636 | 7/1998 |

\* cited by examiner

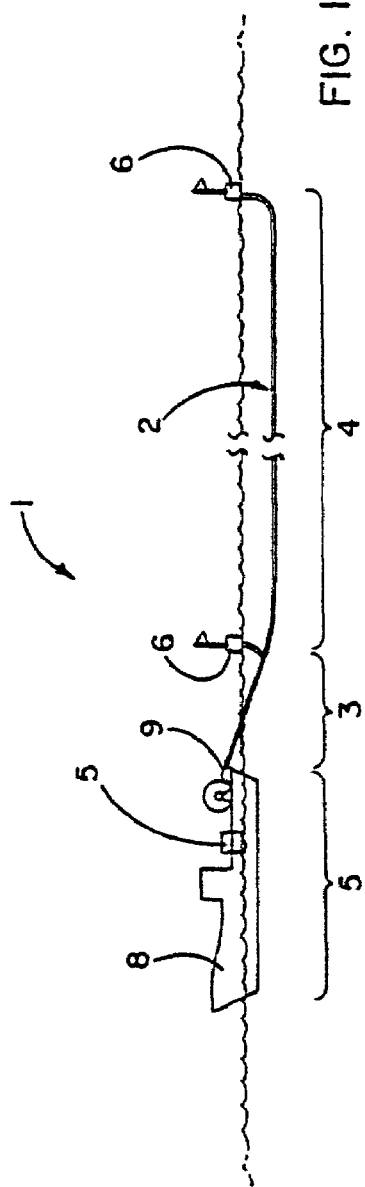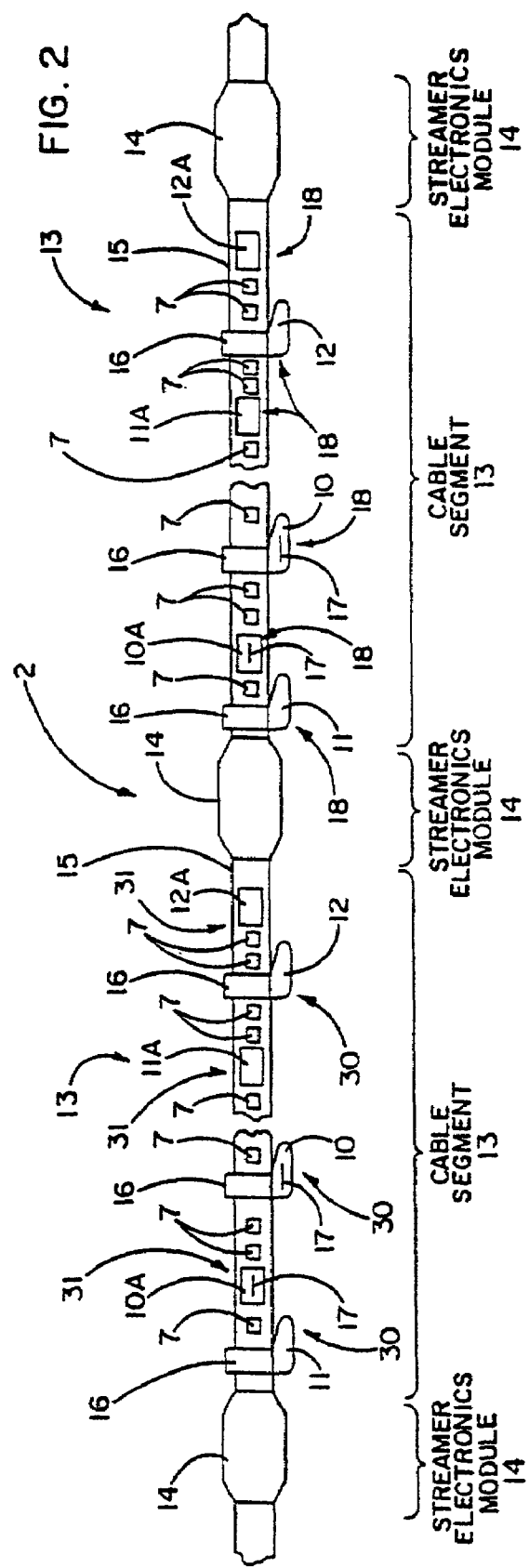

WHERE: FL ≃ 60 KHZ
FH ≃ 68 KHZ
FO ≃ 64 KHZ

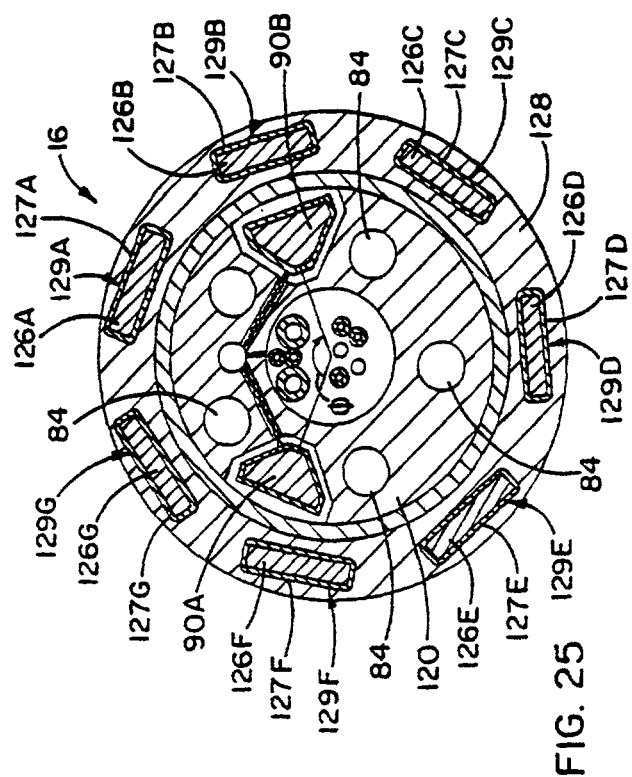
FIG. 25
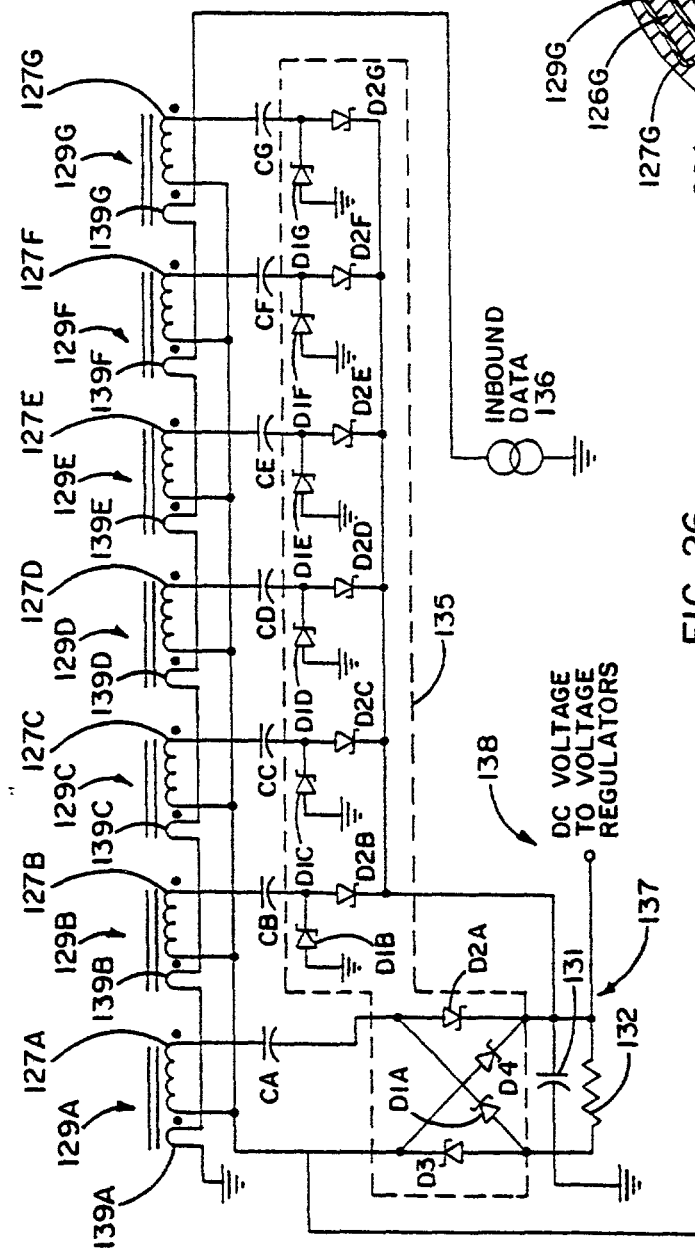
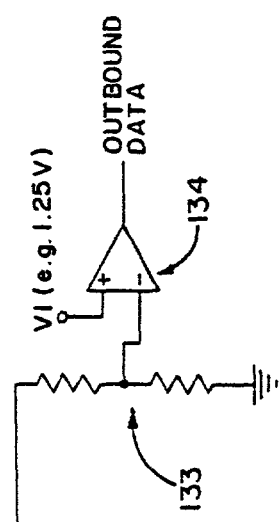
FIG. 26

FLUX LINES
AĀĀA

FLUX LINES
BBB̄B̄

FLUX LINES
CC̄C̄C

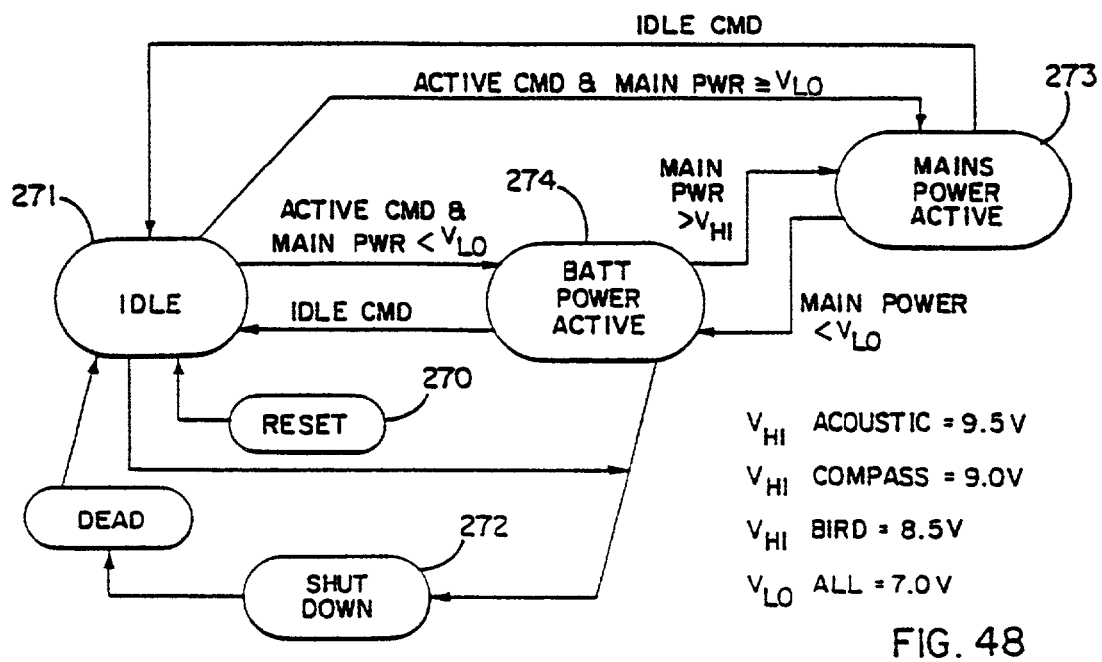
FIG. 48
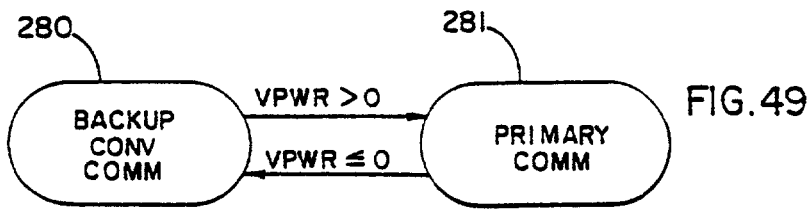
FIG. 49
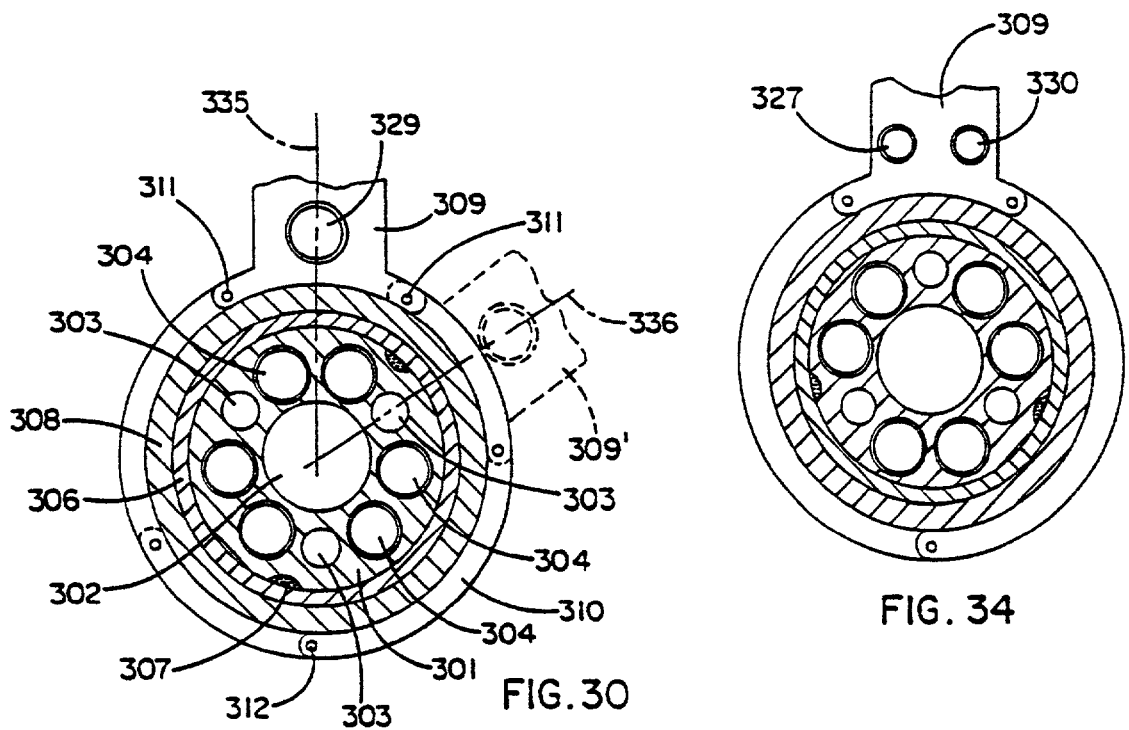
FIG. 30
FIG. 34

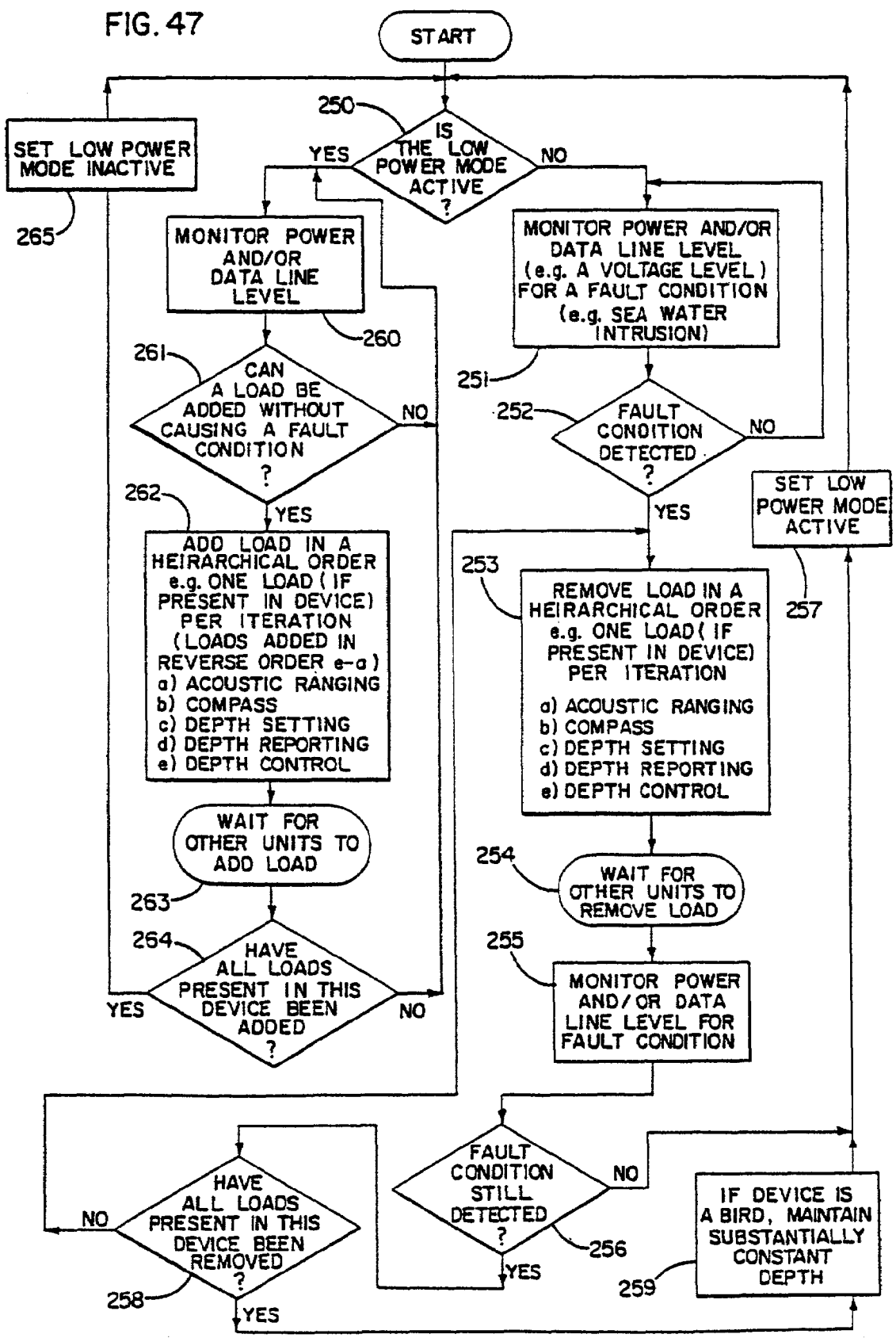

ELECTRICAL POWER DISTRIBUTION AND COMMUNICATION SYSTEM FOR AN UNDERWATER CABLE

This application claims the benefit of U.S. Provisional Application No. 60/004,203, filed Sep. 22, 1995, which is incorporated herein by reference; U.S. Provisional Application No. 60/004,209, filed Sep. 22, 1995, which is incorporated herein by reference; U.S. Provisional Application No. 60/005,500, filed Sep. 22, 1995, which is incorporated herein by reference; U.S. Provisional Application No. 60/004,493, filed Sep. 22, 1995, which is incorporated herein by reference; and U.S. Provisional Application No. 60/004,494, filed Sep. 22, 1995, which is incorporated herein by reference.

FIELD OF THE INVENTION

The invention relates to underwater cable assemblies and, more particularly, to apparatuses for powering and communicating with and powering electrical devices, such as sensors and cable-control devices, deployed at spaced locations along an instrumented underwater cable, such as a towed seismic streamer cable used in offshore seismic prospecting or other applications.

BACKGROUND OF THE INVENTION

Towed seismic streamer cable assemblies typically include a plurality of spaced electrical devices selectively disposed therealong. Where the electrical devices are connected around an exterior of the towed seismic streamer cable, they are commonly referred to as wet units. In many applications, the wet units are inductively coupled to data communication lines within the seismic streamer.

One or more of the seismic streamer cable assemblies may be towed by a survey vessel. The wet units communicate with dry-end electronics disposed, for example, on the survey vessel via one or more communication channels. Communication channels between the wet units and dry-end electronics conventionally include either a single-ended or twisted-pair data communication line inductively coupled to the wet units. Electromagnetic coupling may be utilized to allow communication with the wet units without breaching the exterior sheath of the towed seismic streamer cable.

Conventionally, each of the wet units receives operational power from a battery disposed within the wet unit. The use of batteries as a primary power source in the plurality of spaced electrical devices may be required in practical applications because of low coupling coefficients between the underwater cable and the wet units. However, the use of batteries as the primary power source is frequently undesirable since the batteries may require replacement every few weeks or months. Replacing the batteries typically involves removing the wet units as the seismic cable is retrieved onto rolls on the survey vessel. The wet units are then individually serviced by opening the wet unit and replacing and/or recharging the existing batteries. This battery maintenance process may be highly inefficient and results in unwanted down time. Further, when lithium batteries are used, the cost of disposal and replacement of the batteries for a single vessel may exceed several hundred thousand dollars per year. Accordingly, conventional wet unit designs suffer from a number of problems.

A major problem associated with eliminating batteries from the wet unit devices is the low coupling coefficient between the wet units and the underwater cable. Although numerous attempts have been made to improve this coupling coefficient, these attempts have been less than satisfactory.

U.S. Pat. No. 4,912,684 to John T. Fowler describes a communication system which transmits both power and data signals along a one- or two-wire transmission line running the length of the underwater cable. The power signals may be used to charge batteries in wet units such as cable-leveling birds attached along the cable. The power and data signals are inductively coupled between the transmission line and the wet units by means of coils connected to the transmission line at specific locations along the streamer and associated coils disposed within each bird. However, due to a number of technical difficulties, a seismic streamer cable assembly which transfers operational power from the underwater cable directly to the wet units or to the wet units and in-streamer devices has not yet proven commercially practical.

For example, conventional transmission lines are typically configured as continuous, unbroken transmission lines running the length of the streamer cable which has traditionally been about 6 km or less. Transmission line losses in transmission lines of underwater streamer cables having a length longer than 6 km exacerbate the problems associated with powering the spaced electrical devices directly from the underwater streamer cable. Furthermore, data and/or power transmitted to electrical devices at the aft end of an underwater streamer cable are often severely attenuated. This problem may be particularly acute where data lines are also utilized to transmit power. It has been found that transmission line losses and noise levels in such a system often make the system commercially impractical. Thus, communication with and power delivery to aft electrical devices may be difficult, particularly for ever increasing cable lengths. Much research has been directed at solving this problem, but to date there has been little success.

One approach is to resort to heavy gauge wire and increase the power level transmitted to the cable. However, this is typically unacceptable because additional weight may be added to the underwater cable and because higher power levels may interfere with the operations of the seismic equipment, such as the underwater hydrophones.

Another shortcoming of conventional power distribution and/or data communication systems is that the inductive circuits utilized to couple between the underwater cable and the wet units are required to be precisely tuned within narrow margins to ensure adequate coupling of power and data to or from the electrical devices. If an electrical device fails, falls off, or is otherwise damaged or removed from the underwater cable, the associated coil on the transmission line may have an open secondary, detuning the tuned circuit. Often, the transmission line may be detuned to the point where reliable data and power transfer is compromised.

In typical underwater sonar cables, it is difficult to transfer power along the cable at a high frequency due to the length of the cable, amount of power required to be distributed, and the noise generated by such a transfer. Accordingly, power is typically transferred along the entire length of the cable at a low frequency. However, low frequency signals are extremely inefficient when coupled across a transformer having a low coupling coefficient. Thus, configurations which couple power from the main power line may be commercially impractical in many applications.

Another shortcoming of conventional streamer power distribution and/or data communication systems may be reliability problems due to the leakage of seawater into one or more of the sections of the streamer cable. As seawater leaks into a section of the underwater streamer cable, a low-impedance path or short circuit may be formed across the transmission line. In a continuous-wire transmission line running the length of the underwater cable, the short circuit may disable the entire transmission line. When the transmission line is disabled, sensor data cannot be collected, the electrical devices cannot be powered from the underwater cable, and depth control from the survey vessel may be precluded.

Thus, there is a need for an underwater cable power distribution and/or data communication system that overcomes these and other problems and enables highly efficient and reliable transmission of power and data between the underwater cable and the electrical devices even under demanding operational conditions.

SUMMARY OF THE INVENTION

A principal object of the present invention is to provide a power distribution and/or data communication system which provides an elegant and reliable power distribution and data communication system for supplying power and data to a plurality of electrical devices disposed along an underwater cable. The power distribution and/or data communication system may also provide an improved structure and/or operation which enhances the reliability of the seismic streamer cable assembly even when the cable is damaged and/or electrical devices are removed.

Additional objects of various aspects of the present invention include providing an underwater cable structure which enables the transferring of operational power to the electrical devices without breaching the outer sheath of the underwater cable; eliminating batteries as the primary source of operational power for the electrical devices coupled to the underwater cable; eliminating and/or reducing the need to change batteries; providing better economy by enabling an underwater cable assembly to survey for more hours without interruptions; extending the operational length of underwater cables by 5, 10, 15, 20 km or more without altering the basic structure and/or operation of the underwater cable power distribution and/or data communication system; increasing the bandwidth of data transmitted to and received from the electrical devices; minimizing the weight of wires (e.g., copper wires) in the underwater cable; reducing the weight, size, and number of inductive cores used along the underwater cable; allowing brittle cores to be used in inductors along the underwater cable; increasing the power transfer efficiency from a main power supply to the electrical devices disposed along the underwater cable; reducing noise generated by the power transfer which may interfere with the seismic equipment; reducing capacitive coupling and mutual inductance between the electrical devices and other parts of the underwater cable; improving the coupling coefficient of a transformer disposed about the outer sheath of the underwater cable; providing a fault tolerant power distribution and data communication system in an underwater cable assembly; reducing the number of data and power transmission lines coupled to each of the electrical devices and disposed in the underwater cable; reducing the latency time associated with communications through the underwater cable with the electrical devices; allowing the electrical devices to respond directly to detected fault conditions without intervention of dry-end electronics; and providing for degraded mode operations which allow the most critical electrical device operations to be maintained even during fault conditions.

Accordingly, the present invention provides an underwater power distribution system including an underwater cable for powering a plurality of electrical devices disposed along the cable. A main power line extends through the underwater cable. Two or more power distribution lines and two or more power distributors are also disposed in the underwater cable. Each power distributor is electrically coupled between the main power line and one of the power distribution lines to transfer power from the main power line to the associated power distribution line. One or more power couplers are disposed at selected locations along the underwater cable. Each power distribution line is coupled to one or more power couplers proximate to one of the electrical devices for coupling power to the proximate device.

In underwater systems embodying this aspect of the invention, power may be transmitted along the main line and then distributed to the electrical devices by the power distribution lines. Each power distribution line distributes power directly to a small subgroup of the electrical devices. This arrangement is particularly advantageous. It allows both power transmission along the main line and power distribution along the distribution lines to be independently optimized regardless of the length of the underwater cable assembly, resulting in a highly reliable and efficient underwater power distribution system. Systems embodying this aspect of the invention are so reliable and so efficient that batteries may either be eliminated entirely from the electrical devices or used only rarely in a fail safe capacity. Thus, this aspect of the invention virtually eliminates the economic loss associated with retrieving an underwater cable and replacing or recharging the batteries in the electrical devices and greatly extends the operational life of an underwater cable assembly.

In addition, this arrangement of a main power line and several power distribution lines allows segmentation of the underwater cable assembly. For example, each power distribution line and the subgroup of electrical devices coupled to that power distribution line may define a different segment of the underwater cable assembly. This arrangement further enhances the reliability of an underwater cable assembly because it provides a highly fault-tolerant system. Each segment may be provided with fault protective features that isolate a fault, such as seawater intrusion or loss of an electrical device, in that segment but preserve power transfer and data communications to the remaining segments of the underwater cable assembly. Further, segmentation of the underwater cable assembly allows the cable assembly to be easily lengthened simply by adding additional segments, i.e., by extending the main power line and adding additional power distribution lines.

The invention also provides an underwater power distribution system for powering electrical devices. The underwater power distribution system includes an underwater cable including two or more streamer electronics modules and two or more cable segments. At least one of the electrical devices is disposed along each cable segment, and the streamer electronics modules are alternately arranged with the cable segments and spaced from the electrical devices. A main power line extends through the underwater cable. Two or more power distribution lines are disposed in the underwater cable with at least one power distribution line extending through each cable segment. Each streamer electronics module includes a circuit for coupling electric power from the main power line to an adjacent power distribution line. Two or more power couplers are disposed at selected locations along the underwater cable. Each power distribution line is coupled to one or more power couplers and each power coupler is positioned proximate to at least one of the electrical devices to couple power to the proximate device.

Systems embodying this aspect of the invention may be similar to, and have many of the same advantages as, the previously described underwater power distribution system. However, in systems embodying this aspect of the invention, the underwater cable comprises alternately arranged streamer electronics modules and cable segments, and at least one power distribution line branches from the main power line at a streamer electronics module. This arrangement allows much of the circuitry, including power supplies, data circuits, and circuit cards to be consolidated with existing circuitry in the streamer electronics modules and, therefore, significantly reduces the weight and complexity added to the underwater cable assembly to effect power transfer to the power distribution lines.

The invention provides a method for distributing power underwater to one or more electrical devices disposed along an underwater cable. The method comprises transmitting power at a first frequency on a main power line of the underwater cable, converting the power on the main power line to a second frequency, higher than the first frequency, and distributing the power at the second frequency on two or more power distribution lines to the electrical devices. The first frequency may be either a DC frequency of zero or an AC frequency having a value greater than zero.

The invention also provides an underwater power distribution system for powering two or more electrical devices. The underwater power distribution system includes an underwater cable and the devices are disposed along the underwater cable. A main power line extends through the underwater cable and is arranged to transmit a main power signal at a first frequency. A plurality of conversion circuits are disposed at spaced locations along the underwater cable and are respectively coupled between the main power line and the electrical devices. Each conversion circuit is arranged to convert the main power signal into a power distribution signal at a second frequency higher than the first frequency.

In methods and systems embodying these aspects of the invention, power is transmitted along the main power line at one frequency and is distributed to the electrical devices along the underwater cable at a higher frequency. This arrangement greatly increases the power transfer efficiency along the main line and to the electrical devices. Transmitting power at a relatively low frequency along the main power line allows the power to be most efficiently transmitted to the aft end of the underwater cable. Converting the lower frequency main power signal to a higher frequency power distribution signal allows the power to be most efficiently distributed from the main power line to the electrical devices. This is especially advantageous where the electrical devices are mounted external to the underwater cable and power is inductively or capacitively coupled through the sheath of the underwater cable without any connectors physically penetrating the sheath. The high frequency signal inductively couples power through the sheath far better than a low frequency signal.

In some embodiments employing these aspects of the invention, it may be desirable to first convert the main power signal into a DC signal and then to convert the DC signal into a higher frequency power distribution signal. Conversion first to a DC signal may further improve the efficiency of the power conversion process.

The invention provides an underwater power distribution system for supplying power. The underwater power distribution system includes an underwater cable and two or more electrical devices selectively disposed along the underwater cable. The underwater cable has an outer sheath and is filled with a lossy dielectric material having a dissipation factor of about 0.01 or greater. A main power line extends through the underwater cable. A plurality of insulated twisted pair transmission wires extend through the underwater cable and are coupled between the main power line and the electrical devices. Each twisted pair transmission wire has an outer sheath and a dissipation factor of less than about 0.01 when surrounded by the lossy dielectric material.

Systems embodying this aspect of the invention very effectively transfer power along an underwater cable to electrical devices even when the underwater cable is filled with a lossy dielectric material, such as a non-aqueous liquid that maintains the underwater cable in a neutrally buoyant state. By providing an outer sheath on the transmission wires that has a dissipation factor of less than about 0.01 in the lossy material, power can nonetheless be very effectively transferred along the underwater cable, through the power distribution lines, to the electrical devices.

The invention also provides an underwater system for distributing power to and communicating with two or more electrical devices. The underwater system includes an underwater cable and the electrical devices are selectively disposed along the cable. Each device includes one or more loads. A first line extends through the underwater cable and is coupled to the electrical devices. Fault detection circuitry is coupled to the first line to detect when a fault is present. Disabling circuitry is coupled to the fault detection circuitry to disable one or more of the loads in a hierarchical order in response to a fault.

The invention also provides a method for distributing power along an underwater transmission system. The under water transmission system includes an underwater cable having two or more electrical devices spaced along the underwater cable, and each device includes one or more loads. The method includes transferring electrical signals along the underwater cable, detecting a fault in the underwater transmission system, removing loads along the underwater cable in a hierarchical order in response to the fault, and powering the remaining loads.

The invention further provides a method for distributing both power and data along an underwater cable. Two or more spaced electrical devices are coupled to the underwater cable and each device includes one or more electrical loads. The method includes transferring power and data along a line in the underwater cable, detecting a fault, and selectively removing one or more of the electrical loads from the underwater cable according to a predetermined hierarchy in response to the fault.

Systems and methods embodying these aspects of the invention respond to a failure in a power line or a data distribution line by selectively removing, e.g., shutting down, various loads and associated functions in a controlled, hierarchical manner. The least important functions or electrical devices are shut down first and the most important functions or electrical devices are shut down last. Alternatively, all electrical devices or functions may be shut down responsive to the fault, and then the most important electrical devices added in a controlled, hierarchical manner provided sufficient power is present.

This management enhances the survivability of the more critical functions or devices in the damaged section of the cable as well as the survivability of other functions or devices disposed at undamaged sections of the cable. Shedding the electrical load associated with various functions or devices, and particularly hierarchical load shedding, has even greater importance where both power and data are disposed on a single distribution line. Load shedding allows power transfer and communications to or from aft electrical devices to remain intact even when an intermediate cable segment has been damaged.

The invention provides an underwater power distribution system for powering two or more electrical devices. The underwater power distribution system includes an underwater cable with the electrical devices selectively spaced along the cable. A power line extends through the underwater cable and is coupled to the electrical devices. A current limited driver circuit is coupled to the power line to drive a power distribution signal on the power line at or below a predetermined current level. A fault detection circuit is also coupled to the power line. The fault detection circuit includes a voltage detection circuit for detecting a change in the voltage on the power line.

Systems embodying this aspect of the invention allow a fault to be quickly detected autonomously by each of the electrical devices or by each segment of the underwater cable without intervention of the survey vessel. For example, where the current on each power line is limited, a short circuit or other current leakage fault, such as sea water intrusion, causes a drop in voltage to occur on the power distribution lines. A fault (e.g., sea water intrusion) may be detected simply by a monitoring a voltage received from the power line, e.g., by detecting a reduction in the voltage on the power line. Further, the current limited driver not only provides for autonomous fault detection, but also prevents a section of the underwater cable from exceeding a predetermined power budget due to the fault. Excess power drawn from one or more cable sections may adversely affect the entire operation of the underwater cable.

The invention further provides an underwater power/data transfer system comprising an underwater cable and a mechanism associated with the cable for transferring power and/or data along, into, or out of the cable.

The invention further provides a device associated with an underwater cable comprising a mechanism for sending, receiving, or generating power and/or data.

The invention further provides an underwater data communications system for communicating with a plurality of electrical devices, and includes a primary data communications circuit, a backup data communications circuit, and circuitry coupled to the primary data communications circuit and the backup data communications circuit to switch between the primary data communications circuit and the backup data communications circuit in response to a loss of power to the electrical devices.

The invention provides an underwater communication system for communicating with two or more electrical devices. The underwater communication system includes an underwater cable with the electrical devices selectively disposed along the underwater cable. An inbound data distribution line and an outbound data distribution line extend through the underwater cable and are coupled to one or more of the electrical devices. At least one repeater circuit is disposed in the underwater cable. The repeater circuit includes synchronization circuitry coupled to the inbound and outbound data distribution lines to derive clock data from the outbound data and to transmit the inbound data in accordance with the derived clock data so that a timing relationship exists between inbound and outbound data.

The invention also provides a method of communicating data underwater. The method comprises transmitting outbound data and inbound data through a repeater circuit in an underwater cable, decoding the outbound data in the repeater circuit to recover clock data, and transmitting inbound data from the repeater circuit in synchronism with the clock data.

The invention further provides another method for communicating data underwater. The method comprises receiving outbound data along an underwater cable, decoding the outbound data to recover a clock signal, and transmitting inbound data along the underwater cable in synchronism with the data clock.

In systems and methods embodying these aspects of the invention, transmission of inbound data along an underwater cable is synchronized according to a clock derived from the outbound data. Synchronization of the inbound data with the outbound data by the repeaters, electrical devices, and dry-end electronics greatly reduces the latency, i.e., the time delay, associated with sending an inbound electrical signal from an electrical device, resulting in more efficient utilization of the available bandwidth. Further, since the electrical devices are already synchronized with each of the repeaters and the dry-end electronics, there is no need to send out a long preamble to achieve synchronization with each repeater and the dry-end electronics. Thus, in accordance with these aspects of the invention, data may be sent inbound from the electrical devices to the survey vessel very quickly and efficiently.

The invention provides an underwater system for transferring power. The underwater power transferring system includes an underwater cable and two or more wet units selectively disposed along an underwater cable. Each wet unit has a first inductor for receiving power. The underwater cable includes two or more second inductors respectively disposed adjacent to the first inductors in the wet units. Hydrophones are also selectively disposed along the cable and operate in one or more first operating frequency bands. Power conversion circuits are respectively coupled to one or more of the second inductors to output a signal having a second operating frequency band to the wet units. The first operating frequency bands and the second operating frequency band do not overlap.

The invention also provides a method of transferring power underwater. The method comprises having hydrophones in an underwater cable which operate at one or more first frequency bands and transferring power inductively from an underwater cable to two or more wet units using a second frequency band which does not overlap the first frequency bands.

Frequency band separation was found to prevent coupling noise from the power transfer into the hydrophone circuits even when a high power, high voltage signal was continually active.

Further, frequency band separation was found to be particularly effective when coupled with an efficient filter. Efficient filtering coupled with frequency constraints on the power distribution signal increases the hydrophone sensitivity and noise immunity as the power transfer frequency to the wet units increases. In some embodiments, an efficient filter for separating the hydrophone signal frequency bands and the power transfer frequency band may be implemented by configuring the lumped and distributed parameters of each power distribution line to form a distributed bandpass filter centered about the power transfer frequency band.

The invention provides an underwater power distribution system for supplying electric power to two or more electrical devices. The underwater power distribution system includes an underwater cable with the electrical devices disposed along the underwater cable. Two or more data distribution lines extend through portions of the underwater cable. Two or more repeater circuits are respectively coupled between adjacent data distribution lines to form a data communication channel. Each data distribution line is coupled to one or more electrical devices and is tuned to resonate at a first frequency having a predetermined bandwidth. Further, each data distribution line includes at least one load adjusting circuit to maintain each data distribution line tuned to about the first frequency with the predetermined bandwidth, in response to a failure mode, for example, a missing device, a device failure, or a seawater intrusion.

Underwater cable power distribution systems embodying this aspect of the invention allow power transfer along a particular cable segment to continue even though the cable segment and/or electrical devices along the cable segment have been damaged and/or removed. Where groups of electrical devices are buffered by repeater units, the electrical effects of losing a device or a seawater intrusion in one cable segment are electrically isolated from the remaining cable segments. Thus, in these configurations, the load adjusting circuit is even more effective in preventing detuning of a particular cable segment so the communications and power transfer can continue across the entire communication channel. Further, the retransmission of message signals at a predetermined level by the repeater at an end of the detuned segment with a load adjusting circuit overcomes the detuning effects of a missing device or a seawater intrusion and allows transmission of data to aft devices.

In addition to an underwater cable system, the invention also provides electrical devices for use in an underwater cable system. For example, the invention provides an underwater electrical device for an underwater cable including a housing, a load circuit disposed in the housing, and an inductor circuit coupled to the load circuit. The inductor circuit transfers a power distribution signal from the underwater cable to the load circuit such that the load circuit loads the power distribution signal. A control circuit is coupled to the inductor circuit and/or the load circuit to reduce the loading in response to the power distribution signal falling below a predetermined level.

The invention also provides an underwater electrical device for an underwater cable which includes a line having a voltage. The underwater electrical device includes a housing, at least one electrical load in the housing, and a control circuit in the housing. The control circuit includes circuitry for monitoring a voltage on a line in an underwater cable to reduce the electrical load in response to the voltage falling below a predetermined level.

The invention further provides an underwater electrical device for an underwater cable. The underwater electrical device includes a controller circuit which is arranged to be coupled to send and receive power from the underwater cable. The controller circuit includes fault detection circuitry to detect a fault and load shedding circuitry to reduce the amount of power received from the underwater cable in a hierarchical order responsive to the fault.

Underwater electrical devices embodying these aspects of the invention can autonomously detect when a fault occurs in the device or a proximate cable segment and automatically reduce the load on the cable segment independent of any commands received from the cable assembly or survey vessel. In other words, the electrical devices themselves may perform fault recovery autonomously without any explicit control received from the underwater cable or survey vessel. Thus, reliability is increased and the underwater cable assembly may recover communications and/or power transfer over the underwater cable even where communications and/or power transfer across a portion of the cable has been interrupted. Further, by hierarchical load shedding, more important functions of the electrical devices may remain operative while less important functions are removed first. This allows for an intelligent, hierarchical degraded mode operation even along damaged portions of the underwater cable.

The invention provides an underwater electrical device for an underwater cable. The underwater electrical device includes a housing, an input circuit, and an output circuit. The housing is arranged to be connected to the underwater cable. The input circuit is disposed in the housing for inputting data from an underwater cable. The input circuit includes synchronization circuitry to derive a timing signal from the data. The output circuit is coupled to the input circuit and is arranged to output data to the underwater cable in synchronism with the timing signal.

The invention provides an underwater coupling system including an underwater cable, at least one coupler, and two or more inductive coils. The coupler is disposed in the underwater cable and the inductive coils are selectively disposed outside the underwater cable at circumferentially spaced locations about the coupler.

Underwater coupling systems embodying this aspect of the invention have two or more coils, such as circumferentially spaced coils mounted about the coupler. This arrangement is particularly advantageous for embodiments where the inductive coils are in the wet units. It allows for rotation of the wet units while still maintaining a high coupling coefficient for various orientations. Additionally, each of the plurality of coils may include a core and be electrically connected together to further improve the coupling coefficient.

The invention further provides an underwater coupling system which includes an underwater cable, at least one coupler disposed in the underwater cable, and a plurality of inductive coils circumferentially spaced inside the coupler. Systems involving this aspect of the invention allow an electrical device to rotate with respect to the cable without losing power and/or data communications with the survey vessel.

The invention also provides an underwater coupling system including an underwater cable and two or more inductive couplers. The inductive couplers are disposed at selected locations along the underwater cable. Each coupler includes at least one coil having a core with a substantially triangular-shaped cross section and a winding wound around the substantially triangular-shaped core.

Underwater coupling systems embodying this aspect of the invention provide excellent coupling efficiency. The triangular-shaped core provides an extremely efficient utilization of space within the underwater cable so as to provide a relatively large core with a high coupling coefficient within the mechanical constraints of a coupler and/or underwater cable.

The invention further provides an underwater coupling system including an underwater cable, first and second lines, and two or more couplers. The first and second lines extend through an underwater cable and the couplers are disposed at selected locations along the underwater cable. Each coupler includes an integral core having first and second portions and first and second coils respectively wound around the first and second portions of the integral core. The first and second lines are respectively connected to the first and second coils.

In underwater coupling systems embodying this aspect of the invention, each coupler includes an integral core. This arrangement substantially improves the coupling coefficient between the underwater cable and any electrical devices coupled to the cable at the coupler.

The invention additionally provides an underwater coupling system including an underwater cable, first and second lines extending through the underwater cable and two or more couplers. The couplers are disposed at selected locations along the underwater cable. Each coupler includes a first coil connected to the first line and second and third coils connected to the second line. The first and second coils are spaced from each other and the first and third coils are in close proximity for canceling cross-talk between the first and second coils.

In underwater coupling systems embodying this aspect of the invention, the first and third coils are arranged in close proximity to prevent cross-talk between the first and second coils. This arrangement significantly reduces noise and, therefore, enhances the reliability of communication with the electrical devices along the underwater cable.

The present invention also provides a power distribution, communication, electrical device, and/or coupler system having one or more of the elements described herein and/or shown in FIGS. 1–49, in any combination or subcombination. The invention is contemplated to include any number of combinations and subcombinations of elements described and shown herein.

BRIEF DESCRIPTION OF THE DRAWINGS

The above described advantages, features, and objects of the invention will be better understood by reference to the appended claims, description of preferred embodiments, and the accompanying drawings in which:

FIG. 1 is a view of a seismic surveying vessel towing an underwater streamer cable;

FIG. 2 is a partial sectional view of an underwater streamer cable which includes a plurality of electrical devices;

FIG. 25 is a traverse cross sectional view of another embodiment of the underwater cable including a coupler and a coil housing disposed within the coupler;

FIG. 26 is a circuit diagram of a circuit for use with embodiments of electrical devices having a coupler employing multiple coils;

FIG. 30 is a transverse cross sectional view of the underwater cable including another version of a coupler and a partially shown wet unit;

FIG. 34 is a transverse cross sectional view of the underwater cable of FIG. 30 with a wet unit having an arrangement of two core assemblies;

FIG. 47 is a flow diagram of one embodiment of an apparatus having hierarchical load shedding;

FIG. 48 illustrates the hierarchical load shedding function which may be associated with an electrical device; and FIG. 49 illustrates the switching between primary and backup communications.

DESCRIPTION OF THE PREFERRED EMBODIMENTS

Figure 3:
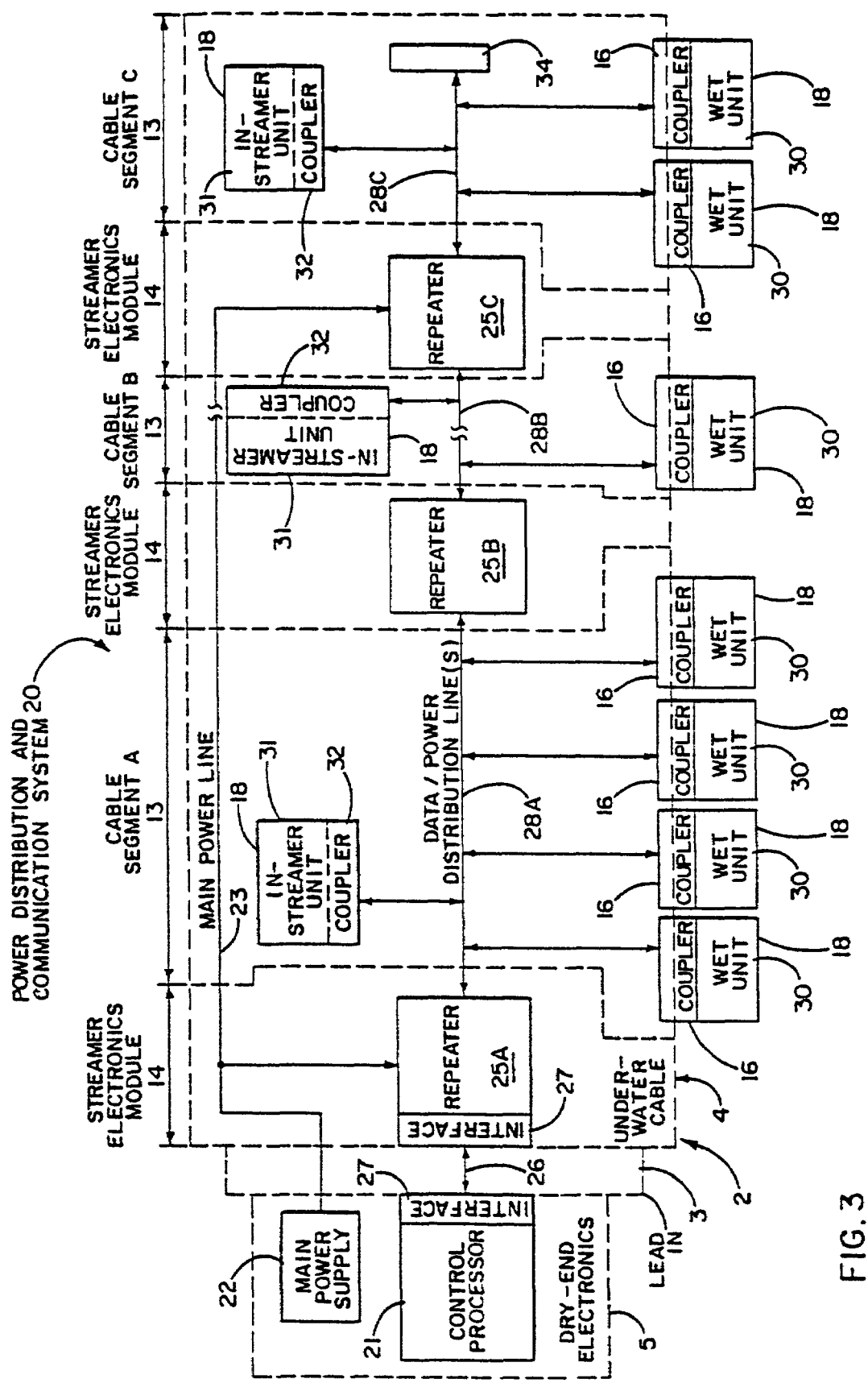
FIG. 3 is a block diagram of an embodiment of an underwater power distribution and/or data communication system for use in an underwater cable.

Referring to FIGS. 1 and 2, a typical marine seismic data acquisition system 1 may include a survey vessel 8 which tows one or more underwater streamer cables such as underwater cable 2. The underwater cable 2 may include one or more sections such as lead-in section and underwater section 4. The lead-in section 3 is typically connected between the underwater section 4 and dry-end electronics 5. The dry-end electronics 5 are typically disposed on the survey vessel 8 and may include a plurality of data acquisition, processing, storage, and control devices. In some embodiments, it may be desirable to couple first and second ends of the underwater section 4 to first and second buoys 6, respectively.

The underwater cable 2 may be a continuous streamer cable or be discontinuous and divided into a plurality of cable segments. For example, FIG. 2 shows a portion of an underwater cable 2 which may be divided into a plurality of cable segments 13 by a plurality of streamer electronics modules (SEM's) 14. In the illustrated embodiment, the cable segments 13 are alternately arranged with the SEM's 14 to form the underwater section 4. The SEM's 14 may be larger, smaller, or have the same cross sectional size as the cable segments 13. In a preferred embodiment, the SEM's 14 have a larger cross sectional size than the cable segments 13 so that the SEM's may accommodate electronics such as one or more circuit cards. Further, each cable segment may include an outer sheath 15 secured to waterproof connectors that attach to the SEM's 14. This configuration allows access for servicing the electronics in the individual SEM's. However, the underwater cable 2 need not be limited to this arrangement. For example, the outer sheath 15 may extend throughout the entire length of the underwater cable 2 and enclose the SEM's 14.

As illustrated in FIG. 2, the underwater cable 2 typically includes a plurality of units selectively disposed therealong. For example, a plurality of hydrophones 7 may be selectively disposed along the underwater section 4 for measuring reflected seismic signals. Further, one or more electrical devices 18 may be selectively disposed along the underwater section 4 either inside and/or outside of the outer sheath 15. When the electrical devices 18 are disposed within the outer sheath 15, they may be referred to as in-streamer units 31. Alternatively, when the electrical devices 18 are disposed on the exterior of the outer sheath 15, the electrical devices 18 may be referred to as wet units 30. The wet units 30 are preferably secured to the underwater cable using one or more wet unit couplers 16.

In exemplary embodiments, the electrical devices 18 may be variously configured. For example, a single electrical 18 device may include a leveling function, depth sensing function, acoustic ranging/bearing function and/or a compass/heading function, as well as other functions, e.g., inclinometer, gyro, accelerometer, magnetometer, optical range/bearing, retrieval aids. Further, in some embodiments, it may be desirable to divide one or more functions into two or more electrical devices 18. For example, leveling devices or birds 10A, compass/heading devices 11A, and acoustic ranging devices 12A may be configured as separate in-streamer units within the underwater cable 2. In many embodiments, the electrical devices 18 are configured as separate leveling/depth sensing devices or birds 10, compass/heading devices 11, and acoustic ranging devices 12 and are disposed on the exterior of the sheath 15 as wet units 30.

Using known techniques, the electrical devices 18 may be utilized to measure and control the shape, heading, and configuration of the underwater cable 2. In many embodiments, the leveling devices, or birds 10, 10A include one or more vanes 17 to control the depth and/or orientation of the underwater cable 2. The electrical devices 18 typically communicate with and are controlled by the dry-end electronics 5 on board the survey vessel 8 over one or more communication channels.

Part I: Power Distribution/Communication Structure

Referring to FIG. 3, a power distribution and/or data communication system 20 is shown in block diagram form with the physical relationship to the marine seismic data acquisition system of FIGS. 1 and 2 illustrated as dashed lines. In the illustrated embodiment, the dry-end electronics 5 include a control processor 21 and a main power supply 22.

The main power supply 22 is preferably coupled to a main power line 23 which runs through the lead-in section and then through substantially the entire length of the underwater section 4. A plurality of repeaters 25A–25C may be selectively disposed along the length of the underwater cable 2 and may be coupled in series or in parallel with the main power line 23. As discussed throughout the specification, the repeaters 25A–25C may be variously configured to include a plurality of functions, such as, data waveform reformatting, power conversion, management and control, fault processing and control, power transmission, line driving-receiving, line termination, null character transmission, data/clock synchronization, data link control, data encoding, data decoding, clock recovery, error detection-correction, signal filtering, and/or hierarchical load shedding control.

The main power supply 22 may supply either AC or DC current to the main power line 23. Where the underwater cables 2 extend over long distances, it may be desirable for the main power supply 22 to output either low frequency AC or DC power and for the main power line 23 to use a relatively heavy gauge wire. Many underwater cables 2 utilize a main power supply 22 configured to output a main AC power signal having a frequency of between 1 and 4 kHz onto the main power line 23. In many applications, the main power line 23 includes one or more transmission wires which are at least as heavy as 8 gauge wire and which are several thousand meters in length.

The control processor 21 may be coupled to the electrical devices 18 in the underwater cable 2 by a lead-in line or lines 26 which may be buffered on each end by interface circuits 27. In typical embodiments, the lead-in line may be up to 600 meters in length and normally does not interface to any parallel connected electrical devices 18. In many of the preferred embodiments, data may be transmitted across the lead-in section at a rate of up to 64 kbps or higher. Accordingly, conventional line drivers and receivers may be utilized as the interface circuits 27 to interface the control processor 21 to the first repeater 25A. For example, the interface circuits 27 may include drivers/receivers compatible with the EIA RS-422-A (CCITT V.10) and/or the EIA RS-423-A (CCITT V.11) standards.

The repeaters 25A–25C are alternately arranged with a plurality of data and/or power distribution line(s) 28A–28C to form a data communication channel running substantially throughout the underwater cable 2. The data communication channel transfers data between the control processor 21 and a plurality of electrical devices 18 selectively disposed along the underwater cable. In FIG. 3, the electrical devices 18 are shown as being either wet units 30 or in-streamer units 31. As previously discussed with regard to FIG. 2, the wet and in-streamer units 30, 31 may be variously configured to include, for example, a compass/heading function, depth control function, acoustic ranging functions, and/or other functions.

Each wet unit 30 is preferably coupled to one of the data/power distribution line(s) 28A–28C using a wet unit coupler 16. Similarly, each in-streamer unit 31 is preferably coupled to one of the data/power distribution line(s) 28A–28C using an in-streamer coupler 32. Again referring to FIG. 3, a plurality of couplers 16, 32 are disposed along a data/power distribution line to couple electric power from the data/power distribution line to the electrical devices 18 (e.g., wet and in-streamer units 30, 31). As shown by the dotted lines in FIG. 3, the data and/or power distribution lines 28A–28C preferably extend through and are substantially coextensive with each cable segment. Additionally, in many of the preferred embodiments, the data and/or power distribution lines 28A–28C are coupled to the main power line 23 via the respective repeaters 25A–25C located in each of the streamer electronic modules 14. In the many of the preferred embodiments, the couplers 16, 32 are inductive couplers. However, any suitable coupling mechanism may be employed, including capacitive coupling, ohmic connections, and/or optical links.

In some embodiments, it may be desirable to include a terminating circuit 34 at the end of the last data/power distribution line(s) 28C in the underwater cable 2. The terminating circuit 34 is preferably configured to provide proper termination for the data/power distribution line(s) 28A–28C. In alternative embodiments, the terminating circuit 34 may also be configured to transmit synchronization information and/or idle signals along the data/power distribution line(s) 28A–28C. In many of the preferred embodiments, two oppositely connected Zener diodes (i.e., a voltage adjusting circuit as discussed below) may be utilized to terminate the outbound data/power distribution lines while the inbound data/power distribution lines may have a resistive termination.

In FIG. 3, the data and/or power distribution line(s) 28A–28C are shown generally and may comprise any number of physical connections. The distribution lines may be variously configured to include an optical, single ended, and/or balanced electrical connection. Further, the configuration shown in FIG. 3 may represent a half-duplex or full-duplex system. Conventionally, data transmitted from the electrical devices 18 to the dry-end electronics 5 may be referred to as "inbound data" and data transmitted from the dry-end electronics 5 to the electrical devices 18 may be referred to as "outbound data."

In some embodiments, each data/power distribution line 28A–28C may be a single line. For a single line system, it may be preferable to time and/or frequency multiplex the inbound and outbound data. In other embodiments, each data/power distribution line(s) 28A–28C may comprise multiple lines. For a multiple line system, it may be preferable to utilize a full-duplex communication system where outbound data is distributed on a separate distribution line from the inbound data. For example, each of the data/power distribution line(s) 28A–28C may be a dual line system having an inbound data distribution line and an outbound data distribution line. In such embodiments, it may be desirable to multiplex a power signal onto either the inbound and/or outbound data distribution line. Alternatively, each data/power distribution line(s) 28A–28C may include three lines where inbound data, outbound data, and the power signal are transmitted on a separate distribution line.

Figure 4:
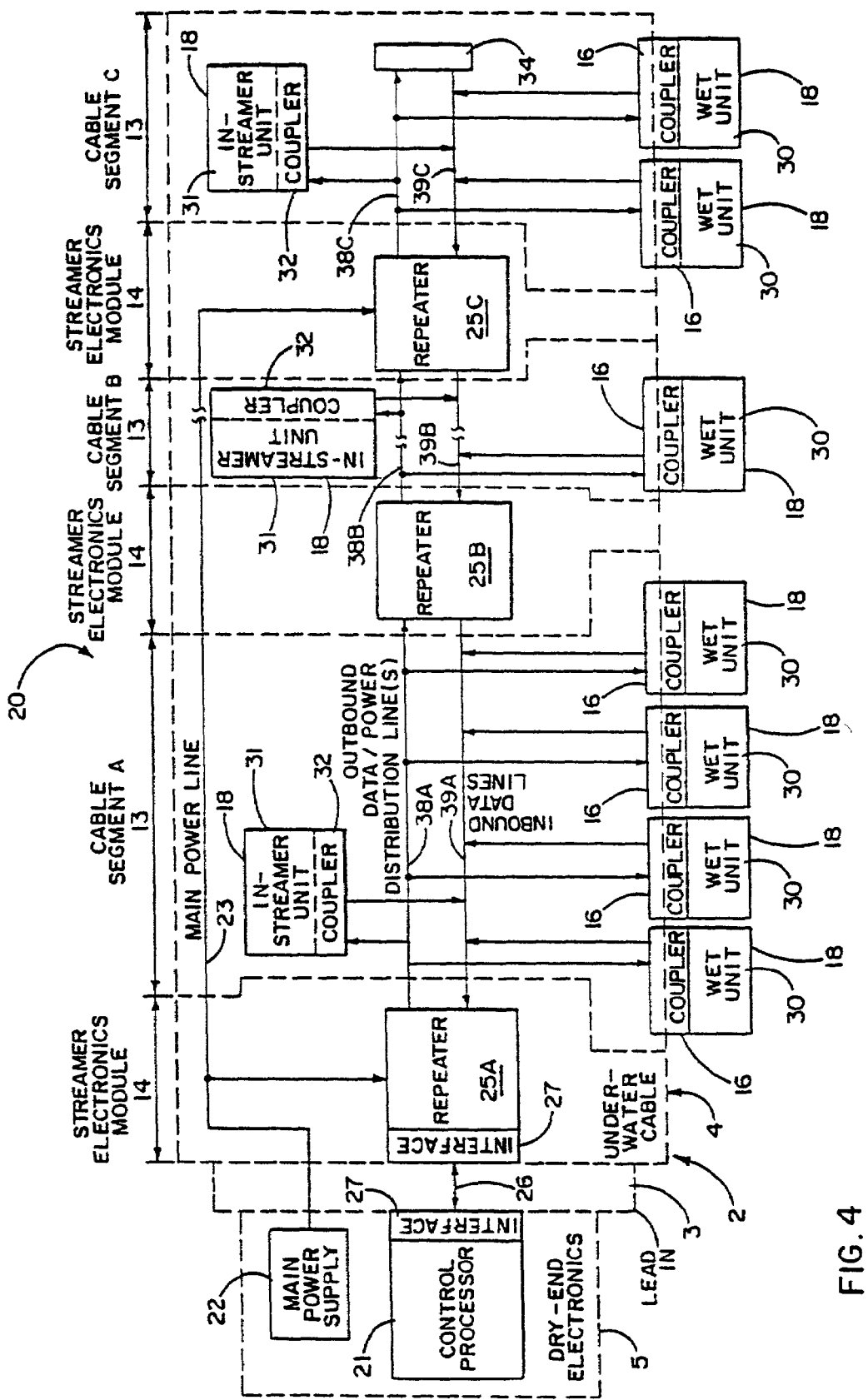
FIG. 4 is a block diagram of another embodiment of an underwater power distribution and/or data communication system for use in an underwater cable.

FIG. 4 shows an embodiment where the outbound data and power signal may be multiplexed together on a single outbound data and power distribution line 38A–38C while inbound data may be distributed on a single inbound data line 39A–39C. In many of the preferred embodiments, the power distribution and/or data communication system 20 is configured as shown in FIG. 4 using a first twisted pair wire for each cable segment of the outbound data/power distribution lines 38A–38C and a second twisted pair wire for each cable segment of the inbound data distribution lines 39A–39C. The embodiment shown in FIG. 4 may be preferable for many applications since this embodiment reduces the weight and cost of the copper transmission lines while still maintaining a data channel having a relatively high bandwidth.

Figure 5:
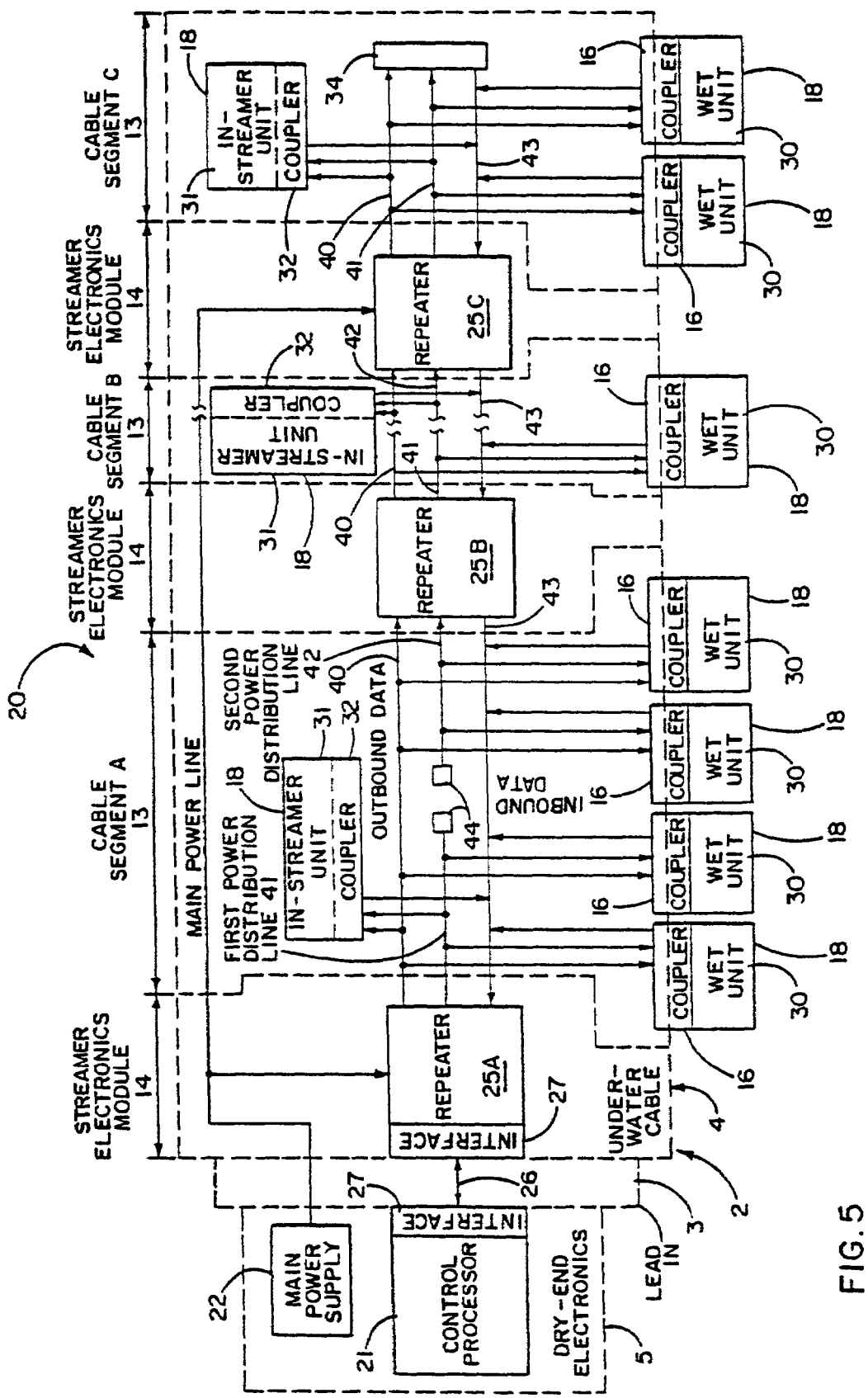
FIG. 5 is a block diagram of another embodiment of an underwater power distribution and/or data communication system for use in an underwater cable.

FIG. 5 shows an embodiment of the power distribution and/or data communication system 20 having separate inbound data, outbound data, and power distribution lines. This configuration may be useful in systems which require large amounts of data to be transmitted in both the outbound and inbound direction, where the electrical devices 18 have large power requirements, and/or where the additional weight of a separate power line may be acceptable.

Separate power distribution lines may extend either partially or completely through an individual cable segment. For example, each cable segment may include two or more power distribution lines. As illustrated in FIG. 5, cable segment A includes first and second power distribution lines 41, 42. The first and second power distribution lines 41, 42 may be substantially disposed through first and second halves of each cable segment, respectively. In this configuration, the length of each power distribution line may be reduced by about one-half the length of the cable segment, with repeaters disposed on each end of the cable segment supplying the power for about one-half of the electrical devices 18 disposed along the cable segment. Reducing the length and current requirements of the power distribution lines by half provides for more efficient power transfers and a reduction in the size/weight of the wire utilized for the power distribution lines 41, 42. Where two or more power distribution lines are utilized on a single cable segment, a termination circuit 44 may be included to provide proper termination of each power distribution line.

Figure 6:
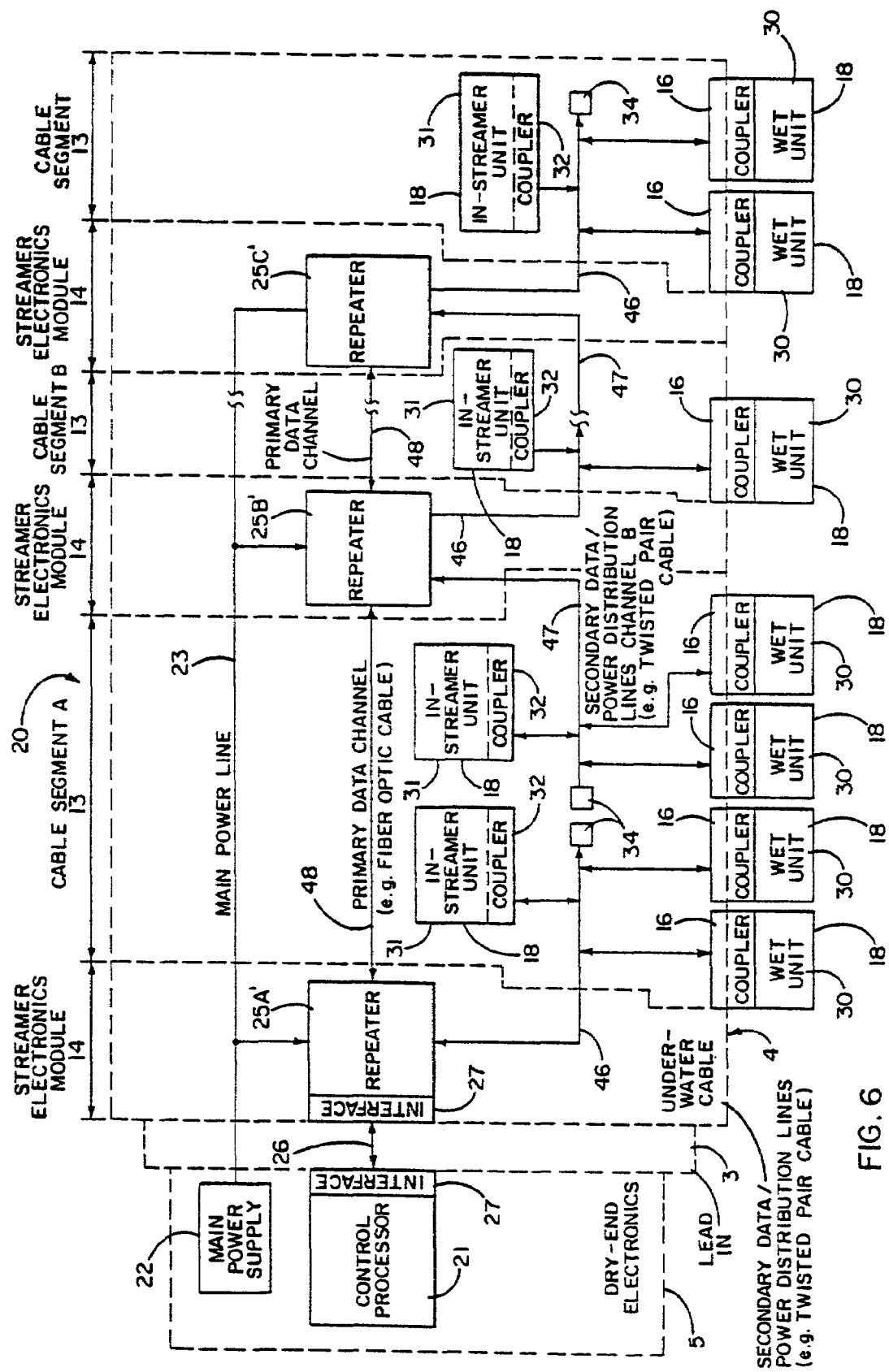
FIG. 6 is a block diagram of another embodiment of an underwater power distribution and/or data communication system for use in an underwater cable.

FIG. 6 shows an embodiment of the power and/or data communication system 20 where each repeater 25A'–25C' is preferably adapted for repeating data along a primary data channel 48, such as a main data channel utilized to transmit acoustic hydrophone data to the control processor 21. The primary data channel 48 may include fiber optic data transmission lines. Each repeater 25A'–25C' may be connected to one or more secondary data/power distribution line(s) 46, 47 which communicate with some or all of the wet and in-streamer units 30, 31 disposed along a cable segment 13. In the illustrated embodiment, the cable segment 13 may be divided such that the repeaters at either end of the cable segment communicate with about half of the wet and in-steamer units 30, 31 disposed along the cable segment 13 using separate data/power distribution lines.

In the embodiment illustrated in FIG. 6, the secondary data/power distribution line(s) may distribute data at a relatively slow speed as compared with the primary data channel. For example, the secondary data/power distribution lines may utilize one or more twisted pair copper wires to transmit data and power as discussed above with regard to the data/power distribution lines shown in FIGS. 3–6. The repeaters 25A'–25C' may be arranged to provide data link control and other data management functions for formatting data transferred between the primary data channel 48 and the secondary data/power distribution lines 46, 47 depending on the protocols utilized on the respective channels.

The configuration illustrated in FIG. 6 may be useful in systems where the primary data channel 48 (e.g., a fiber optic backbone communication channel) has sufficient excess capacity to accommodate the additional data to be transferred between the dry-end electronics 5 and the electrical devices 18. An advantage of the system illustrated in FIG. 6 is that the secondary data/power distribution lines may span only a limited distance over all or a portion of a cable segment 13. Accordingly, where the length of the secondary data/power distribution lines 46, 47 is less than the cable segment, data rates may be increased and wire size reduced without adversely impacting power and data transfer with the electrical devices 18.

In each of the above embodiments of the power and/or data communication system 20, power is preferably distributed using a hierarchical tree structure with the main power supply 22 forming the roots or base, the main power line 23 forming the trunk, data/power distribution line(s) 28A–28C, 38A–38C, 41, 42, 46, 47 forming branches, and each coupler 16, 32 forming a leaf. Each branch may be disposed in parallel with the trunk and may extend along the cable either toward the survey vessel 8 or toward the aft end of the underwater cable 2 depending on the particular embodiment employed. When the tree power structure shown in FIGS. 3–6 is utilized, a) the power and/or data distribution lines may be isolated from each other and provided with fault tolerant features that preserve communications and/or power distribution even though a fault occurs along a particular cable segment, b) the power to the electrical devices may be transferred along a relatively short power distribution line at a high frequency, thus improving the coupling coefficient for a given coil core weight, c) the circuits for converting the main power signal into a high frequency AC power signal can be the same circuits utilized for transmitting data, and d) the power supply, circuit cards, and housing of the existing SEM's can be shared with the repeater circuits to minimize the weight and complexity added to the underwater cable system while transferring operational power to the electrical devices.

Part II: Facilitating Power Distribution to Wet Units

The above described power distribution and/or data communication systems 20 may be facilitated by the addition of a number of elements designed to enhance the power transfer efficiency to each of the electrical devices 18 and particularly to the wet units 30 which may have a low coupling coefficient. For example, referring to FIG. 7, power conversion circuits for use in the above described embodiments are shown in detail. As discussed above, a main power signal is supplied from main power supply 22. Preferably the main power signal is a low frequency AC signal or a DC signal output on main power line 23. The main power signal may be coupled to a plurality of underwater cable power conversion circuits 50 disposed along the main power line 23.

The power distribution and communication system 20 may be variously configured to include any number of power conversion circuits located at any number of locations along the underwater cable 2. Where the underwater cable 2 includes streamer electronics modules (SEM's) 14, the underwater cable power conversion circuits may be disposed inside and/or outside of the SEM's, but are preferably respectively disposed within the SEM's. Further, the underwater cable power conversion circuits 50 may share some or all of their circuitry with the repeaters 25. Incorporating the power conversion circuits in the repeater circuits and locating the power conversion circuits in the SEM's enables the power conversion circuits to share common circuits/circuit cards with the repeater circuits. Thus, the overall weight and cost of the power distribution and communication system 20 may be reduced. Alternatively or additionally, some or all of the power conversion circuits 50 may be separate from the repeater circuits and disposed along the underwater cable at locations spaced from the SEM's.

Each underwater cable power conversion circuit 50 preferably converts the main power signal on the main power line 23 into a power distribution signal (e.g., a high frequency AC power signal). The power distribution signal may then be transferred to each of the electrical devices 18 via a coupler 16, 32, preferably via an inductive coil having a core. In some of the preferred embodiments, the power distribution signal is supplied to two or more couplers via a data/power distribution line. The power distribution signal may have a frequency of between about 25 kHz and 400 kHz, and preferably between about 30 kHz and 300 kHz and even more preferably between about 40 kHz and 200 kHz and even more preferably between about 50 kHz and 100 kHz and most preferably about 64 kHz. The weight of a core necessary to achieve a particular level of power transfer efficiency is inversely proportional to the frequency of the power distribution signal. For example, a lower frequency power distribution signal requires a heavier core to provide the same power transfer efficiency as a lighter core used with a higher frequency power distribution signal. Accordingly, if the frequency of the power distribution signal was the same as the frequency of the main power signal, e.g., 2 kHz, then the core weight in the coupler would be about 32 times more massive than that required for a power distribution signal having a frequency of 64 kHz. However, a substantially higher frequency power signal may be difficult to maintain for long cable lengths because of losses, e.g., due to loading and cable capacitance and skin effect of the underwater cable. Further, a substantially higher frequency power signal generates noise that may be difficult to control and exclude from guarded frequency bands used by the hydrophones.

The frequency of the power distribution signal is preferably chosen within the ranges specified above and matched to the physical wire gauge, length, the insulation characteristics (which determine capacitance), loading of the data/power distribution lines, and core weight of the coil. Accordingly, in some of the preferred embodiments a power distribution signal having a frequency of about 64 kHz has been found to provide excellent operational characteristics when utilized to transfer power to a plurality of wet units 30 in the underwater cable 2.

Although the frequency of the main power signal may be variously configured as discussed above, an underwater seismic cable may utilize a frequency of about 2 kHz. If a power signal having a 2 kHz frequency were coupled directly to the wet units via an inductor, for many embodiments the coupling coefficient may be so low that it would be impractical to power the wet units 30 from the underwater cable 2 without a massive core. However, by converting the main power signal into a higher frequency, power distribution signal at spaced locations within the underwater cable, it is possible to efficiently couple power to the wet units 30 even where a low coupling coefficient is present.

As discussed above, transmitting power at a relatively low frequency along the main power line allows the power to be efficiently transmitted to the aft end of the underwater cable. Converting the lower frequency main power signal to a higher frequency power distribution signal allows the power to be efficiently distributed from the main power line to the electrical devices. This is especially advantageous where the electrical devices are mounted external to the underwater cable and power is inductively or capacitively coupled through the sheath of the underwater cable without any connectors physically penetrating the sheath. The high frequency signal inductively couples power through the sheath far better than a low frequency signal.

The underwater cable power conversion circuit may be variously configured depending on the operational environment. For example, if the main power signal on the main power line is a low frequency AC power signal, the underwater cable power conversion circuit may comprise a cycloconverter or other device which converts one AC signal directly into another AC signal. However, in preferred embodiments, it is often desirable and more efficient to first convert the low frequency AC power signal on the main power line into a DC signal and then to convert the DC signal into a high frequency AC power distribution signal.

Figure 7:
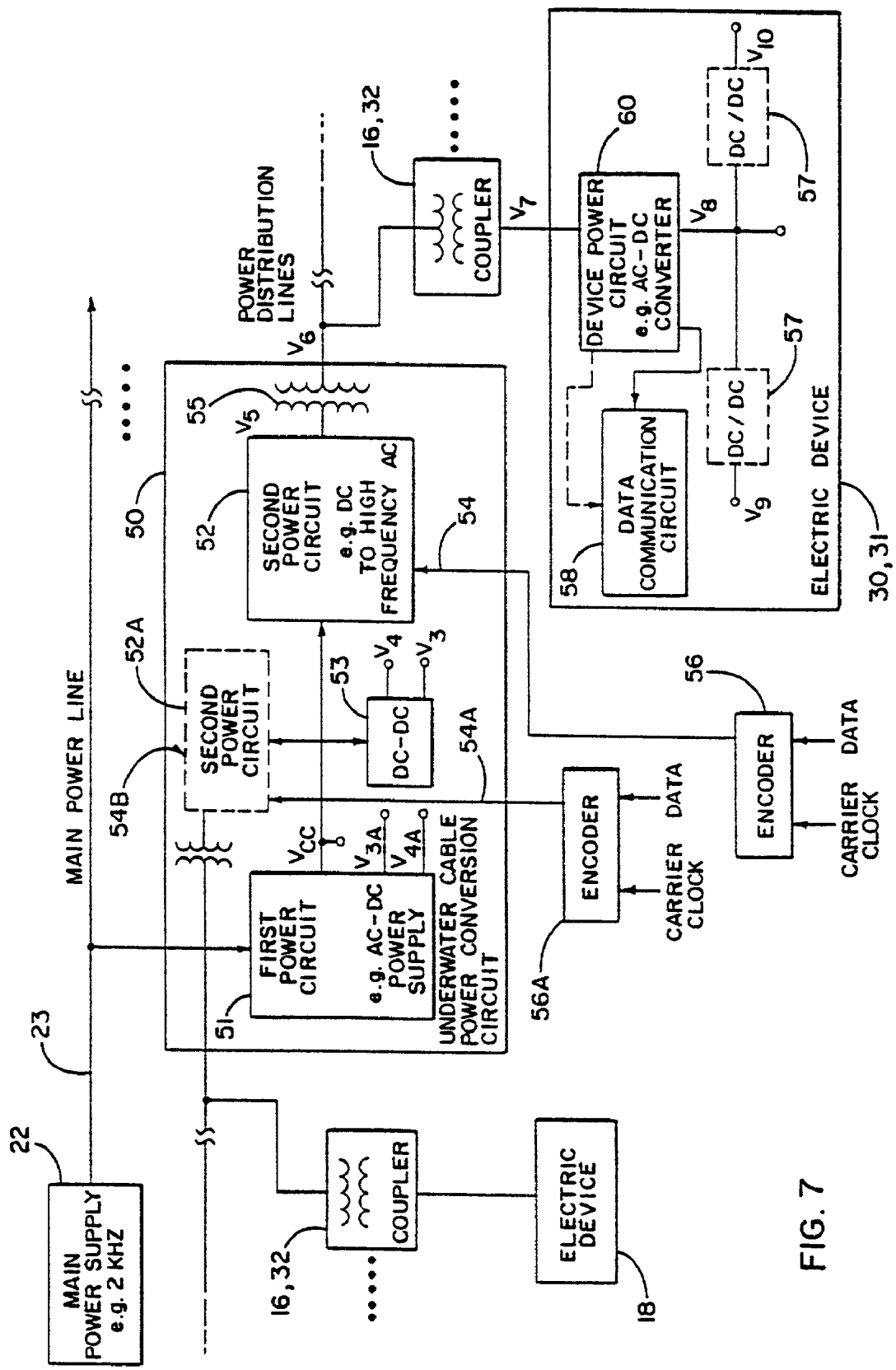
FIG. 7 is a block diagram of the underwater cable power conversion circuits.

In the configuration shown in FIG. 7, each of the underwater cable power conversion circuits 50 may include a first power circuit 51 for converting the main power signal (e.g., either an AC or DC signal) into a regulated DC signal and a second power circuit 52 for converting the regulated DC signal (V2) into a high frequency AC signal (V5). Where the main power line 23 includes a DC power signal, it may be desirable to omit the first power circuit 51 entirely. In this embodiment, the main power line 23 would be electrically connected directly to the second power circuit 52, and V2 would equal the DC power signal.

Figure 9:
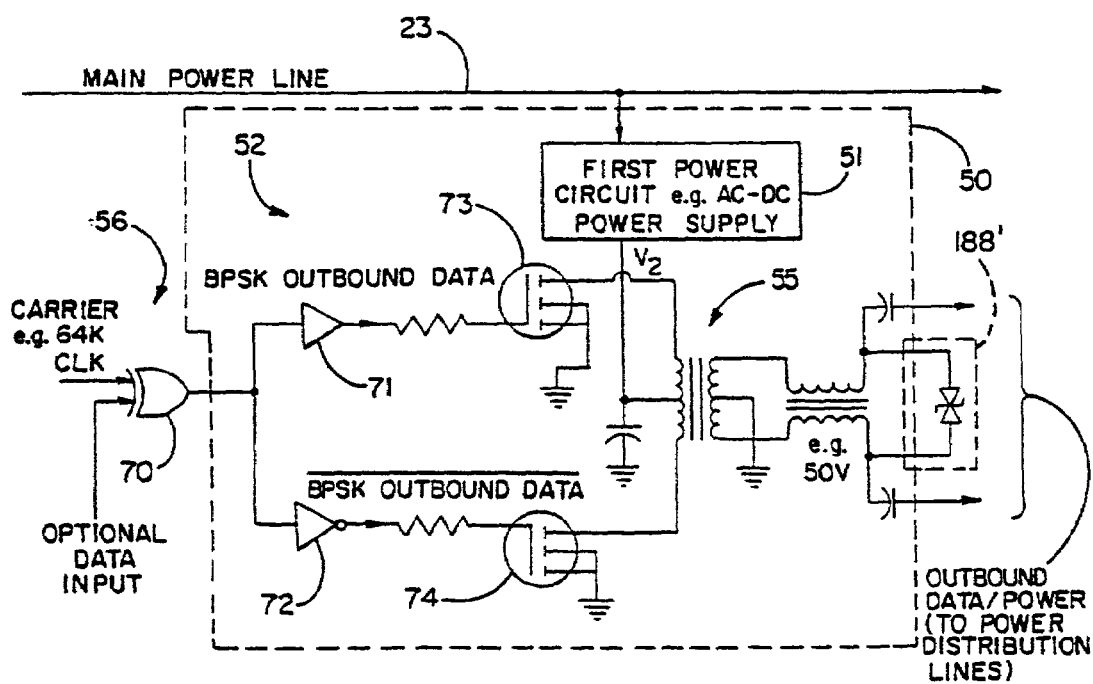
FIG. 9 is a partial block/partial circuit diagram of another embodiment of the underwater cable power conversion circuits.

In some embodiments, it may be desirable to limit the current supplied by the underwater cable power conversion circuits. In these embodiments, the current limiting function may be variously configured to be positioned at any location within the underwater cable power conversion circuits 50 and/or at other locations. In some of the preferred embodiments, the first power circuit 51 includes a DC current limiter which serves to limit the current supplied to the outbound data and/or power distribution lines. The second power conversion circuit 52 may receive a carrier clock signal directly or receive a carrier signal after modulation by an optional encoding circuit 56. If the encoding circuit 56 is utilized, the encoding circuit 56 preferably multiplexes data onto the power carrier signal input 54. Further, the encoder 56 may utilize one or more clock inputs to synchronize the data/power signals with one or more system clocks. One example of an encoding circuit is shown in FIG. 9 where the modulation scheme utilized is binary phase shift keying (BPSK). Accordingly, the encoder 56 may be implemented by an exclusive-OR (XOR) gate 70.

In embodiments, such as those shown in FIGS. 5–6, where power may be distributed to two power distribution lines respectively located in two adjacent cable segments, it may be preferable to include an additional second power circuit 52A in each of the underwater cable power conversion circuits 50. The second power circuit 52A may receive a carrier clock signal directly or after modulation by an optional encoding circuit 56A via carrier input 54A. The additional second power circuit 52A may output a power and/or data signal to one or more couplers and associated electrical devices 18 via a second set of power distribution lines.

The repeater circuits may receive operating voltages from V2 of the first power circuit, from one or more voltage regulators and/or from one or more DC-DC converters. Where the repeaters require multiple DC voltages, one or more DC-DC converters 53 may be optionally provided to supply one or more DC voltages V3, V4, or the first power circuit 51 may provide one or more DC voltages V3A, V4A.

The underwater cable power conversion circuit 50 may optionally include one or more transformers 55 to isolate the power conversion circuit 50 from the data/power distribution lines. In some of the preferred embodiments, the transformer 55 may also be utilized to increase the voltage on the data/power distribution line to facilitate power transfer along the cable segments 13. For example, it may be desirable to increase the voltage to between 10 and 400 volts, and preferably to between 15 and 200 volts, and even more preferably to between 30 and 100 volts, and most preferably to about 42 volts.

As the wire size of the data/power distribution lines becomes smaller (e.g. as the wire gauge increases), the voltage on the data/power distribution lines preferably increases in order to achieve the same efficiency. However, there may be a lower limit to how small a wire may be utilized before the voltage increases so much that the power distribution signal begins to couple to the remainder of the underwater cable electronics (particularly into the hydrophone circuits). In some of the preferred embodiments, a voltage of about 42 volts on the data/power distribution lines having a wire gauge of 26 AWG provides sufficient power transfer for up to about 3 watts, preferably about 1.4 watts to each of two devices, without adversely impacting other electronics in the underwater cable 2 and while maintaining a high power transfer efficiency.

The wire gauge for the main power line 23 and for the data/power distribution lines may be variously configured. For example, in exemplary embodiments the wire gauge on the main power line may be between 2 and 14 AWG, and preferably between 4 and 12 AWG, and even more preferably between 6 and 10 AWG and most preferably about 8 AWG. By contrast, the wire gauge for the data/power distribution lines may be between 20 and 36 AWG, and preferably between 22 and 32 AWG, and even more preferably between 24 and 30 AWG and most preferably about 26 AWG.

The underwater cable power conversion circuits 50 may be located in any suitable location in the power distribution and/or data communication system 20. In some embodiments it may be desirable to distribute the underwater cable power conversion circuits 50 along a cable segment in the underwater cable 2. For example, a power conversion circuit may be located in each repeater and/or each coupler.

Figure 8:
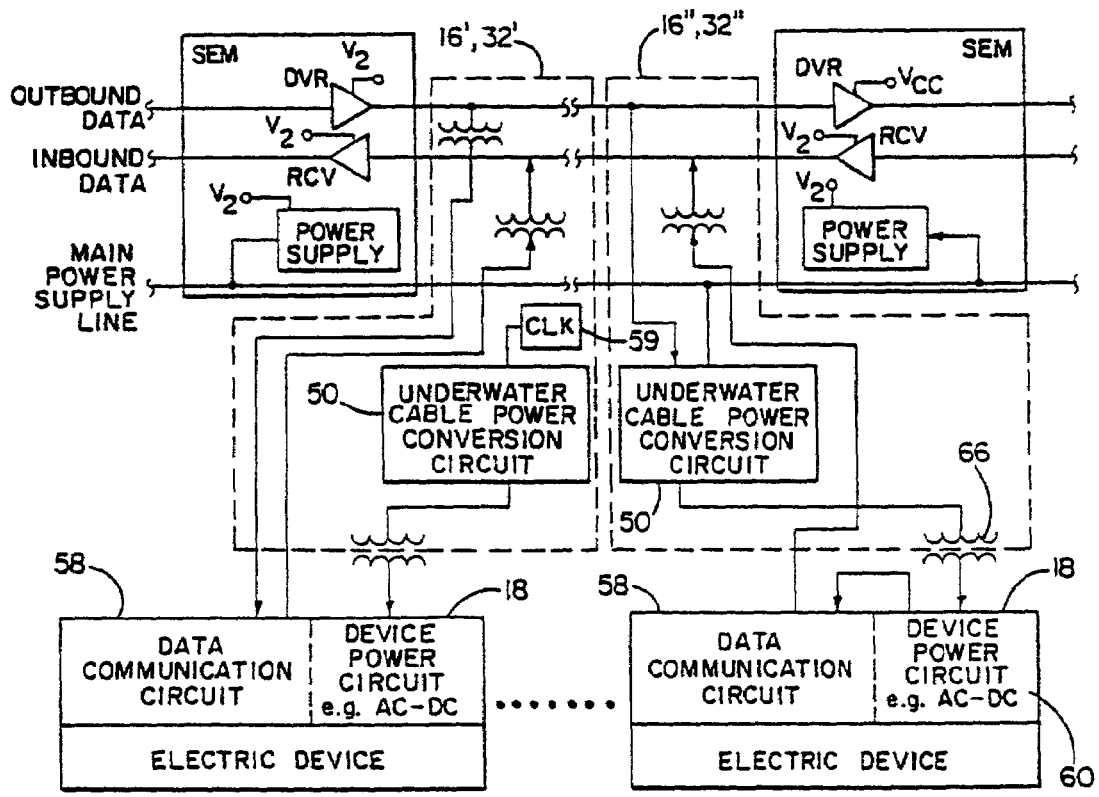
FIG. 8 is a block diagram of another embodiment of the underwater cable power conversion circuits.

In some embodiments, incorporating an underwater cable power conversion circuit 50 in each coupler 16, 32 may minimize noise in the underwater cable. FIG. 8 shows an embodiment where each coupler includes an underwater cable power conversion circuit 50. In the embodiment shown in FIG. 8, the couplers (e.g., first coupler 16', 32') may be configured as a three-inductor coupler where power, inbound data, and outbound data are coupled to an electrical device 18 using three different coils. The underwater cable power conversion circuits 50 in coupler 16', 32' may receive a clock from clock generator circuit 59 at the carrier input 54A. Thus, in this embodiment, the carrier frequency of the power transfer is preferably generated by the clock generator circuit and may be independent of the data transfer rate of inbound and outbound data. The clock generator circuit 59 may be any suitable circuit such as a crystal oscillator.

In the embodiment shown in FIG. 8, the couplers (e.g., second coupler 16", 32") may be configured as a two-inductor coupler where, for example, power and outbound data may be coupled to an electrical device 18 using a first coil and inbound data may be coupled to an electrical device 18 using a second coil. The carrier input 54 (not shown in FIG. 8) of the underwater cable power conversion circuits 50 in coupler 16", 32" may receive a signal directly from the outbound data line or indirectly through an encoder 56 (not shown). If data from the outbound data line is to be encoded via encoder 56, a carrier clock may be input into the encoder 56 from any suitable source such as a second clock generator circuit 59A (not shown).

Distributing the underwater cable power conversion circuits 50 to respective locations proximate to each of the electrical devices 18 has an advantage in that the amount of noise generated by the power transfer to the electrical devices 18 may be minimized. However, the configurations shown in FIG. 8 are less preferred in many environments due to space constraints within some coupler configurations which can make it difficult to include the power conversion circuits within the couplers without the use of custom integrated circuits.

FIG. 9 shows one embodiment of the underwater cable power conversion circuits 50. In this embodiment, the data input is shown being gated by XOR gate 70 with the power carrier clock. The output of the XOR gate may be input into the power conversion circuits 50. In embodiments where data is not modulated on the power signal, the unmodulated carrier signal may be input directly into the power conversion circuits.

The modulated or unmodulated carrier output from the XOR gate 70 is preferably input into inverting buffer 72 and non-inverting buffer 71 disposed within the power conversion circuits 50. In embodiments where data is not multiplexed onto the data/power distribution lines, the optional data input and XOR gate 70 may be omitted with the power carrier clock being input directly into inverting buffer 72 and non-inverting buffer 71. The output of the buffers 71, 72 control the switching of transistors 73, 74, which in turn, control the outbound data and/or power distribution signal on the data/power distribution lines.

Figure 10:
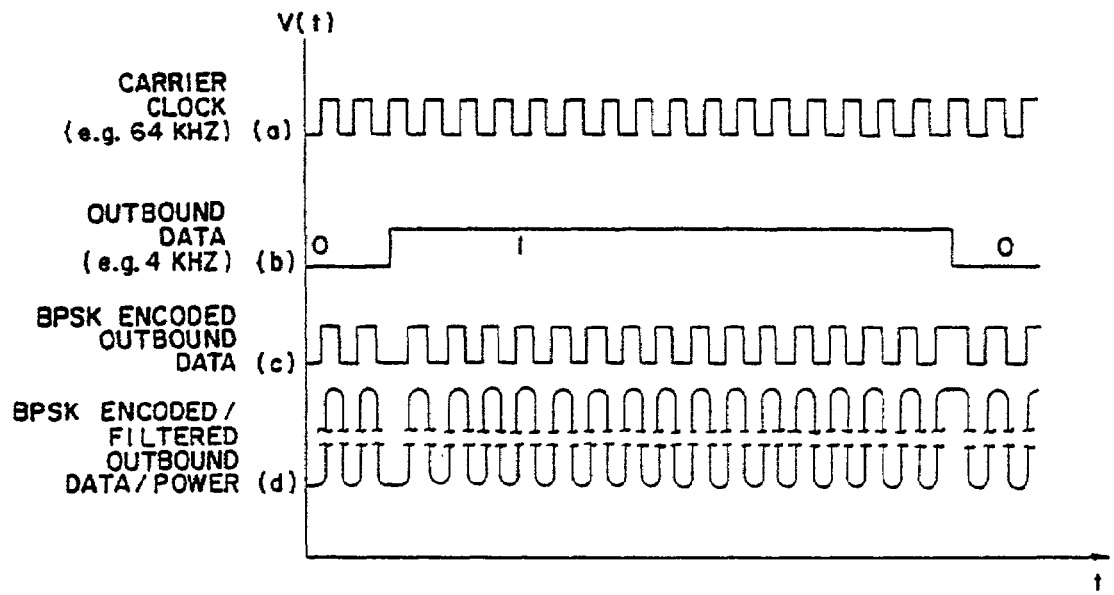
FIG. 10 is a timing diagram showing exemplary timing of an outbound data and power distribution line employing the power conversion circuits of FIG. 9.

FIG. 10 shows a timing diagram for the operation of one embodiment of the circuit shown in FIG. 9. In the illustrated embodiment, the power carrier clock has a frequency of 64 kHz (FIG. 10a). In preferred embodiments, the outbound data (e.g., data modulated by XOR gate 70) may be distributed at a lower frequency than the power carrier due to capacitive loading and other noise considerations. It was found that modulating the data onto the carrier using a data rate different from the carrier frequency band substantially improved the reliability of the system, particularly where data and power are transmitted along a data/power distribution line. Accordingly, data may be transferred at a rate of about one-half of the carrier frequency, and preferably about one-quarter of the carrier frequency and even more preferably about one-eighth of the carrier frequency, and most preferably about one-sixteenth of the carrier frequency or less. When data and power are transferred on the same line, transferring a data signal at a substantially lower bit rate than the center carrier frequency of a power signal provides for high power transfer efficiencies while maintaining reliable communications. In the illustrated embodiment, data is transferred at a rate of 4 kbps (FIG. 10b) which is one sixteenth of the carrier frequency of 64 kHz.

Power transfer efficiencies are influenced by a load resistance at the point along the data/power distribution lines where the power is extracted and by the capacitance of the line and the bandwidth of the signal. Due to capacitive coupling and a relatively high load resistance on the data/power distribution lines, the RC time constant of the outbound link may be relatively large. Accordingly, high power transfer efficiencies and reliable data transfer may be achieved where the ratio of data transfer rate to power transfer frequency is maintained at about 1:2 or less, and preferably about 1:4 or less and even more preferably about 1:8 or less, and most preferably about 1:16 or less.

One technique for transferring a data signal and a power signal on the same line is binary phase shift keying (BPSK). As shown in FIG. 9, the BPSK encoder may simply be an XOR gate such as XOR gate 70. An exemplary timing diagram of the output from the XOR gate 70 is shown in FIG. 10c. As shown in FIG. 10c, a change in the outbound data signal corresponds to a phase change of the BPSK signal. FIG. 10d shows one example of the outbound data/power signal output to the power distribution line(s) in each cable segment after encoding by the BPSK encoder 70. In some of the preferred embodiments, transformer 55 boosts the output voltage on the data/power distribution lines to about 42V.

Figure 11:
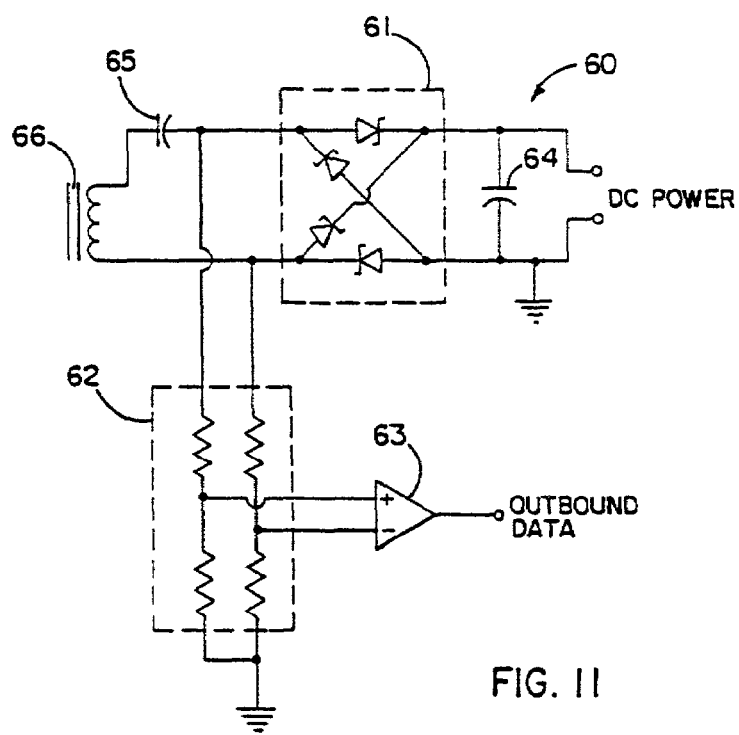
FIG. 11 is one embodiment of an electrical device power circuit and an electrical device decoder.

Referring to FIG. 11, when each of the electrical devices 18 are inductively coupled to the data/power distribution lines, the electrical devices preferably include an electrical device power circuit 60 for converting the AC signal received from couplers 16, 32 into a DC signal. Although the device power circuit may be variously configured, in the embodiment illustrated in FIG. 11, the device power circuit 60 includes a resonating capacitor 65, a full-wave bridge rectifier 61 for outputting a rectified signal, a low-pass filter (e.g., a smoothing capacitor 64) for filtering the rectified signal into a DC signal, and a voltage regulator (not shown) to regulate the DC signal at a desired voltage. One or more DC/DC converters (not shown) may optionally be included to provide DC outputs having differing voltages.

As shown in FIG. 11, where data is modulated onto the data/power distribution lines, it may be desirable to separate the outbound data signal from the power signal in the electrical device, for example, by using voltage divider 62 and comparator 63. The resonating capacitor 65 produces voltage square waves at the inputs of the full-wave bridge rectifier. These followed by the comparator produce a very reliable recovery of the data waveform. The outbound data signal may then be output to data communication circuits such as data encoders and decoders.

As discussed above, it may be preferable to transmit a power distribution signal on the data/power distribution lines utilizing an elevated voltage in order to enhance power transfer efficiency to the electrical devices 18 and particularly for inductively powering the wet units 30. However, this power transfer may produce noise which can have an adverse impact on other systems in the underwater cable such as the hydrophones 7.

It has been found that by limiting the bandwidth of the frequency spectrum of the power distribution signal on the data/power distribution lines to occupy a band which is different from, and preferably spaced from, the frequency band used by the hydrophones, significant improvements in the hydrophone signal-to-noise ratio can be achieved. Heretofore, this has been difficult to achieve while maintaining an adequate data communication bandwidth and a high efficiency power transfer. However, it has been found that these problems may be overcome by limiting the length of the data/power distribution lines and by employing a distributed filter along these lines.

When each cable segment is limited to about 500 meters or less, and preferably about 400 meters or less, and even more preferably about 300 meters or less, and most preferably about 200 meters or less, it is possible to treat each of the data/power distribution lines as a lumped parameter element and design an electric wave filter using elements distributed along the cable segment. Best results occur when the wavelength of the power distribution line is preferably no more than one tenth the wavelength of the power carrier signal. For example, where the data/power distribution lines are 200 meters in length, it is preferable for the power carrier signal to have a frequency of no greater than about 100 kHz. Under these conditions, a distributed filter can be constructed which limits the frequency spectrum of the power signal to be outside the hydrophone guard bands.

The longer the wire length, the lower the allowable frequency using a distributed filter technique. Lower frequencies have the undesirable effect of requiring bigger and heavier coil cores to achieve adequate power transfer.

Figure 12:
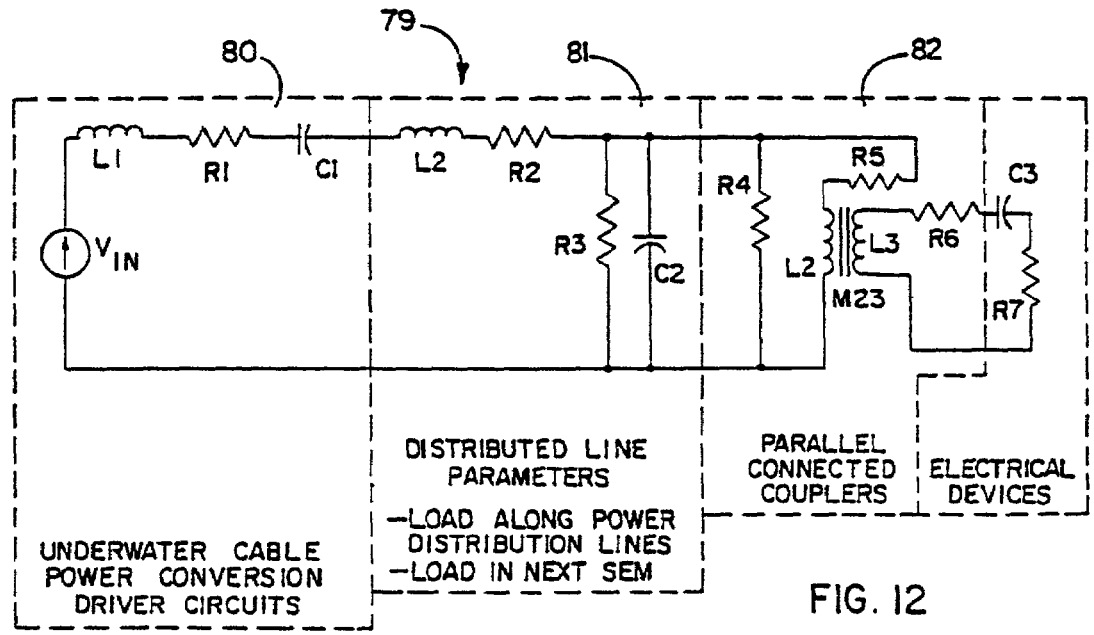
FIG. 12 is an equivalent circuit of one embodiment of the power distribution lines.

The power/data distribution lines, driver circuits, coupler transformers, and electrical device electronics are preferably operated as a tuned power transfer circuit. FIG. 12 shows a Thevenin equivalent circuit for one embodiment of a power transfer circuit 79 which includes the distributed filter technique discussed above. The equivalent circuit for one embodiment of an output or driver section of the underwater cable power conversion circuit 50 is designated as block 80. In the illustrated embodiment, the Thevenin equivalent circuit for the underwater cable power conversion driver circuits 80 includes voltage source $V_{in}$, an inductor L1, a resistor R1, and a capacitor C1. The inductor L1 and capacitor C1 are discrete components which may be utilized to adjust and improve the filter characteristics of the distributed filter. Resistor R1 represents the internal resistance of the inductor L1 and the other losses in the power conversion circuit 50. The equivalent circuit for one embodiment of the power distribution line is designated as block 81 and includes series connection of R2 and L2 followed by a parallel connection of C2, R3. The equivalent circuit for the parallel connected couplers (assuming all couplers are inductive) is designated by block 82 showing resistor R4 connected in parallel with a series circuit comprising resistor R5 and inductor L2, mutual inductance M23, inductor L3 and series resistor R6. The load includes resonating capacitor C3 and resistor R7. (See FIG. 12.)

Figure 13:
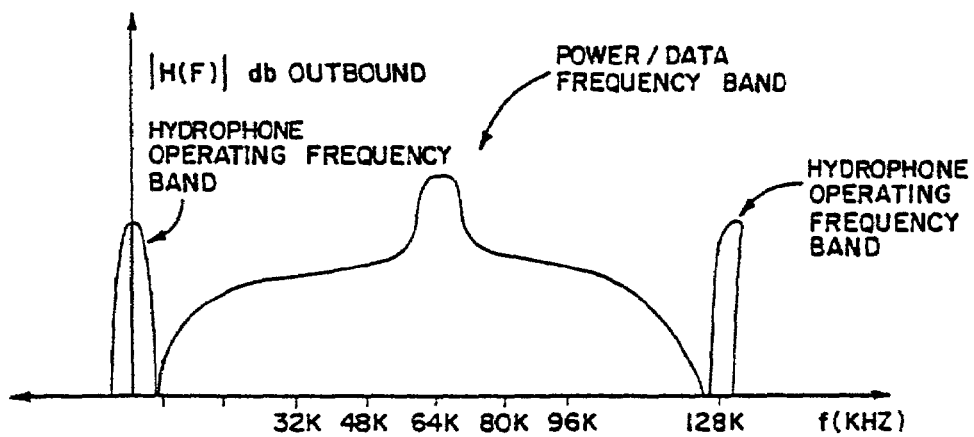
FIG. 13 is a frequency spectrum of the equivalent circuit shown in FIG. 12.

An important aspect of the power transfer circuit approximated by the Thevenin equivalent circuit shown in FIG. 12 is configuring the power transfer circuit to resonate at the carrier frequency of the power distribution signal and configuring the circuit to form a filter, preferably a bandpass filter, centered at the carrier frequency. One example of a frequency response of the power transfer circuit approximated by FIG. 12 is shown in FIG. 13. As shown in FIG. 13, by adjusting the lumped and distributed parameters of each power/data distribution line as well as the values of the discrete components L1, C1, L2, M23, L3, C3, a distributed bandpass filter may be constructed with a frequency band centered about the power distribution signal carrier frequency (e.g., 64 kHz) while maintaining a sufficiently sharp cut-off to avoid coupling any significant energy from the power distribution signal into the hydrophone operating frequency bands.

The outer sheath 15 of the underwater cable 2 may have a plastic jacket having a thickness of approximately one-eighth of an inch. Accordingly, a large core gap may exist in the transformers composed of couplers 16 and wet units 30. A conventional transformer has a coupling coefficient of about 0.98 or better. However, transformers utilized to couple the power/data distribution lines and the wet units 30 may have a coupling coefficient of as low as 0.1 or lower. It was found that if the data/power distribution lines are designed as an electric wave filter, e.g., a three-resonator bandpass filter, it is possible to incorporate the transformer into the filter and thus to increase the power transfer efficiencies between the power/data distribution lines and the wet units 30. Again referring to FIG. 13, the three-section bandpass filter may, for example, have a center frequency of 64 kHz and a two sided bandwidth of 8 kHz. In this configuration, the data/power distribution lines will transmit 4 kbps BPSK data on a 64 kHz carrier without distortion.

The right hand portion of FIG. 13 shows an exemplary frequency band in which the plurality of hydrophones operate (often referred to as the forbidden bands). The forbidden bands may be variously configured to include one or more frequency bands, preferably distinct and/or spaced from the frequency band of the distribution lines. In one exemplary embodiment, the forbidden bands reserved for hydrophone operations are the integer multiples of 128 kHz with 500 Hz guard bands. Accordingly, in such a system it is desirable to configure the frequency band of the power distribution signal and the data signal to avoid the frequency bands used for hydrophone operations. The three-section bandpass filter may be designed to reduce the signal energy in these bands to a predetermined low level.

Wire utilized for the data/power distribution lines in each cable segment is preferably a low loss cable having a dissipation factor maintained within low tolerances. The low loss cable preferably is configured to have a capacitance specified to tune the power transfer circuit, to control the frequency band of the filter, and to minimize power loss in the data/power distribution lines due to capacitive coupling to other portions of the underwater cable 2.

Typically, the underwater cable 2 may be filled with a lossy dielectric material. By a lossy dielectric material it is meant that the material has a dissipation factor of about 0.01 or greater including, for example, about 0.1 or greater. The lossy dielectric material may be a petroleum based material such as an isoparaffin solvent (e.g., kerosene), a wax, a liquid, and/or a solid plastic material. If the lossy dielectric material is a liquid, it is preferred to have an outer sheath 15 disposed about the underwater cable 2 to contain the liquid. If the lossy dielectric material is a solid, the outer sheath may be formed of the solid material and the solid material may extend throughout the underwater cable 2.

The lossy dielectric material is typically utilized in an underwater cable to provide buoyancy. Any liquid, solid, or semi-solid lossy dielectric material that is less dense than seawater will suffice to adjust the buoyancy of the underwater cable 2. One problem with distributing power through a lossy dielectric material is that the lossy dielectric has a large relative permittivity. For example, an isoparaffin solvent may have a relative permittivity of about 3. Thus, by filling the underwater cable with a lossy dielectric having, a relative permittivity of, for example, 0.1, 1.0, 2.0, 3.0, 10.0 or more, the capacitance of the data/power distribution lines may be changed. Research has shown that even with excellent insulation disposed on the power distribution line, the loss due to the lossy dielectric may be prohibitively large, particularly when using twisted pair wires, high voltages, and high frequencies. In many embodiments, it was found that the presence of the lossy dielectric caused the efficiency of the data/power distribution lines to be degraded to an inoperable level.

Figure 14:
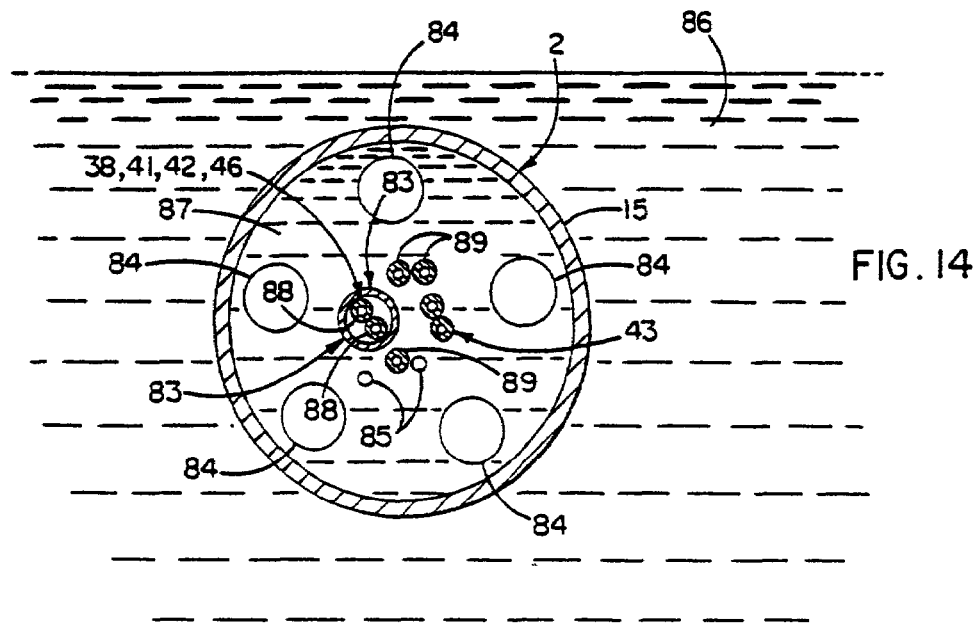
FIG. 14 is a traverse cross sectional view of the underwater cable.
Figure 15:
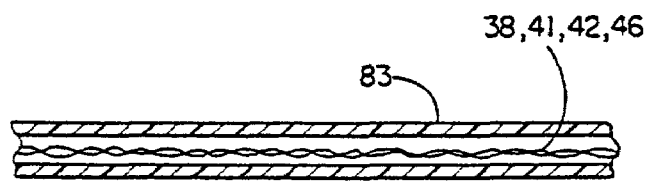
FIG. 15 is a longitudinal cross sectional view of a power distribution line for use in the underwater cable.

Research demonstrated that this problem may be overcome by placing an outer plastic jacket or sheath around the insulated power distribution line. For example, where the data/power distribution lines are insulated twisted pairs wires, an outer sheath may be disposed around the insulated twisted pairs. Referring to FIGS. 14 and 15, the underwater cable 2 is shown disposed underwater 86 and filled with a lossy dielectric material 87. In some embodiments, the underwater cable 2 may include a number of support or stiffening cables 84, fiber optic cables 85 and/or electric cables 89 (e.g., main power line 23) in addition to an inbound data distribution line 43 and an outbound power/data distribution line 38, 41, 42, 46. In some embodiments, the stiffening cables 84 may be configured to transmit main power to replace and/or supplement main power line 23. In preferred embodiments, an outer jacket or outer sheath 83 (preferably plastic) is disposed about the power/data distribution lines which are formed from a twisted pair wire where each wire is itself insulated using a sheath 88.

In some of the preferred embodiments, the outer sheath 83 may not be placed around data lines such as inbound data distribution line 43. In many applications, there may be no need for a low loss cable or a jacketed cable on the inbound data distribution lines because these lines are typically terminated with a low resistance and because capacitance typically does not have to be controlled to the same level as when power is being distributed. Thus, a significant reduction in cost can be achieved while still maintaining highly reliable data transfers on the inbound data distribution lines.

FIG. 15 shows a longitudinal cross section of the data/power distribution lines 38, 41, 42, 46 including the outer jacket 83. In preferred embodiments, the power/data distribution lines with the outer jacket 83 have a dissipation factor D less than about 0.01 and preferably less than about 0.008, and more preferably less than about 0.006, and even more preferably less than about 0.004, and most preferably about 0.002 or less when surrounded by the lossy dielectric material. The outer jacket 83 is preferably configured to space the lossy dielectric a sufficient distance from the power/data distribution lines such that most of the electric flux lines stay inside the outer jacket 83 and do not stray into the lossy dielectric where losses may be generated. This further prevents an increase of line capacitance due to the high relative permittivity of the lossy dielectric material.

The coupling loss coefficient for the data/power distribution lines may also be determined such that the above described distributed filter produces the desired filtering characteristics since specifying the thickness of the insulation also determines the capacitance. The power distribution lines are typically specified in henrys per meter and farads per meter. To achieve a highly reliable filter, in some of the preferred embodiments, the cable capacitance may be controlled to within about ±5% tolerance so that the power transfer circuit remains tuned and the filter remains centered at the carrier frequency of the power distribution signal.

Experiments have demonstrated that distributing power to the electrical devices 18 over twisted pair wires disposed in an outer jacket is highly efficient, and especially where the power distribution signal includes relatively high voltages and relatively high frequencies. It has been found that the outer jacket 83 disposed over the twisted pair power distribution line, remarkably increases the power transfer efficiency particularly when the data/power distribution lines form a tuned power transfer circuit. The data/power distribution lines are preferably configured to include both an outer jacket 83 and insulation 88 on the twisted pair wires themselves. Further, the outer jacket 83 is preferably a low loss cable jacket such that each power/data distribution line has a low dissipation factor D as discussed above. Conventionally, jacketed/insulated low-loss twisted cables have not been utilized to distribute power to electrical devices in underwater cables.

Extensive problems exist for inductive couplers disposed in underwater cables. For example, the underwater cable 2 has limited area to accommodate the inductive coils due to numerous support, electrical, and optical cables as well as electrical devices 18 disposed within the underwater cable 2. Although certain coil core materials are preferable from an electromagnetic perspective, these core materials have been found to be prohibitively brittle. A brittle core may cause reliability problems when the underwater cable 2 is retrieved and rolled up over one or more steel rollers 9 on the survey vessel 8. Further, alignment problems often occur as the couplers are assembled and disassembled in the field. For example, the core in the underwater cable may be misaligned with the core in the wet unit. An alignment problem can often severely reduce the coupling coefficient of the coupler. Additionally, where more than one coil is associated with a particular coupler, cross-talk among the coils was found to be a problem. Further still, even a single coil may couple into the hydrophone lines and adversely affect other underwater cable systems. Accordingly, substantial research was directed toward defining high efficiency inductive couplers suitable for use in providing operational power to electrical devices 18 disposed in underwater seismic cables.

Figure 16:
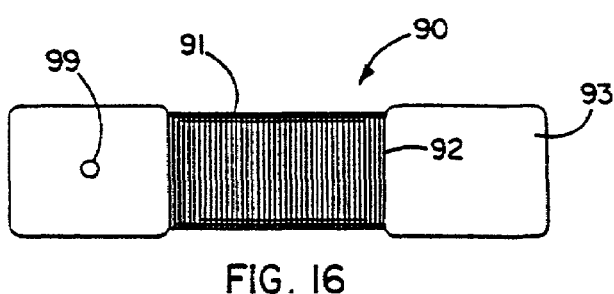
FIG. 16 is a top view of a coil for use in an underwater cable coupler.
Figure 17:
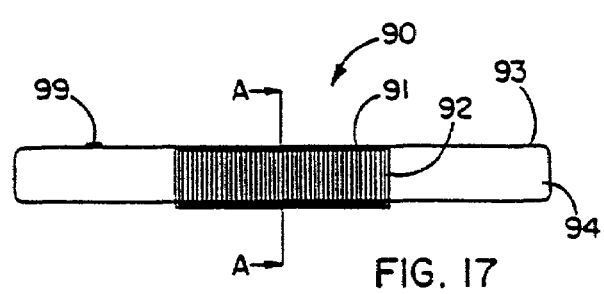
FIG. 17 is a side view of the coil of FIG. 16.
Figure 18:
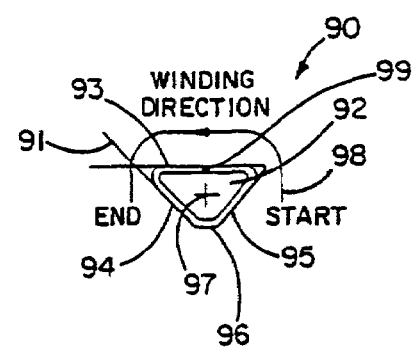
FIG. 18 is a cross sectional view of the coil of FIG. 16.

Referring to FIGS. 16–18, a first preferred embodiment of an inductive coupling coil 90 for use in the couplers is shown. As shown in FIG. 18, the inductive coupling coil 90 has a substantially triangular-shaped cross section and a winding 91 wound around at least a portion of the substantially triangular-shaped core 92. In some embodiments, it may be desirable to include a truncated portion 96 on one or more points of the substantially triangular-shaped core 92.

The substantially triangular-shaped core 92 preferably has first, second, and third substantially planar surfaces 93, 94, and 95. The first planar surface may be substantially larger than the second or third planar surfaces. The first planar surface 93 preferably is disposed facing the exterior of the underwater cable 2 abutting the outer sheath 15. The coupling coil 90 is preferably disposed with a longitudinal axis 97 disposed in parallel with the longitudinal axis of the underwater cable 2 such that the first substantially planar surface is disposed longitudinally along the underwater cable 2. In exemplary embodiments, it may be desirable for the first planar surface 93 to have a rounded shape such that the first planar surface is contoured to about the same curvature as the inner surface of the underwater cable 2. Further, the second and third surfaces 94, 95 may be substantially flat.

The winding direction 98 and configuration of the coils is preferably precisely specified. Precise windings of the coils may minimize cross-talk when two or more coils are placed in close proximity, increase power transfer efficiencies, and minimize inductive coupling to the hydrophone electromagnetic system. These precise windings may be particularly important in underwater seismic cables where operational power is inductively coupled to the wet units 30.

Substantial research has been directed at determining an optimal inductor/coil core configuration. Referring to FIG. 17, paint dot 99 indicates the coil orientation with regard to cross section A—A shown in FIG. 18. FIG. 18 illustrates a winding direction 98 of the coils. In exemplary embodiments, the winding direction of each coil is preferably the same (either clockwise or counter clockwise) with respect to paint dot 99 in order to facilitate correct installation.

Figure 19:
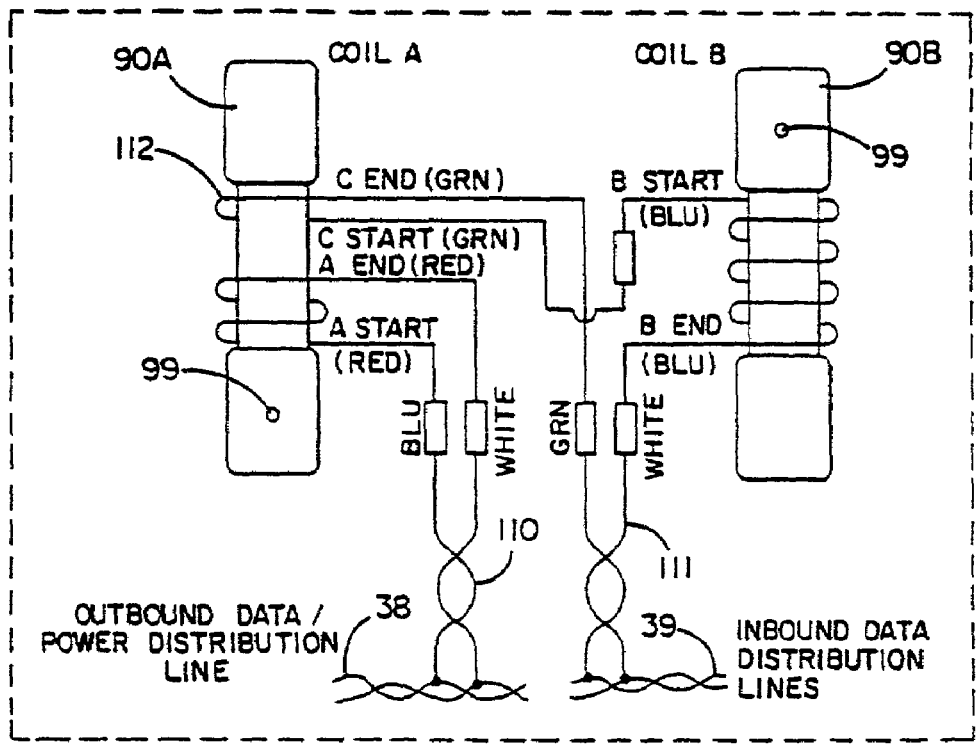
FIG. 19 is a circuit/block diagram of coils for use in a coupler in the underwater cable.

As shown in FIG. 19, it may be desirable to include two or more coils in close proximity to each other. In this embodiment, coil A 90A may be utilized, for example, for transferring outbound data/power to a wet unit 30 and coil B 90B may be used, for example, for transferring inbound data from a wet unit 30. Paint dot 99 may be utilized as a reference point to illustrate that it is desirable for the windings of coils A and B to be in opposite directions for controlling cross-talk. For example, the windings of coil A 90A are in the clockwise direction while the windings of coil B 90B are in the counter clockwise direction.

In preferred embodiments, each coupler 16, 32 includes an outbound data/power tap wire 110 for connecting the coupler to the outbound data/power distribution line 38 and an inbound data tap wire 111 for connecting the coupler 16, 32 to the inbound data distribution line 39. Each tap wire may have larger, smaller, or the same wire size as an associated distribution line. In exemplary embodiments, the tap wires 110, 111 have a wire size that is smaller than the distribution lines 38, 39. In preferred embodiments the wire gauge may differ by one, two, or more AWG. In some of the more preferred embodiments, each tap wire is smaller than an associated distribution line.

The inbound data tap wire 111 is preferably coupled to wire wound around the core of coil B 90B and designated blue wire BLU. Although the windings of coil B 90B may be variously configured, the winding wire is preferably wire having a wire gauge of 26 AWG or greater, and preferably 28 AWG or greater, and more preferably 30 AWG or greater, and most preferably about 32 AWG. The number of turns of blue wire BLU may be variously configured to match the frequency of the data transferred across this coil. In some of the preferred embodiments where the inbound data is transferred at 64 kHz, the blue wire BLU preferably has about 353 turns.

The outbound data/power tap wire 110 is preferably coupled to wire wound around the core of coil A 90A and designated red wire RED. Although the windings of coil A 90A may be variously configured, the winding wire is preferably wire having a wire gauge of 26 AWG or greater, and preferably 28 AWG or greater, and more preferably about 30 AWG. The number of turns of red wire RED may be variously configured to match the frequency of the data/power transferred through this coil. In some of the preferred embodiments the red wire RED has about 158 turns.

Under certain circumstances, the power transferred to the wet units 30 may still couple into the data distribution lines. However, it was found that this problem may be alleviated by including a bucking coil 112 (green wire GRN) electrically connected between the blue coil and the inbound data tap wire 111 and physically wound around the core of coil A 90A. Although the bucking coil may be variously configured, the winding wire is preferably wire having a wire gauge of 26 AWG or greater, and preferably 28 AWG or greater, and more preferably about 30 AWG. The number of turns of green wire GRN may be matched to the anticipated electromagnetic coupling between the two signals on Coil A 90A and Coil B 90B, but is preferably about 21 turns. In general, a bucking coil results where each coupler includes a first coil connected to a first line (e.g., an outbound data and/or power distribution line) and second and third coils connected to a second line (e.g., an inbound data distribution line), where the first and second coils are spaced from each other (typically wound around separate coil cores) and where the first and third coil are in close proximity (typically wound around the same core) for controlling cross-talk between the first and second coils as well as the first and second lines.

Figure 20:
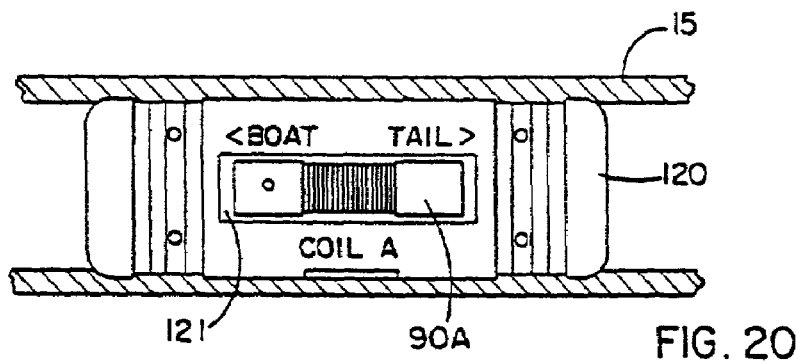
FIG. 20 is a partial cross sectional view of a first side of a coil housing for use in a coupler in the underwater cable.
Figure 21:
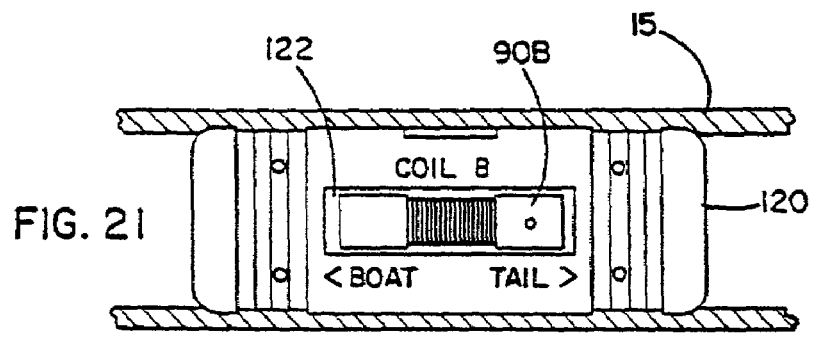
FIG. 21 is a partial cross sectional view of a second side of a coil housing for use in a coupler in the underwater cable.

In many embodiments, the cores of the coil may be brittle. Accordingly, it was found that the reliability of the underwater cable can be remarkably improved by disposing the coils (e.g., coils 90A, 90B) in a housing. Referring to FIG. 20, a cut-away side view of a portion of the underwater cable 2 shows coil A 90A disposed in a first pocket 121 of a housing 120. Similarly, FIG. 21 shows a rotated cut-away side view of the same portion of the underwater cable 2 with the coil B 90B disposed in a second pocket 122 of the housing 120. The housing 120 is preferably formed of a substantially rigid material such as a plastic or metal alloy which has sufficient structural integrity to protect the coils 90A, 90B.

The pockets 121, 122 may be variously configured. In some embodiments, the pockets 121, 122 may fit tightly against the coils 90A, 90B. However, in some of the preferred embodiments, the pockets are slightly larger than the coils 90A, 90B to permit some flexing of the housing 120 without adversely affecting the reliability of the coils 90A, 90B. The pockets may be sealed from the remainder of the underwater cable. Further, the pockets may be filled with any suitable cushioning material such as a foam, high viscosity oil, grease, gel and/or other spongy substance. It may be desirable to configure the cushioning material to urge and/or position the coils toward the outer sheath 15 of the underwater cable to minimize the gap between coils 90A, 90B and coils 129, 130, respectively. In embodiments where the underwater cable 2 is filled with a liquid lossy dielectric material 87 (e.g. kerosene), the pockets 121, 122 may be in fluid communication with the liquid lossy dielectric material 87 or, more preferably, sealed from the lossy dielectric material.

As the underwater cable 2 is rolled up onto the survey vessel 8 and over one or more steel rollers 9, tremendous forces are exerted on the underwater cable 2. The housing 120 disposed about the coils 90A, 90B may protect the brittle core 92 from breaking. In some embodiments, the coils 90A, 90B may be designed to float within the first and second pockets 121, 122, respectively. By floating, it is meant that the coils are not rigidly connected to the housing 120. In these embodiments, even where the forces are sufficient to cause the housing 120 to flex, the core 92 may remain intact because the core floats (i.e., is not fixedly attached) within the pockets 121, 122 in housing 120.

Figure 22:
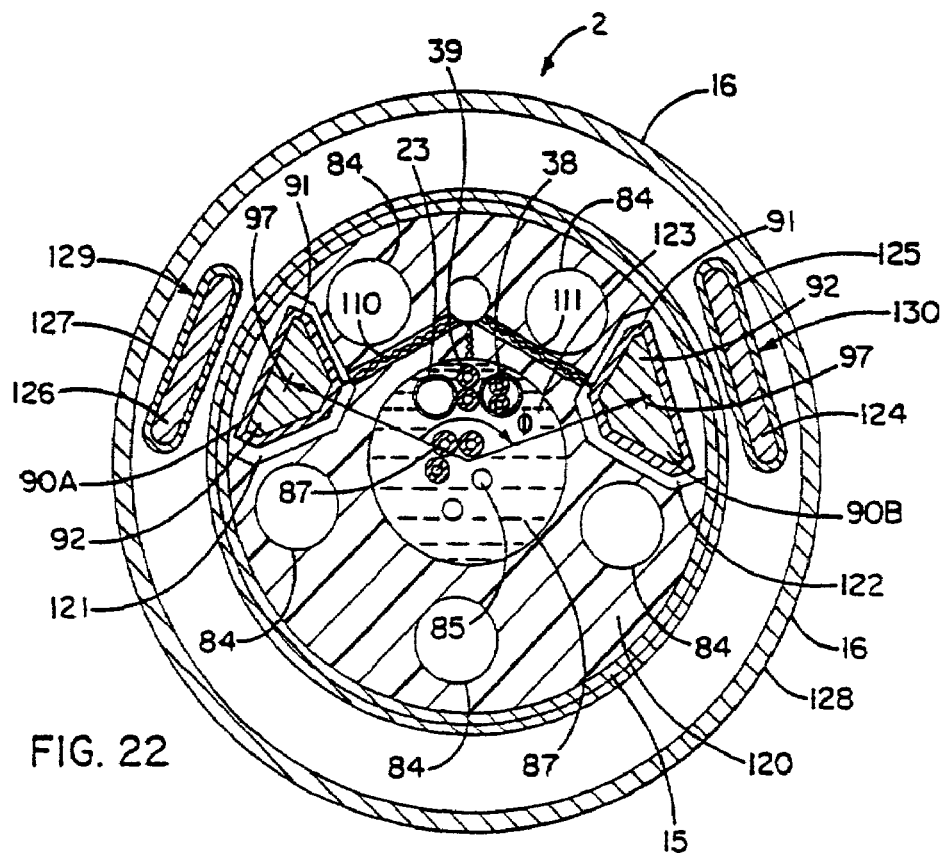
FIG. 22 is a traverse cross sectional view of the underwater cable including a coupler and a coil housing disposed within the coupler.

FIG. 22 shows a traverse cross-sectional view of the underwater cable 2 including the sheath 15, the coil housing 120, and a wet unit housing 128. First and second coils 129, 130 are respectively disposed in the wet unit housing 128 opposed to the coils 90A, 90B disposed in the coil housing 120. The first coil 129 preferably includes a winding 127 disposed about a core 126. Similarly, the second coil 130 preferably includes a winding 125 disposed about a core 124. In some of the preferred embodiments, the cores 124, 126 are elongated and disposed longitudinally in the underwater cable in a similar fashion as coils 90A, 90B.

Details of the wet unit housing 128, the coil housing 120, and the coupler 116 are provided in one or more of U.S. Provisional Applications No. 60/004,203, filed Sep. 22, 1995; 60/004,209, filed Sep. 22, 1995; 60/005,500, filed Sep. 22, 1995; 60/004,493, filed Sep. 22, 1995; 60/004,494, filed Sep. 22, 1995 and in co-pending International Application entitled Underwater Cable Arrangement by Andre W. Olivier, Brien G. Rau, and Robert E. Rouquette, filed on the same day as the present International Application and herein incorporated by reference.

The coils 90A, 90B may be separated by any radial angle ö 123. Electrically, an angle of 180 degrees provides the optimum noise immunity between the coils. However, in some embodiments which include an odd number of stiffening and/or power cables such as the five cables 84 shown in FIG. 22, another angle may be preferred. In the illustrated embodiment, an angle of about 144 degrees is utilized and found to provide the greatest noise immunity while providing the highest coupling coefficients and/or minimal core sizes for use with five stiffening and/or power cables 84. Further, where the wet unit housing includes two halves, an angle of about 144 degrees between the coils may allow both coils to be disposed in the same half of the wet unit housing.

One problem with conventional core configurations is that the coils can not tolerate any substantial misalignment between the coils in the underwater cable 2 and the coils in the wet unit housing 128. Experimentally, it has been found that a coil will typically tolerate a misalignment that is equal to about the width of the pole face and a longitudinal misalignment that is equal to about the length of the pole face. Accordingly, the geometry of the coils shown in FIGS. 16–18 has been configured to have a relatively large outer face 93 to allow substantial misalignment, e.g., up to half an inch (1.25 cm) or more, without detuning the circuit powering the coils. The wet units may then be fitted with couplers which can maintain a precision of plus or minus half an inch. In this configuration, the inductances may not change by more than about 6%, and hence the distributed filters and tuned circuit are maintained within operating tolerances. The power transfer circuit may be configured so that when the inductances change by about 6%, the overall filter tune changes by only about 3% (i.e., one over the square root of LC). Further, because the power transfer circuit is a resonant circuit, the waveforms change but the power transferred to the loads normally does not decrease. Hence, the relatively wide, substantially flat faced coil configurations and particularly the triangular shaped coils have demonstrated excellent reliability and power transfer efficiencies.

Figure 23:
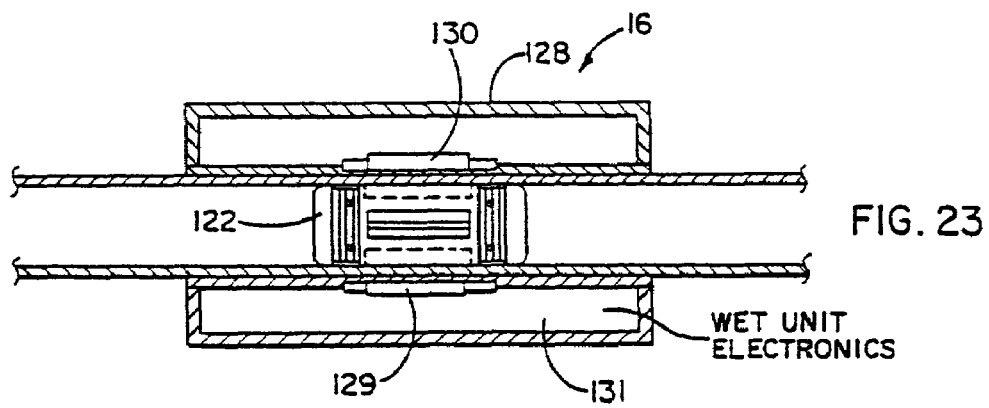
FIG. 23 is a partial longitudinal cross sectional view of an embodiment of the underwater cable including a coupler and a coil housing disposed within the coupler.
Figure 24:
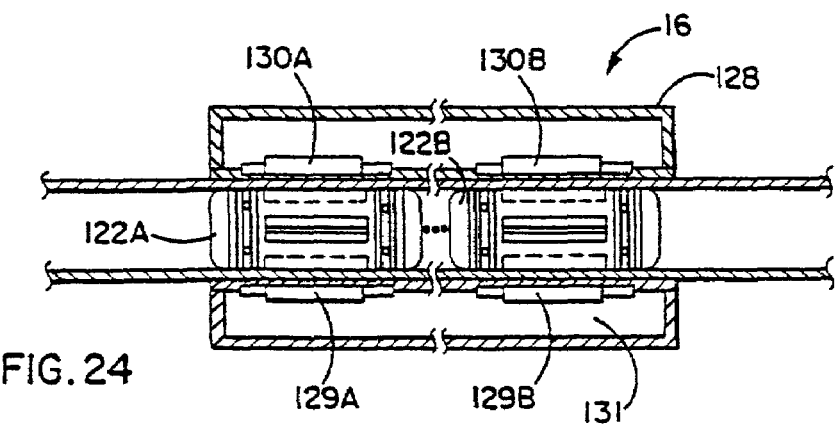
FIG. 24 is a partial longitudinal cross sectional view of another embodiment of the underwater cable including a coupler and a plurality of coil housings disposed within the coupler.

A longitudinally sectioned view of the underwater cable 2 having a single coil housing 122 disposed in coupler 16 is shown in FIG. 23. However, the couplers 16 are not limited to this configuration and may be variously configured to include any number of coil housings. For example, FIG. 24 shows a longitudinal cross-sectional view of a coupler 16 having a plurality of coil housings 122A, 122B associated with a wet unit housing 128. FIGS. 23 and 24 show one or more chambers 131 within the wet unit housing 128 which may include the electronics for operation of the electrical devices 18.

FIG. 25 shows another embodiment of the coupler 16 in which the wet unit housing 128 includes a plurality of coils 129A–129G. As with previous embodiments, coils 129A–129G may include cores 126A–126G and windings 127A–127G, respectively. Any number of coils may be utilized as, for example, three, four, five, six, seven, eight, nine, ten, eleven, twelve, thirteen, fourteen, fifteen, or more. In the illustrated embodiment, seven coils are utilized in the wet unit housing 128.

The embodiment shown in FIG. 25 may be advantageous in that the housing 128 may be coupled to the underwater cable 2 in any circumferential orientation without significantly impacting the power transfer efficiency between the underwater cable and the wet unit 30. This arrangement may be particularly useful where the coils 126A–126G within the wet unit 30 rotate with respect to the underwater cable 2. To achieve complete rotational tolerance, the coils in the housing 128 are preferably spaced such that the distance between adjacent coils (e.g., between coil 129A and 129B) is less than the circumferential width of the pole face of coils 90A, 90B.

Where a plurality of coils are utilized, it may be desirable to include a semi-solid or completely solid wet unit housing 128 in the area near the coils 129A–129G to provide added support.

The electrical connection between the coils 129A–129G shown in FIG. 25 may be variously configured. For example, FIG. 26 illustrates one embodiment where the electrical coils are all coupled to a multi-input full-wave bridge rectifier 135 which includes diodes D1A–D1G, D2A–D2G, D3, and D4. A filter capacitor 131 is coupled to the output of the multi-input full-wave bridge rectifier 135. A DC voltage 138 output from filter capacitor 131 is preferably supplied to, for example, voltage regulators (not shown) for supplying DC power to associated wet unit electronics. Outbound data may be extracted using voltage divider 133 and comparator 134. Inbound data may be coupled to the plurality of coils 129A–129G by incorporating a plurality of second windings 139A–139G.

Figure 27:
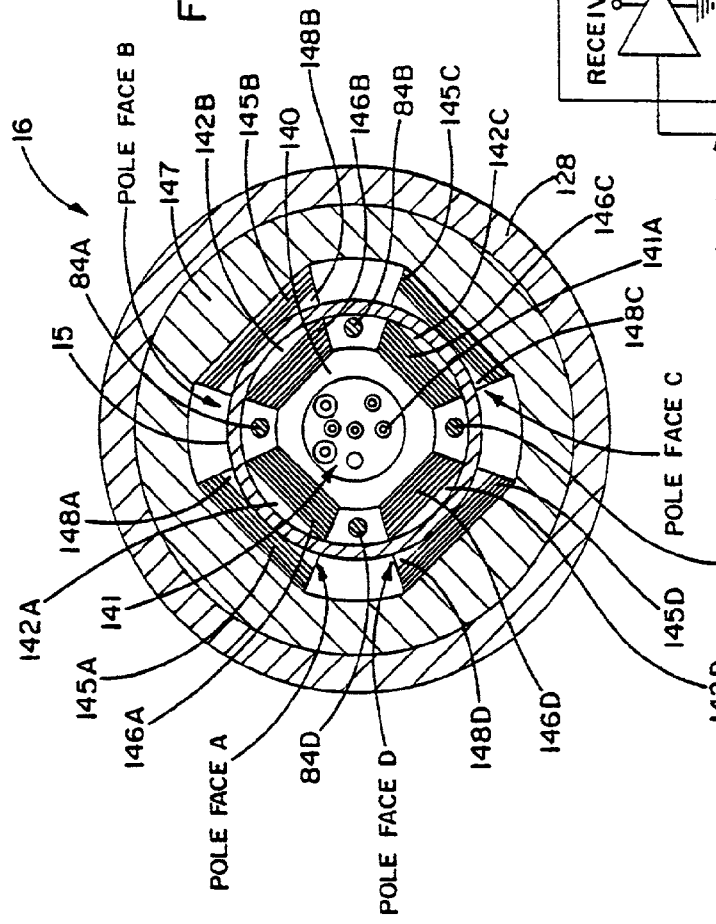
FIG. 27 is a traverse cross sectional view of another embodiment the underwater cable including a coupler and a first coil having an integral core disposed within the underwater cable sheath and a second coil having an integral core disposed about the underwater cable sheath.

Referring to FIG. 27, another alternate embodiment of the coupler 16 is shown where the underwater cable 2 includes, for example, an inner integral core 140 disposed in the outer sheath 15 and the electric device 18 includes, for example, an outer integral core 147 disposed about the outer sheath 15. The outer integral core 147 may be disposed in a wet unit housing 128 to cushion and protect the outer integral core 147 within the coupler 16. The inner integral core 140 preferably includes a hollow passage 141 having, for example, a plurality of fiber optic and electrical lines 141A passing therethrough.

The inner and outer integral cores 140, 147 may each include a plurality of extending sections around which a plurality of coils may be disposed. In the embodiment illustrated in FIG. 27, the inner integral core 140 includes four windings 146A–146D disposed about four extending sections 142A–142D which extend outward from and are integral with the inner integral core 140. Similarly, the outer integral core 147 shown in FIG. 27 includes four windings 145A–145D disposed about four extending sections 148A–148D which may extend inwardly from and are integral with the outer integral core 147. The inner and outer extending sections 142A/148A, 142B/148B, 142C/148C, 142D/148D oppose each other and respectively form pole faces 1–4.

In exemplary embodiments as shown in FIG. 27, the inner integral core extending sections 142A–142D and/or the outer integral core extending sections 148A–148D may be contoured to match the curvature of the underwater cable 2 to increase the coupling coefficient. The extending portions may also be in the form of a truncated triangle with a curved outer surface abutting the outer sheath 15 of the underwater cable 2.

In many applications, the coils shown in FIG. 27 may be advantageous over conventional coils because the geometry of the coupler allows a relatively large pole face area. Thus, this flux line configuration allows for excellent coupling between coils in the underwater cable 2 and coils in the wet units 18.

The integral core 140 may include any number of extending sections (e.g., from 2 to 20) depending on the number of wires to be wound around each extending section. Where the integral core has only a single wire wound around each extending section, then the integral cores may utilize any even number of extending sections. Where each winding 145A–145D, 146A–146D includes two or more wires, it is preferable to dispose four, eight, sixteen, or more extending sections about the integral core.

For example, an integral core having four extending sections allows up to three wires to be wound around each of the extending sections in a manner which cancels the mutual coupling among the windings such that multiple signals may be passed using a single integral core.

Figure 28:
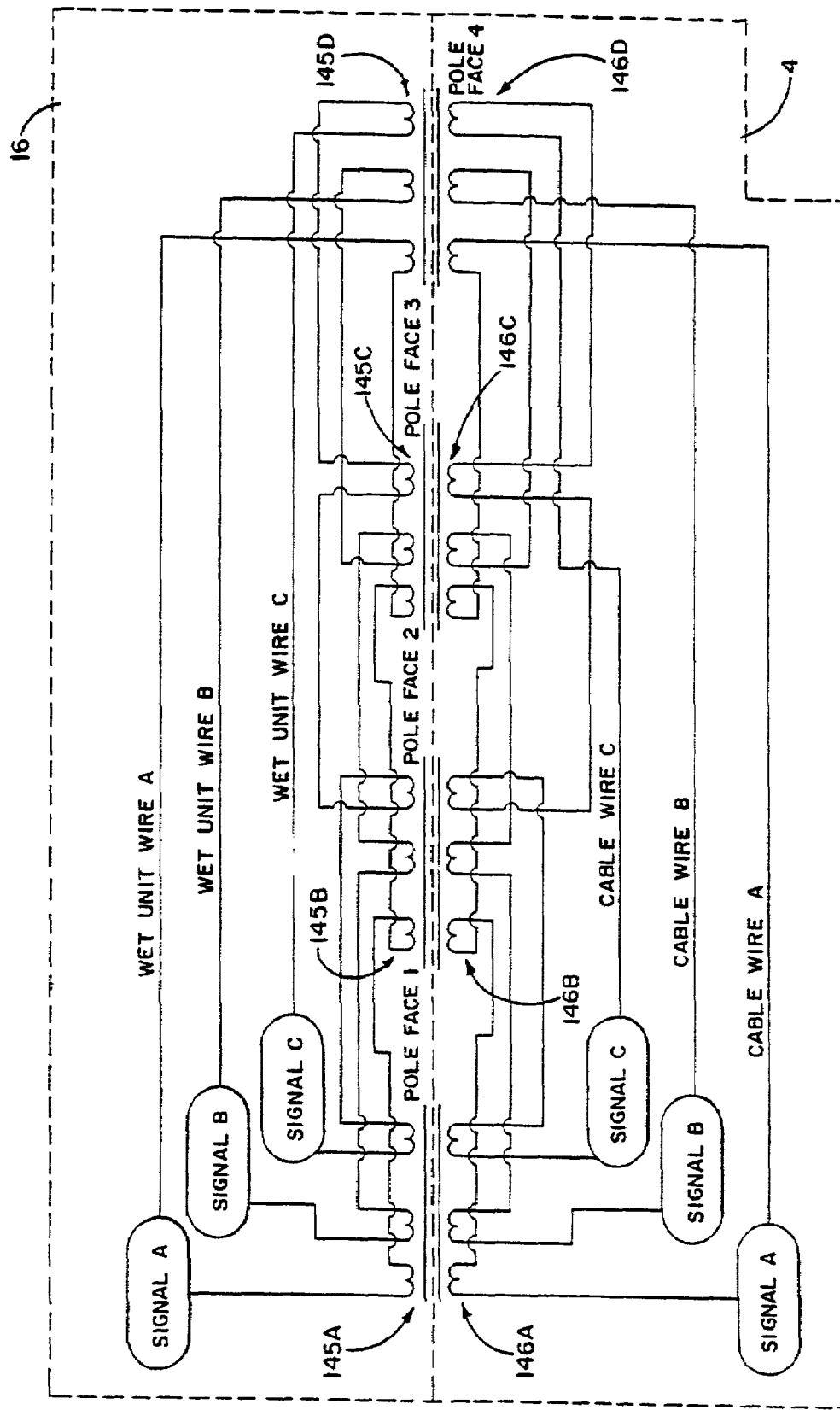
FIG. 28 is a circuit diagram of circuits which may be utilized with couplers having an integral core.

For example, FIG. 28 shows a circuit diagram of a three-wire, four-pole face configuration which is configured for canceling and/or controlling the mutual inductance between the wires. In the illustrated embodiment, for each pole face, the windings in the underwater cable 2 portion and in the wet unit 30 portion of the couplers 16 are the same. For example, wire A may have windings on the first and fourth pole faces wound in a first direction (either clockwise or counter clockwise) and windings on the second and third pole faces wound in an opposite direction in both the underwater cable portion and the wet unit portion of the couplers 16. Wire B may have windings on pole faces one and two wound in a first direction and the windings on pole face three and four wound in the opposite direction. In this manner, the configuration of the windings of wire B cancel any mutual coupling of signal B to wire A. Similarly, wire C may have windings on pole faces one and three wound in a first direction and the windings on pole faces two and four wound in the opposite direction. In this manner, the configuration of the windings of wire C cancel any mutual coupling of signal C which may be coupled to wires A and B. The winding directions allow for mutually orthogonal signals where half of the windings add signals and half of the windings subtract signals with respect to every other winding except the intended signal transfer winding. Thus, none of the voltage from signal A appears on wire B and C; none of the voltage from signal B appears on wire A and C; and none of the voltage from signal C appears on wire A and B. Hence, signals A, B, and C may use the same and/or different voltage levels and the same and/or a different number of windings without interfering with each other. A signal applied to wire A in the under water cable would appear on wire A in the coupler with no voltage appearing on wires B and C. The magnetic flux lines associated with windings A, B, and C, are respectively shown in FIGS. 29A–29C.

Exemplary winding configurations which may be suitable for use with the embodiment of FIG. 28 may be summarized in Table 1 where letters A, B, and C represent windings of the respective wires A, B, and C in a first direction, and $\overline{A}$ $\overline{B}$ and $\overline{C}$ represent windings of the respective wires A, B, and C in an opposite second direction.

TABLE 1

| | Pole Face 1 | Pole Face 2 | Pole Face 3 | Pole Face 4 |
|---|---|---|---|---|
| Wire Winding Direction | A B C | $\overline{A}$ B $\overline{C}$ | $\overline{A}$ $\overline{B}$ C | A $\overline{B}$ $\overline{C}$ |

Figure 29A:
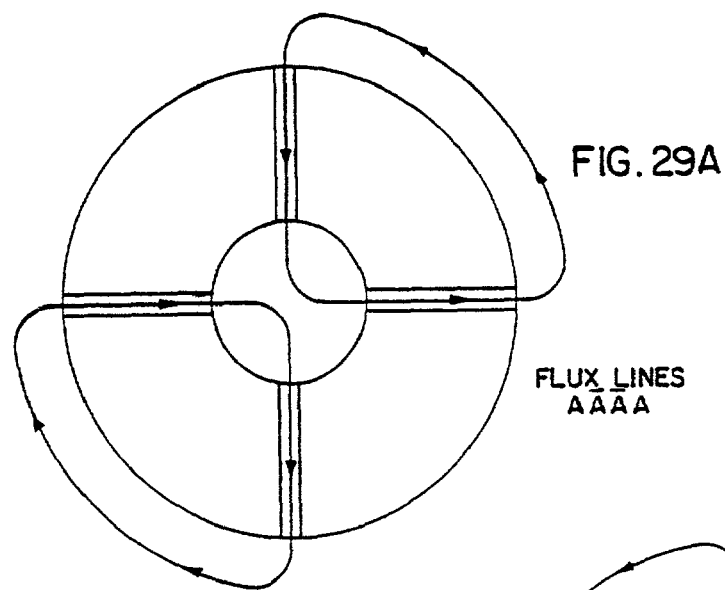
FIGS. 29A–29C are diagrams showing magnetic flux lines of an inner integral core configured as shown in FIG. 28.
Figure 29B:
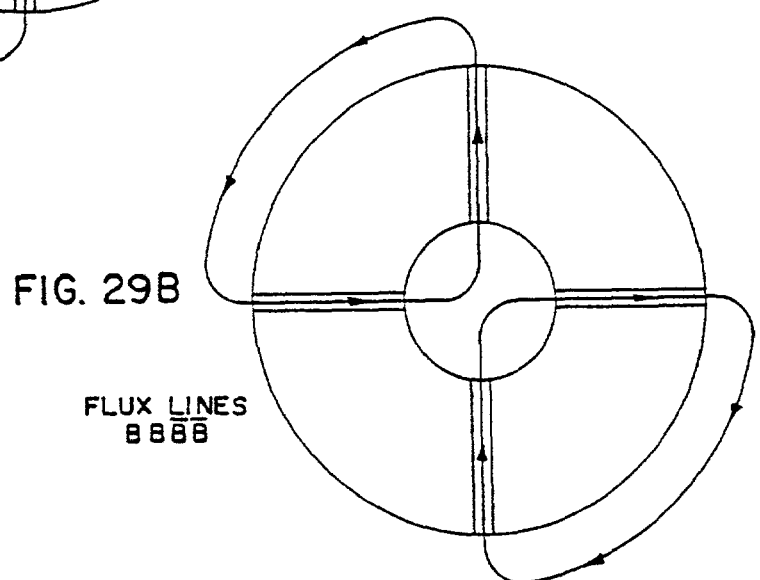
Figure 29C:
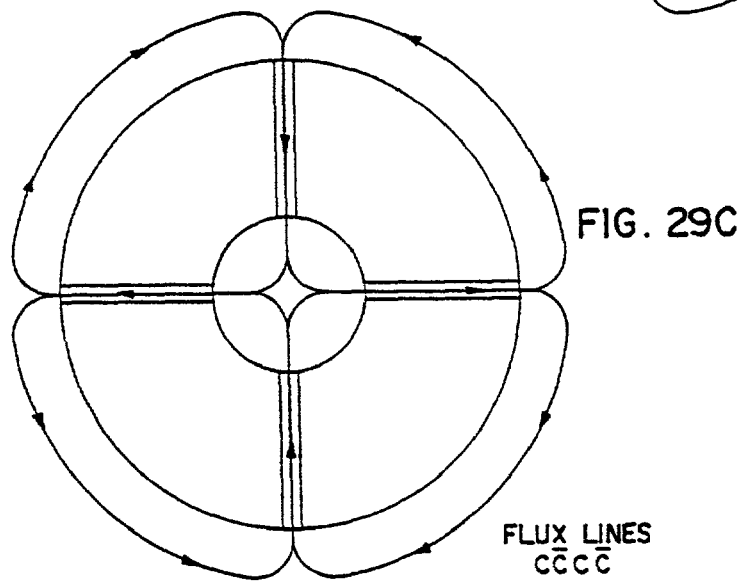

The above winding configurations shown in FIGS. 29A–29C and in Table 1 are exemplary. A winding inverse to that shown for each pole face may be utilized for any given wire. In this manner, there may be eight different operative winding permutations. For example, in Table 1, the wire winding direction for wire A may be inverted as $\overline{A}$ A A $\overline{A}$. The inverted wire winding direction for wire A may be utilized in conjunction with the wire winding directions for wires B and C shown in Table 1 or their inverse. Similarly, the wire winding direction for wire B may be inverted as $\overline{B}$ $\overline{B}$ B B and utilized with the wire winding direction of wires A and C or their inverse. In general, each of the wire winding directions for wires A, B, and C may be inverted individually or in combination such that there may be eight operative combinations.

The integral core embodiments of the coupler are very advantageous and represent a significant advance in the efficiency in coupling between a wet unit 30 and an underwater cable 2. In the illustrated embodiment, the wires for different signals may be placed in close proximity and share a single core while avoiding significant mutual inductance between the different signals. Hence, the signal-to-noise ratio of the underwater cable power distribution and/or data communication system 20 is improved and power transfer efficiency is increased. Further, because the geometry of the coupler allows a relatively large pole face area, the coupling between the inner and outer cores is substantially improved.

The integral core coupler may be adapted to facilitate coupling with any of the embodiments of the underwater cable power distribution and/or data communication system 20. For example, signal A may be the main power signal from the main power line or the power distribution signal from one of the data/power distribution lines, signal B may be the outbound data signal from one of the outbound data distribution lines, and signal C may be the inbound data signal from the wet units 30 to the underwater cable inbound data distribution lines.

Still other embodiments are also possible. For example, in the four pole embodiment it may be desirable to utilize only wire A to transfer, for example, power and outbound data and wire B to transfer inbound data with wire C omitted entirely.

Embodiments having an integral core allow the length of the coils in the axial direction to be reduced over the coils shown in FIGS. 16–18. For example, the length of the coil shown in FIG. 27 in the axial direction may be less than 7 cm, and preferably less than 5 cm, and even more preferably less than 4 cm and most preferably less than about 3 cm. A substantial reduction in the length in the axial direction helps to improve the reliability of the coils and reduce the instances where the coils crack due to bending of the underwater cable 2 when moved over the rollers 9.

The integral core couplers may be particularly advantageous where the underwater cable 2 has a main power line 23 including two or more conductors. In one embodiment, the main power line 23 includes four main power cables routed directly through the integral core 140 as, for example, shown by the main power cables designated as 84A–84D in FIG. 27. In these embodiments, cables 84A–84D may also perform a stiffening function as well as a main power distribution function. Due to the high coupling coefficient and the geometry of this particular coupler, it may be possible to eliminate the high frequency data/power distribution lines and power conversion circuits in some embodiments. Thus, in these embodiments, the main power line 23 is coupled directly to the couplers 16 by passing one or more main power cables through the integral core 140. For example, main power cables 84A–84D may transmit four alternating polarity main power signals. Thus, the wire winding direction of, for example, wire C may be accomplished by simply routing a main power line 23 composed of four alternating polarity conductors through the integral core 140 (e.g., between the extending sections 142A–142D and/or windings 146A–146D as shown by the main power cables 84A–84D in FIG. 27). In this embodiment, signal C in FIG. 28 may be the signal derived directly from the main power line.

The direction of current flow in the main power conductors 84A–84C preferably alternates for each consecutive conductor around the integral core, thus producing the winding direction C $\overline{C}$ C $\overline{C}$ or its inverse. With this coupling arrangement, main power from the main power line 23 (as distributed on main power conductors 84A–84C) may then be distributed directly from the main power line 23 into the wet units without an intermediate secondary power distribution line and AC-AC converter. However, this method is less preferred for many embodiments because the integral cores are relatively heavy.

FIGS. 30–34 show yet another embodiment of a coupler particularly useful where the coils in the wet unit rotate with respect to the underwater cable. A coupler 300 includes a generally cylindrical housing 301 having a number of parallel bores. A central bore 302 accommodates electrical power and data lines. A plurality of circumferentially spaced bores 303, preferably about three, house cable stress members. A plurality of coil cavities, preferably about six, are circumferentially spaced and preferably disposed in pairs between the stress members. In a preferred embodiment, each coil cavity 304 comprises a dead-end bore with a coil 305 disposed therein. Although a symmetrical arrangement of bores is preferred, other arrangements can be used to accommodate underwater cable designs.

The coupler housing 301 preferably fits snugly inside the cable jacket 306. Longitudinal grooves 307 along the outside of the coupler 300 permit cable-ballasting fluid to flow past the coupler. A race 308, separable into two halves, is fastened around the jacket 306 and the coupler housing 301. A wet unit 309 is preferably rotatably attached to the cable by means of a collar 310 that mates with and rides in the race 308. Hinged joints 311 and a latch 312 which may have a quick-disconnect pin allow the collar to be separated at the latch pin, allowing the collar and the wet unit 309 to be removed from the cable and the race 308.

Figure 31:
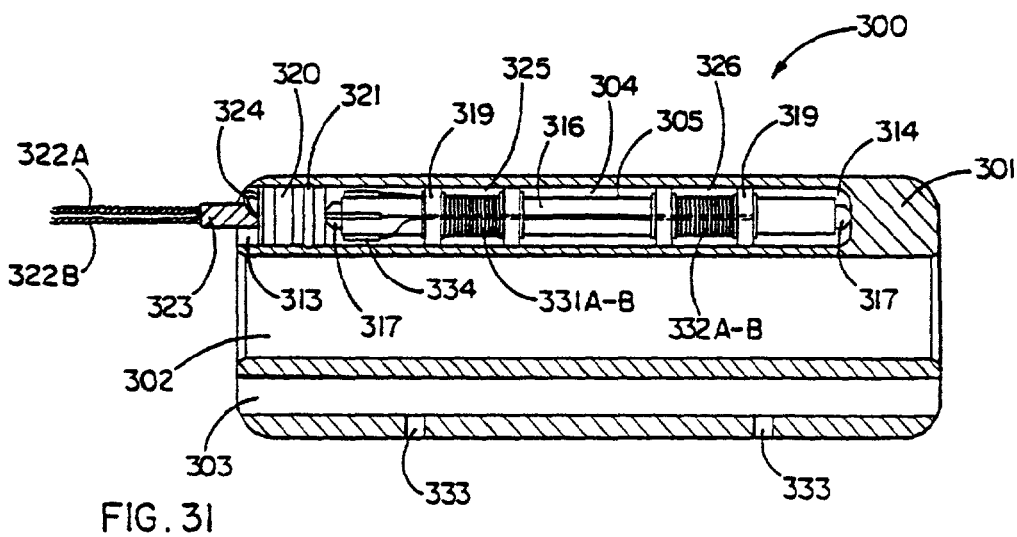
FIG. 31 is a longitudinal cross sectional view of the coupler of FIG. 30 including a core assembly disposed within the coupler.
Figure 32:
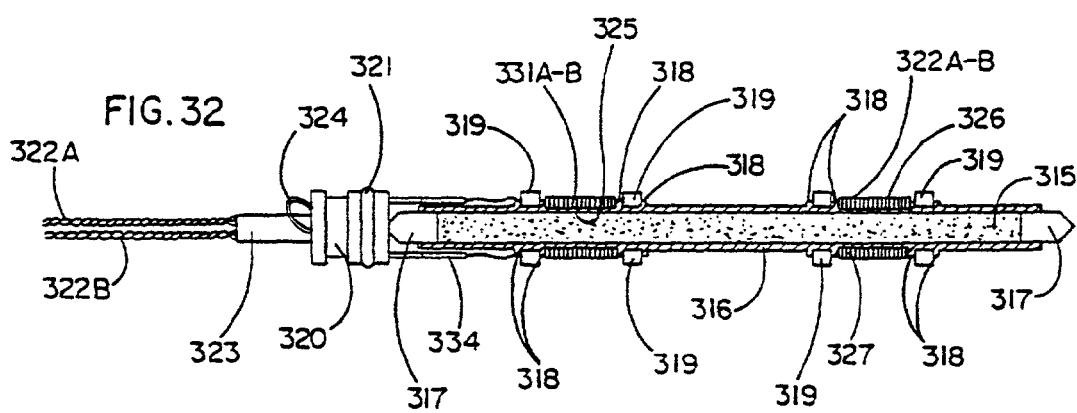
FIG. 32 is a partial longitudinal view of the core assembly of FIG. 31.

As shown in FIG. 31, each coil cavity 304 in the housing 301 preferably has an open end 313 and a blind end 314 and houses a coil assembly 305. The coil assembly 305, as shown in FIG. 32, includes a magnetic core 315, which preferably comprises a ferrite rod, although other magnetic materials can be used. The magnetic core 315 has a high relative permittivity, which is preferably above about 6000 and most preferably about 6500 or more. In the preferred embodiment, the magnetic core 315 comprises a ferrite rod housed in a sheath 316, which is preferably slightly longer than the magnetic core 315. Bumpers, such as elastomeric end bumpers 317, retain the core 315 in the longitudinal position and cushion the coil assembly 305 from shock. The sheath 316 includes a plurality of pairs of circumferential ridges 318, preferably about 4. A sheath support ring 319 is retained between the ridges of each pair. The support rings 319 are preferably made of an elastic material with an outermost diameter slightly greater than the inside diameter of the coil cavity 304. The support rings 319 keep the core 315 centered in the cavity 304, cushion the core 315 from bending, and protect the core 315 from transverse shock loads. An end cap 320, preferably waterproof, confines the coil assembly 305 in the cavity 304. The bumpers 317 may contact an interior side of the end cap 320 and the blind end 314. An O-ring 321 mounted in a circumferential groove in the end cap 320 seals the cavity 304 from fluid intrusion. External wires 322A–B connect the coil windings to the underwater cable's power, outbound data, and inbound data lines. The external wires 322A–B preferably extend through end cap 320 and connect to the coil windings 331A–B at connections 334. A strain relief 323 may extend from the exterior side of the end cap 320 to lessen wire damage. The end cap 320 is preferably provided with an extraction loop 324 to facilitate removal of the coil assembly 305 from the cavity 304.

Referring to FIG. 32, each coil assembly 305 preferably includes a plurality of windings 331A–B, 332A–B at spaced locations 325, 326 along core 315. A circumferential channel 327 may be formed between the pairs of ridges 318 at each end of the sheath 316. Each channel 327 acts as a bobbin to hold the windings 331A–B, 332A–B in place. An A coil winding 331 A, 332A and a B coil winding 331B, 332B are wound within each channel 327. The A coil windings 331A, 332A couple outbound power and/or data to the wet units 309. The B coil windings 331B, 332B couple data from the wet unit 309 to the inbound data lines within the cable. The B coil windings 331B, 332B may also be used to couple outbound data to the devices when operating in backup communications mode, as discussed more fully below.

The windings may be connected in any suitable manner. For example as shown schematically in FIG. 33, the A coil windings on core 305 are electrically connected in a series-aiding arrangement, as indicated by the dot convention. The A windings of each core are connected in parallel with the A windings of the other cores. The B windings of each core, on the other hand, are connected in a series-opposing arrangement to minimize the mutual inductance between the A and B windings and thereby minimize crosstalk. The B windings of each core are connected in series with the B windings of the other cores.

Figure 33:
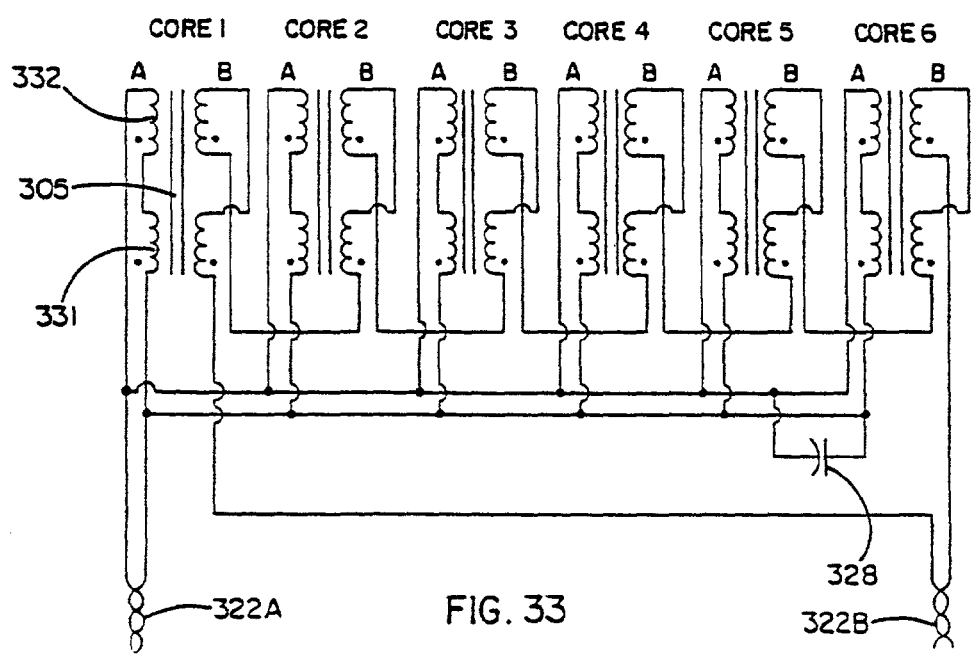
FIG. 33 is a circuit diagram of core assembly circuits that may be used with couplers of FIG. 30.
Figure 33A:
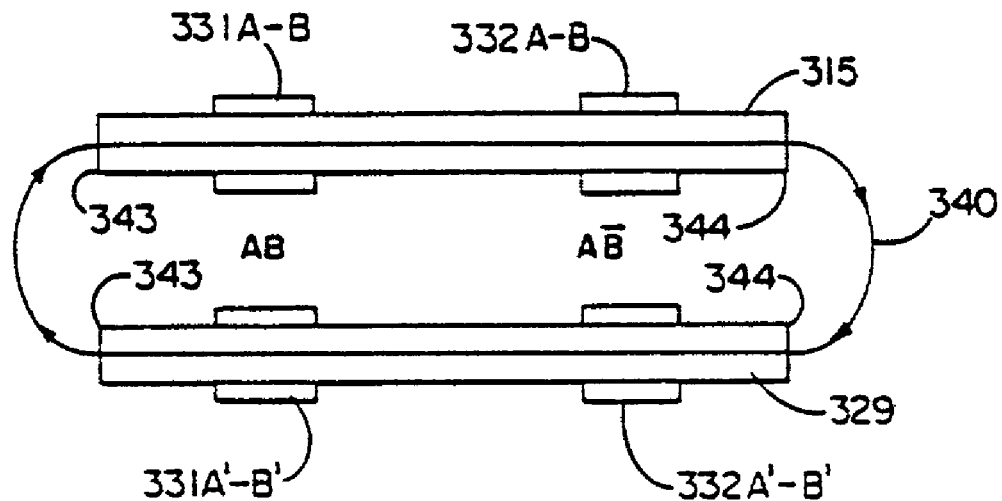
FIGS. 33A and 33B illustrate the magnetic flux lines of the circuit of FIG. 33.
Figure 33B:
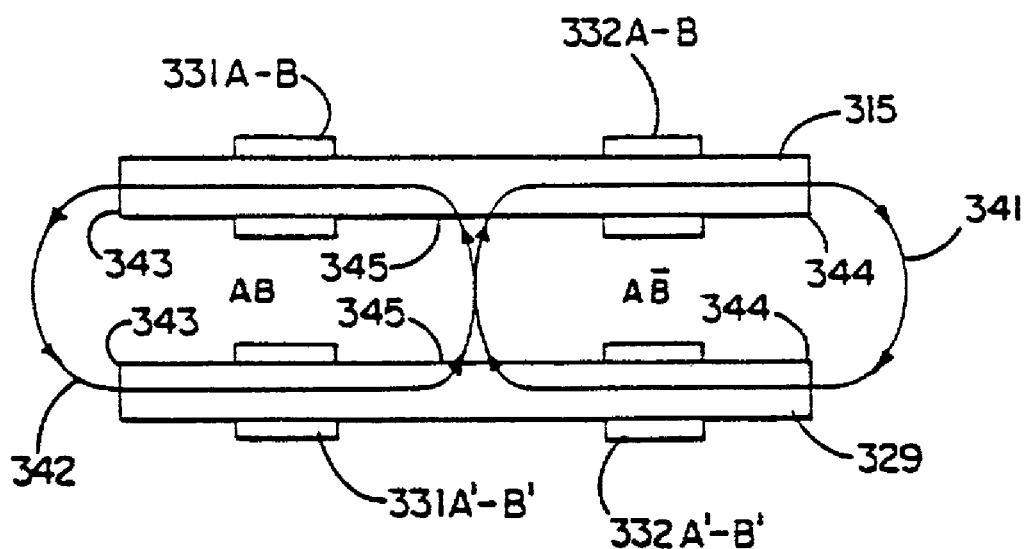

Referring to FIGS. 33A and 33B, the reduction of crosstalk is illustrated by the flux paths produced by each set of windings. In FIG. 33A, the series-aiding A coil windings 331A, 332A on a coupler 315 produce a flux that links the series-aiding A coil windings $331^{A'}$, $332^{A'}$ in a similar proximate core 329 in the wet unit along a path 340. Thus, the ends of the cores 315, 329 act as pole faces 343, 344 for the A winding flux path. As shown in FIG. 33B, the series-opposing B coil windings 331B, 332B on the coupler core 315 produce a flux that links the series-opposing B coil windings $331^{B'}$, $332^{B'}$ in the wet suit core 329 along paths 341 and 342. In addition to the pole faces 343, 344 at the ends of the cores, a third pole face is formed between the windings 331A and 331B for the B winding flux path. Because the flux produced by the A windings is in the same direction through the cores, no net voltage is induced in the series-opposing B windings. Conversely, because the flux produced by the B windings is oppositely directed on each half of the cores, no net voltage is induced in the series-aiding A windings. In this way, crosstalk between the inbound and outbound lines is minimized. It is clear that one set of windings results in two pole faces, that two sets of windings result in three pole faces as in FIG. 33B, that three sets of windings result in four pole faces as in FIG. 28, and generally that N sets of windings result in N+1 pole faces.

Referring again to FIG. 33, a tuning capacitance 328 may be connected in parallel with the A coil circuit to tune a resonant circuit formed with the capacitance of the outbound data line and the inductance of the A coil circuit. Tuning the resonant circuit enhances the power transfer to the wet unit. In a most preferred embodiment for use with a 200 m underwater cable segment accommodating two wet units, the net inductance of the A windings is about 0.246 mH and the tuning capacitance is about 25.1 nF to transfer about 1.5 W of power to each wet unit at 64 kHz. A net inductance of about 3.09 mH is preferred for the B windings to effectively transmit data inbound to the survey vessel at 32 kbps.

Referring to FIG. 30, only one coil assembly 329 is positioned in the wet unit 309 near the coupler 300. Preferably, the coil assembly 329 in the wet unit is similar to each of the coil assemblies 305 in the coupler. The core of the wet unit is disposed in parallel with the core 315 in the coupler 300 with the two winding positions separated in a radial direction with little and, preferably, no longitudinal offset. In this way, inductive coupling between the windings of the coupler 300 and the windings of the wet unit 309 is enhanced.

In the particular geometry of the coupler 300 of FIG. 30, the coupling between the coupler and the wet unit 309 varies as the wet unit 309 rotates about the cable. Maximum coupling is achieved when the axis of the core 329 of the wet unit 309 is equidistant from two neighboring coupler cores 305 and not radially aligned with a stress member bore 304, as indicated by a first radius 335 in FIG. 30. Minimum coupling occurs when the cable rotates relative to the wet unit 309, indicated in phantom, to a position in which the core 305 of the wet unit 309 lies on the same radius 336 as the stress member bore 303.

If room is available in the wet unit 309, the coupler 300, or both, additional cores may be installed to further increase the minimum coupling coefficient. For example, as shown in the embodiment of FIG. 34, a pair of similar cores 330 in the wet unit 309 improves coupling over the embodiment of FIG. 30.

Part III: Data Communication Structure Generally

Conventionally, communications between the electrical devices 18 and the dry-end electronics 5 has occurred via one or more communication lines extending substantially through the entire length of the underwater cable 2. However, this configuration may be unsatisfactory when electric power is distributed on the same lines as data. For example, seawater leakage may detune the entire communication channel and cable losses may make communication and power transfer difficult over extended distances Accordingly, power transfer and communications are difficult or impossible using conventional configurations.

Another aspect of the present invention concerns improving the responsiveness and reliability of the communication channels including the data/power distribution lines between the survey vessel 8 and the electrical devices 18. Referring to FIGS. 3–6, the underwater cable 2 may include a communication system with a control processor 21 controlling the communications to and from one or more communication channels. As shown in FIGS. 3–6, each communication channel may include a plurality of repeaters 25 for transmitting/receiving data. For example, each communication channel may comprise a first group of repeaters selectively disposed along the underwater cable 2. The communication channel may be variously configured to include any number of repeaters positioned at any number of suitable locations within the underwater cable 2. In preferred embodiments, the underwater cable includes a plurality of repeaters spaced along the underwater cable and positioned at about equal distances from each other.

Where the underwater cable 2 includes streamer electronics modules (SEM's) 14, the repeaters may be disposed inside and/or outside of the SEM's, but are preferably respectively disposed within the SEM's. The repeaters may be alternately arranged with the data/power distribution lines to form a data communication channel. In this arrangement, the data communication channel is segmented by the repeaters. Further, the repeaters are interspersed at spaced locations along the underwater cable and serve to relay data between the electrical devices 18 and the control processor 21 on the survey vessel 8. In preferred embodiments any number of couplers 16, 32 may be disposed along each segment of the communication channel to couple electrical signals on the data/power distribution lines to an electrical device 18 located proximate to a coupler. For example, each segment of the communication channel may include one, two, three, four, five, six, seven, eight, nine, ten, or more couplers. When the repeaters are disposed in the SEM's, the segments of the data communication channel may be coextensive with the cable segments. In many preferred embodiments, each communication segment includes two spaced couplers disposed between consecutive repeaters. More than two couplers may be included between successive repeaters. The two couplers couple data and/or power from the data and/or power distribution lines to an associated electrical device 18.

It has been found that buffering provided by one or more repeaters 25 limits the effect of the loss of an electrical device along a particular communication channel segment to the detuning of that segment of the data communication channel alone. Accordingly, power and/or data transmission to electrical devices 18 along other communication channel segments can continue. Further, the retransmission of message signals at a predetermined level by the repeater at an end of the detuned segment may be sufficient to overcome the detuning effects and allow reliable communications to electrical devices located along the underwater cable 2 aft of a detuned segment.

In some of the preferred embodiments, the repeaters 25 include encoder, decoder, and/or data link control circuits 154. (See FIGS. 35–36.) The circuits 154 may be variously configured. For example, in some embodiments, the circuits 154 may sample data received from receivers 152, 153 and retransmit the sampled data in synchronism with one or more system clock signals. The system clock signal may be derived from data on a separate line or from data on the inbound and/or outbound data distribution lines. If a clock signal is to be derived from data on the inbound and/or outbound data distribution lines, the clock signal may be derived with or without recovering data bit information. For example, by inputting either the inbound data or the outbound data into an edge detector and then into a phase locked loop (PLL), a clock may be recovered from the transmitted data signal. The recovered system clock may be utilized to recover bit information by demodulating the data and then remodulating the data prior to transmission to an output driver circuit. Alternatively, the system clock may be utilized to simply sample data received from the receiver and to retransmit the data in synchronism with the system clock without demodulation.

In some of the preferred embodiments, the outbound data received by repeater 25 is sampled to recover a system clock which is then utilized to demodulate the outbound data to recover outbound data bit information. The outbound data is then preferably remodulated using the system clock. Bit recovery may also be performed in a like manner on the inbound data. Further, the repeaters 25 may sample the inbound data from receiver 153 using a recovered inbound data clock, and then retransmit the inbound data in synchronism with the system clock recovered from the outbound data.

In some embodiments, the repeaters 25 may also include additional circuitry for performing various link control functions such as error detection and/or correction as well as link management functions. Further, it may be desirable to incorporate a microcomputer or other suitable control circuits into the repeaters 25. In these embodiments, it may be desirable to perform bit recovery to provide, for example, error correction and/or detection for each segment of the data communication channel. Disposing data link control circuits in each repeater may be advantageous in applications where it is desirable to provide error detection and/or correction for individual data/power distribution lines. However, in configurations which have a separate communication channel between the dry-end electronics 5 and the electrical devices 18, repeaters which include data link control are often less preferred because of the additional latency introduced by the packetization, error correction and/or error detection process occurring at each repeater.

Figure 35:
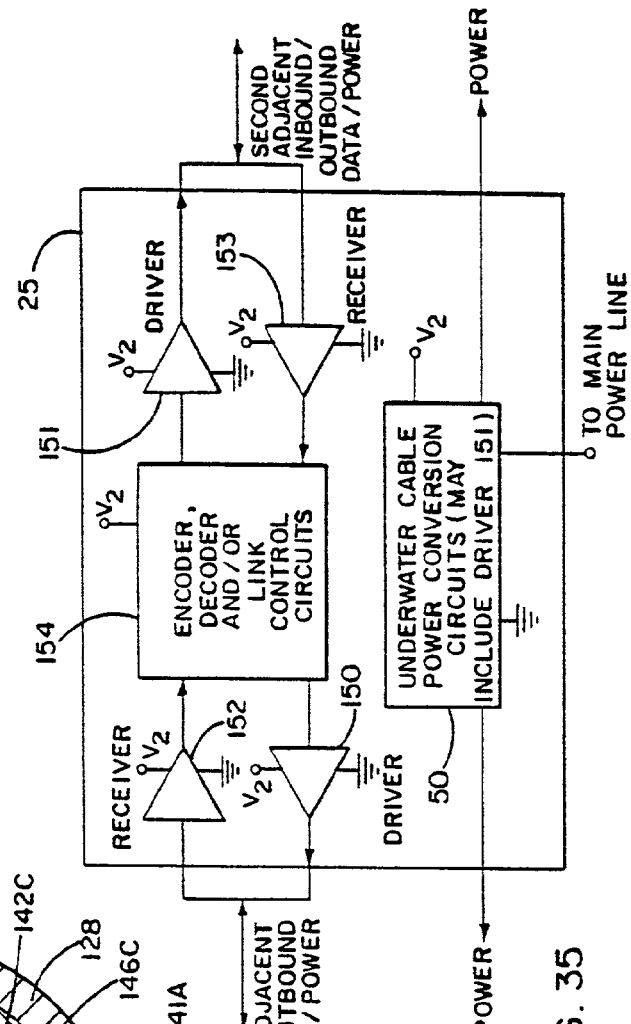
FIGS. 35 and 36 are a partial block/partial circuit diagrams of embodiments of a repeater.
Figure 36:
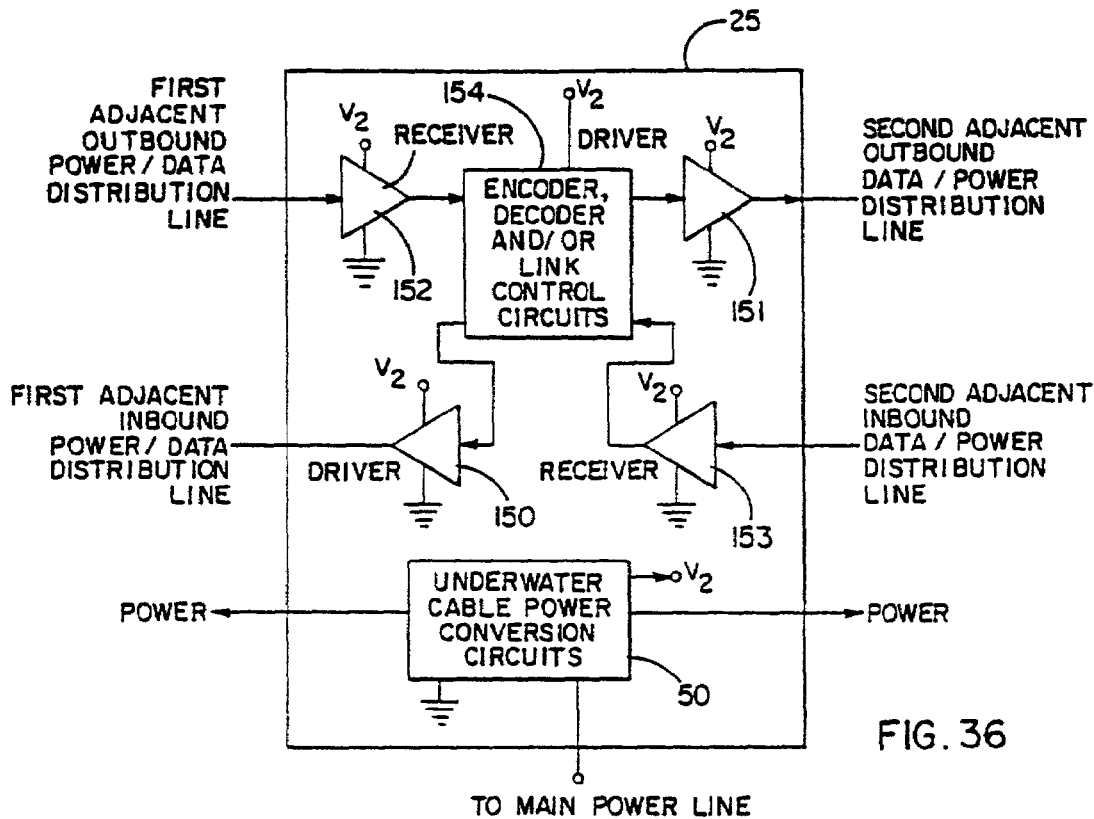

Repeaters 25 which include the encode/decode and/or data link control circuitry may be variously configured. For example, the repeaters 25 may be configured to operate as a full duplex and/or a half duplex communication channel over one or more signal distribution lines (e.g., one or more twisted pair connections). FIG. 35 shows an exemplary embodiment of repeater 25 configured for communication over a single line, while FIG. 36 shows an exemplary embodiment of repeater 25 configured for full-duplex communicating over two lines. Where half duplex communications are utilized, the repeater is preferably configured to operate over a single line. Where full duplex communications are utilized, the repeater is preferably configured to operate over two or more distribution lines.

Referring to FIG. 35, an embodiment of repeater 25 configured for half-duplex communications is shown. The repeater 25 includes an inbound driver 150 for driving data and/or power on a first adjacent inbound/outbound data/power distribution line and a receiver 152 for receiving data from the first adjacent inbound/outbound data/power distribution line. Similarly, an outbound driver 151 may be included for driving data and/or power on a second adjacent inbound/outbound data/power distribution line and a receiver 153 may be included for receiving data from the second adjacent inbound/outbound data/power distribution line.

FIG. 36 is similar to FIG. 35 except that in FIG. 36 the drivers 150, 151 of repeater 25 are coupled to and configured for full-duplex communications. In some of the preferred embodiments of the power distribution and/or data communication system 20, the system is operated as a full-duplex system and includes an inbound data communication channel including a plurality of inbound repeaters alternately disposed with a plurality of inbound data distribution lines and an outbound data communication channel including a plurality of outbound repeaters alternately arranged with a plurality of outbound data distribution lines. Each data communication channel couples the control processor 21 to the electrical devices 18. In some of the preferred embodiments, the data/power distribution lines and the outbound data distribution lines are the same lines.

In the embodiments shown in FIGS. 35 and 36, power from the underwater power conversion circuits may be transferred on a separate power distribution line or may be combined with the data and transferred via any of drivers 151 and/or 150 in a similar manner as discussed above with respect to the power conversion circuits. In embodiments having a separate power distribution line, the underwater power conversion circuit 50 may include an oscillator to supply a power carrier clock for supplying power at the power carrier clock frequency to one or more data/power distribution lines. Where power and data are to be transferred on the same line, it may be desirable to incorporate the second power circuit 52 into one or more of the driver circuits 150, 151.

In some of the preferred embodiments, the power and data are transferred by outbound data driver 151. One example of such an embodiment is shown in FIG. 4. In this embodiment, power transfer may be maintained by transmitting idle signals when no data is being transferred. The electrical devices 18 extract electric power from the data signals and idle signals to provide operational power and to provide power for charging any batteries.

As discussed above, the repeaters 25 may operate to provide a simple buffering function by reshaping the signals output from the repeater to have predetermined voltage levels. In these simple buffering arrangements, receivers 152, 153 are preferably coupled directly to the respective drivers 151, 150. In the simple buffering configuration, the repeaters 25 may not include any encoder/decoder and/or link control circuits 154. The simple buffering configuration may be advantageous in that the repeaters operate to control detuning of the power/data distribution lines while introducing very little latency between the survey vessel 8 and the electrical devices 18. However, the simple buffering arrangement may be less preferred due to the skew along the underwater cable as discussed below.

Figure 37:
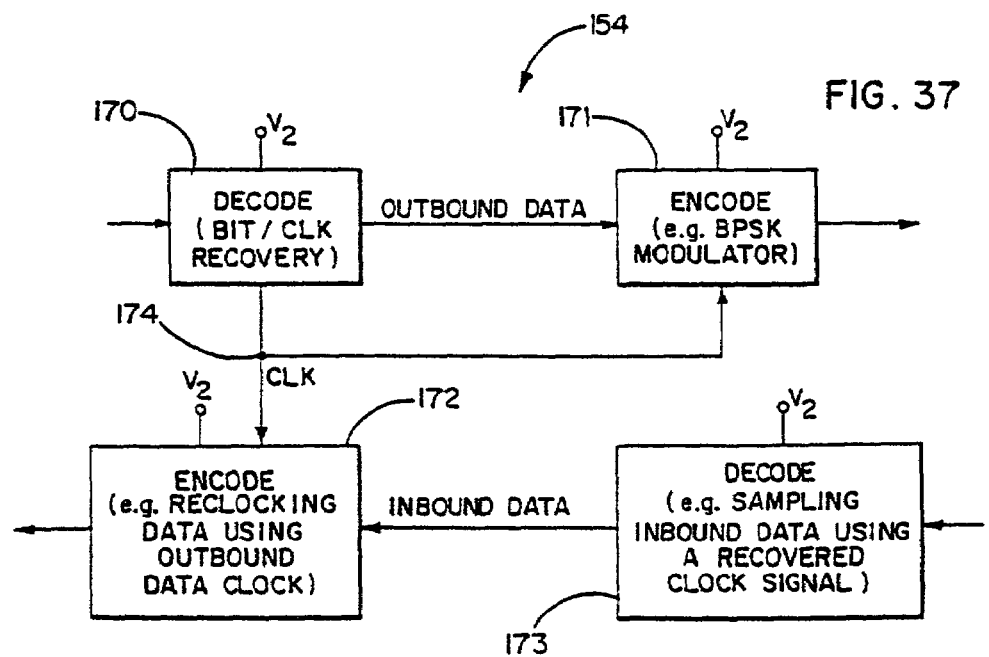
FIG. 37 is a block diagram of a bit/clock recovery circuit.

A first exemplary embodiment of the encoder/decoder and/or link control circuits 154 for use with the power distribution and/or data communication system 20 is shown in FIG. 37. In the illustrated embodiment, only encode/decode circuits are included in the repeaters with the data link control circuits omitted entirely. Of course, data link control circuits (e.g., HDLC circuits) may still be utilized in each electrical device 30, 31 and in the dry-end electronics 5.

The decode circuits 173 for the inbound data and the decode circuits 170 for the outbound data may include circuitry such as a phase locked loop for recovering a clock and logic circuits for utilizing the clock to recover a plurality of data bits. Similarly, the encode circuits for the inbound data 172 and for the outbound data 171 may include circuitry for modulating data onto a clock carrier frequency. As will be discussed in more detail below, in some embodiments it may be desirable to derive a carrier frequency CLK 174 from the outbound data using decode circuit 170 and then utilize this clock to synchronize the inbound and outbound data via encode circuits 171, 172.

The decode circuits 170, 173 may be the same or different depending on the modulation scheme utilized on the inbound data channels and the outbound data channels. In some of the preferred embodiments, the decode circuits 170 may be configured for 4 kbps BPSK while the decode circuits 173 may be configured for 32 kbps Manchester coding.

The repeaters 25 discussed above may be utilized in any of the embodiments of the power distribution and/or data communication system 20. A repeater optimized for use with the power distribution and/or data communication system 20 shown in FIG. 6 preferably includes circuitry to interface to both primary and secondary data communication channels. In this embodiment of repeater 25, it is often desirable to include data link control in each repeater to packetize and depacketize data transferred to and received from the dry-end electronics 5 using the primary data channel.

Figure 38:
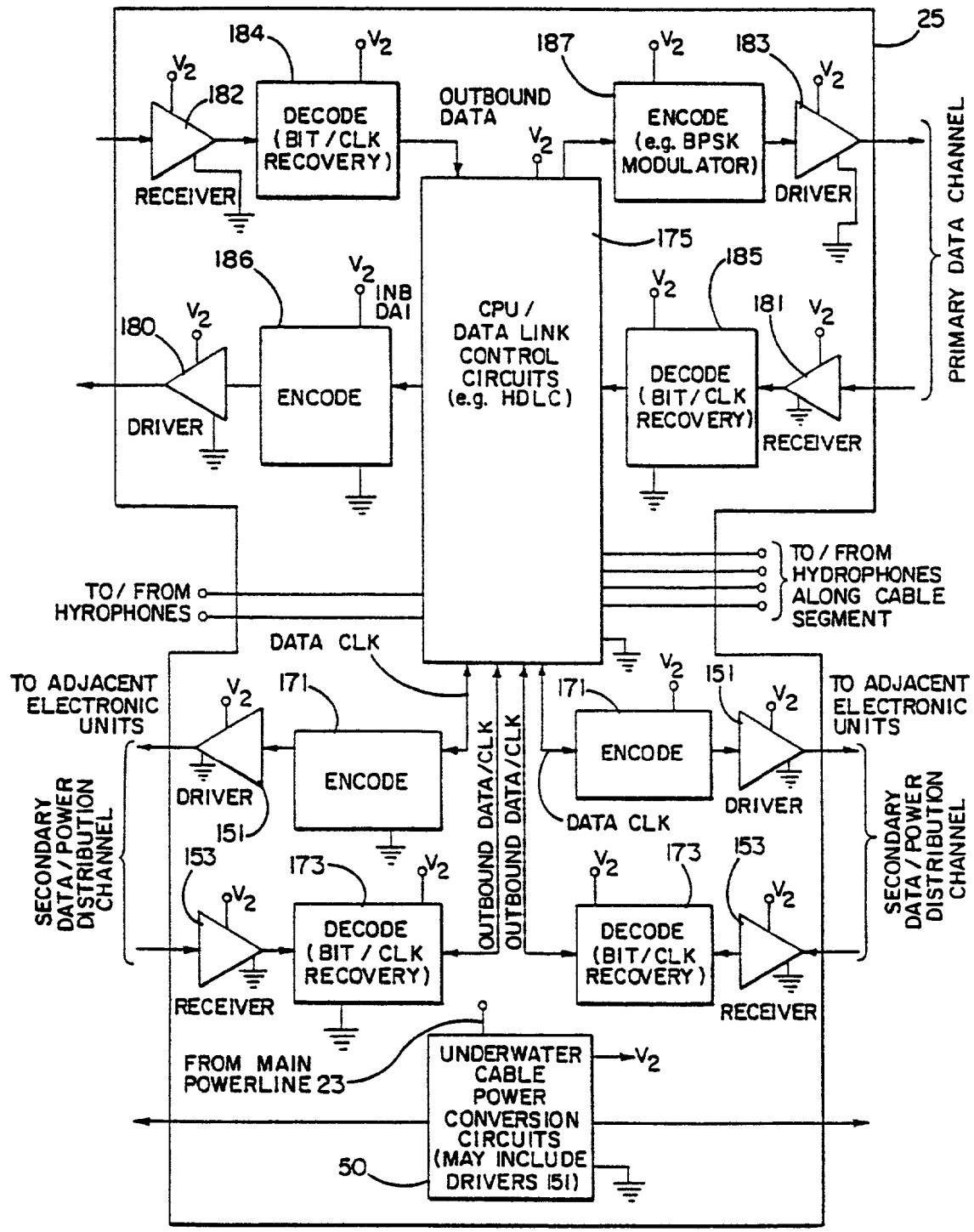
FIG. 38 is a partial block/partial circuit diagram of an embodiment of a repeater.

For example, FIG. 38 shows an exemplary embodiment of a repeater 25 configured for operation with the embodiment of the power distribution and/or data communication system 20 shown in FIG. 6. Referring to FIG. 38, the repeater circuit 25 has a primary data channel and a secondary data/power distribution channel. The secondary data/power distribution channel may include one or more encoders, decoders and associated drivers and receivers as well as underwater cable power conversion circuits in a similar manner as discussed above. However, incoming and outgoing data are preferably packetized and depacketized by CPU and/or data link control circuits 175 for transmission over a primary data channel such as an underwater cable fiber optic network. The repeater 25 may include one or more drivers, receivers, encoders, and/or decoders 180–187 to facilitate communications over the primary data channel. Further, the CPU and/or data link control circuits 175 may be adapted to digitize signals from one or more hydrophones (not shown) along, for example, each adjacent cable segment. Further, as discussed with respect to FIG. 40, where drivers 151 are adapted to transmit both data and power, it may be preferable to incorporate the drivers 151 into the power conversion circuits.

Part IV: Synchronization of Inbound/Outbound Data

A typical problem encountered when introducing bit and/or clock recovery circuits in the repeaters 25 is that additional latency time may be introduced. This latency time often may result from the carrier recovery loops in the decoders exhibiting a time delay with respect to the data. When a wet unit starts to respond, the unit may be required to send a long preamble which has a length dependent on the number of decoders between the electrical device and the dry-end electronics 5. Further, electrical devices 18 at the aft end of the underwater cable 2 may be required to utilize a long preamble of at least 3–4 bit times for each repeater between the electrical device and the control processor 21. Accordingly, a long latency time may exist before the control processor 21 receives a response to a previously initiated request.

This problem may be overcome by utilizing a continuously active synchronous transfer protocol. This protocol may be particularly efficient where data communications between the survey vessel 8 and the electrical devices 18 comprises control and data messages having a relatively short message length. A continuously active synchronous transfer protocol may help to reduce the amount of the bandwidth of the communication channel dedicated to start-up and synchronization bits. In some embodiments of the continuously active synchronous protocol, the inbound and outbound data communication channels are maintained continuously active by, for example, the continuous transmission of idle signals when no data is present.

In a full-duplex synchronized system, the control processor 21 preferably maintains the outbound data and/or power line continuously active by sending, for example, instructions to one or more of the electrical devices 18 or null/idle signals. Similarly, the inbound link may be continuously active sending either messages or an idle pattern. The idle pattern for the inbound link may be generated by the last repeater in the inbound link, by the terminating circuit 34, by a random or non-random signal generator, and/or by noise generated on the aft most segment of the data communication channel. In some of the preferred embodiments, the idle signals are generated by noise on the aft most segment of the data communication channel which is then amplified and propagated by the last repeater. Power may be distributed on the same line as the data or on a separate line with or without a power tree structure. However, in some of the preferred embodiments, the power tree structure is overlaid on the synchronized repeater structure in a complementary fashion such that the outbound data and the power transfer utilize the same distribution line.

One problem with implementing a synchronous communication protocol in a long underwater cable is that varying amounts of skew between the electrical devices 18 along the underwater cable 2 add to timing uncertainties. For example, electrical devices 18 near the survey vessel 8 may receive messages and respond quickly. However, as the electrical devices 18 become more remote from the survey vessel 8, the electrical devices 18 may experience varying amounts of delay. Accordingly, a response from an electrical device disposed near the aft end of the underwater cable 2 may become skewed with respect to responses from electrical devices 18 near the survey vessel 8. The amount of skew may increase with increasing cable length. This can be particularly problematic where it is desirable to utilize a single architecture to accommodate varying cable lengths. Varying amounts of skew may also necessitate a reduction in the bandwidth of the data channel in order to achieve reliable data and power transfers while allowing for varying cable lengths and varying amounts of skew.

In some of the preferred embodiments, the above problems may be overcome by utilizing a clock derived from decoding data and/or a carrier along a first data and/or power distribution line to synchronize data and/or a carrier along the same or a different data and/or power distribution line. For example, referring to FIG. 4, it may be desirable to utilize a carrier clock derived from data on the outbound data and/or power distribution lines 38A–38C to synchronize inbound data on the inbound data distribution lines 39A–39C. In exemplary embodiments, a synchronizing clock may be supplied by any of the components in the underwater power distribution and/or data communication system 20 but preferably originates from the dry-end electronics 5 or from electronics disposed toward the aft end of the underwater cable 2.

Figure 39:
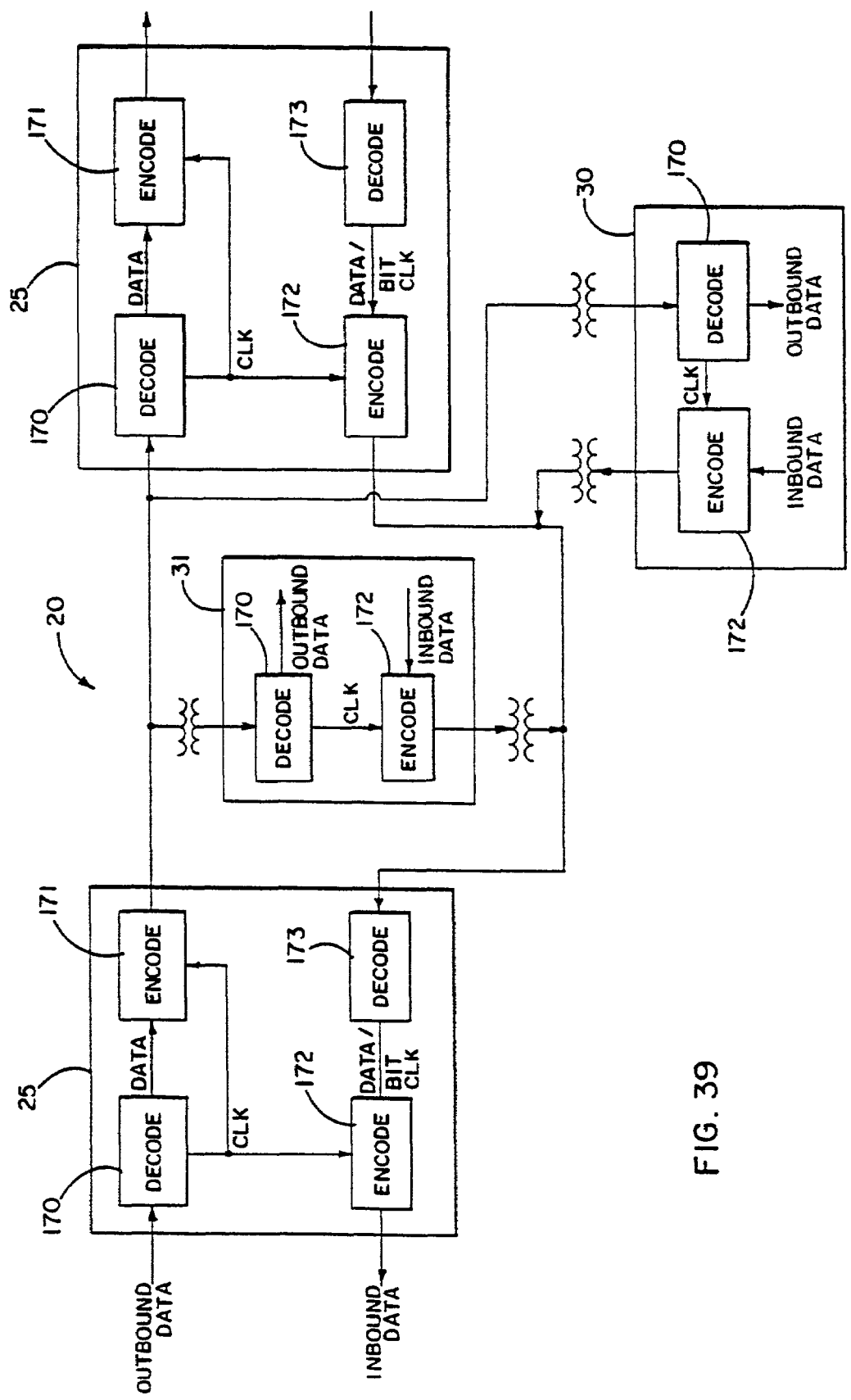
FIG. 39 is a block diagram of a simplified version of the underwater cable power distribution and/or data communication system.

FIG. 39 shows a simplified block diagram illustrating one of the preferred embodiments of the synchronized timing relationships between the various functional blocks of a full duplex communication system having inbound data synchronized with outbound data. In some of the preferred embodiments, a timing acquisition aiding circuitry may be included in the repeaters 25 and in the electrical devices 18 to fix the inbound data and/or carrier clock to have an exact timing relationship with respect to the outbound data and/or carrier clock. Referring to the embodiment illustrated in FIG. 39, the carrier clock derived from the outbound data by decoder 170 may be utilized by encoder 172 to synchronize inbound data. This synchronization may occur in both the repeaters 25 and in the electrical devices 18. Further, the carrier clock may also be utilized to synchronize data encoded by encoder 171 and distributed to aft cable segments. In this manner, each of the repeaters and each of the electrical devices 18 may be locked in an exact timing relationship so that there is no need to acquire timing when a response from an electrical device 18 is to be sent.

The particular nature of the timing relationship may vary depending on the modulation scheme utilized and on the particular circuits utilized to implement the synchronization. In the preferred embodiments, the inbound data/carrier clock is typically delayed by a quarter carrier cycle from the outbound data/carrier clock. The synchronized design has the advantage of maximizing the inbound data bandwidth while minimizing any delay regardless of the number of repeaters along the underwater cable 2.

In embodiments employing the synchronized design, each encoder coupled to the inbound data distribution line (including those in the electrical devices 18) preferably has a carrier phase which is slaved to a carrier clock on a corresponding outbound data distribution line. Each repeater 25 and each of the electrical devices 18 coupled to a particular data and/or power distribution line are preferably configured to include a carrier recovery loop and a bit time recovery loop which are continuously locked. Delay time or skew between the outbound signal and inbound signal timing varies depending on the distance from the repeater along a particular power/data distribution line but is typically only a fraction of a bit time (e.g., the largest delay may be about 3 microseconds in one of the preferred embodiments where the distribution lines are limited to about 200 m). Any skew on an individual distribution line may be accommodated by a small adjustment in the timing recovery circuit which may typically be accomplished in a quarter of a bit time.

An important advantage of the synchronized recovery loops is that each repeater not only reforms the data signal but also completely removes any build-up of timing uncertainties due to skew. Thus, additional cable segments and/or communication channel segment may be added without redesigning any of the components of the power distribution and/or data communication system 20.

Figure 40:
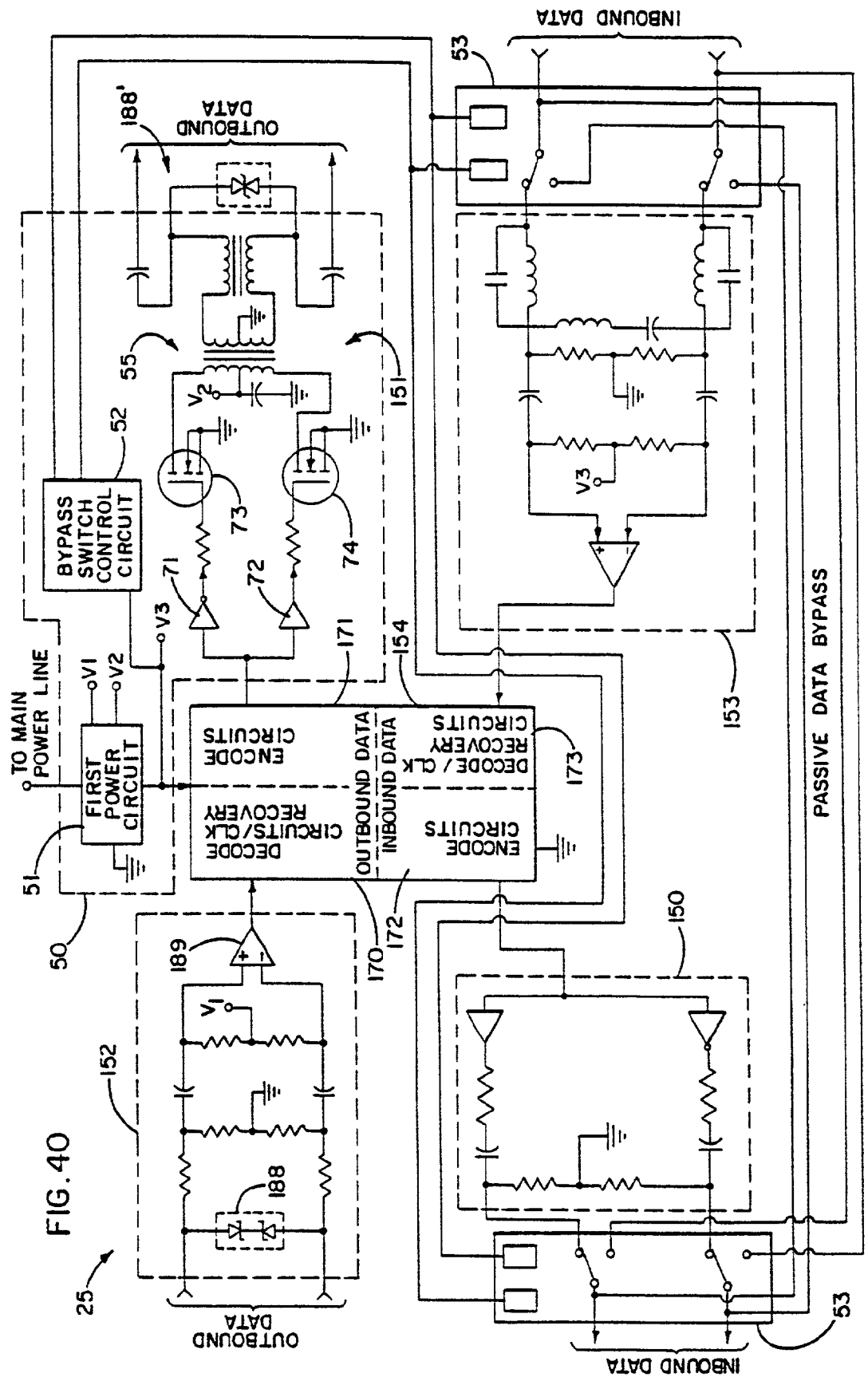
FIG. 40 is a partial block/partial circuit diagram of an embodiment of a repeater.
Figure 41:
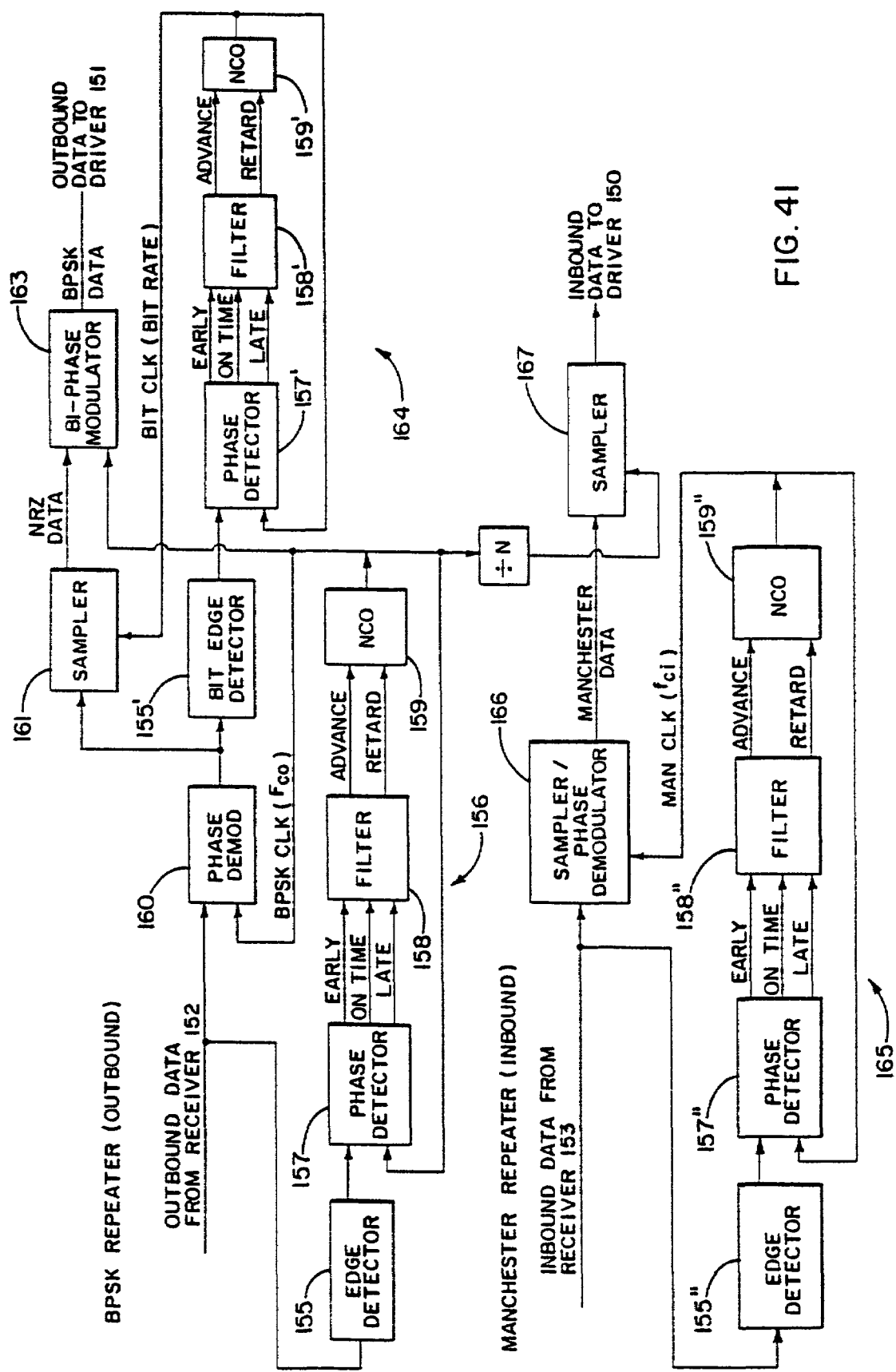
FIG. 41 is a detailed block diagram of the repeater encode/decode circuits.

FIGS. 40 and 41 illustrate detailed circuit/block diagrams of the driver/receivers and synchronized timing recovery loop circuits in the repeaters 25 while FIGS. 42A, 42B, 43 and 44 illustrate detailed circuit/block diagrams of the drivers/receivers and synchronized recovery loop circuits in the electrical devices 18.

Referring to FIG. 40, a repeater circuit 25 includes an outbound data receiving circuit 152 for receiving signals from the outbound data and/or power distribution lines. In preferred embodiments, the outbound data receiving circuit 152 provides proper termination for the outbound data and/or power distribution lines and reforms the data signal for input into decode circuit 170. The outbound data receiving circuit 152 may include a comparator 189 and a load adjusting circuit 188. The load adjusting circuit 188 is discussed in more detail below.

Decode circuit 170 is preferably part of encode/decode and/or link control circuits 154 (shown in detail in FIG. 41). As discussed above, the circuit 154 may be variously configured but preferably includes outbound data decode circuit 170, outbound data encode circuit 171, inbound data decode circuit 173, and inbound data encode circuit 172 as shown in FIGS. 40 and 41.

In some of the preferred embodiments, the outbound data decoded by decode circuit 170 is preferably re-encoded by encode circuit 171 and then output through outbound data/ power distribution line driver 151. As discussed above with reference to FIGS. 7 and 9, where data and power are coupled to the same lines, it may be desirable to configure the driver 151 as part of the underwater cable power conversion circuit 50.

Repeater circuit 25 may also include an inbound data receiving circuit 153 for receiving signals from the inbound data and/or power distribution lines. In preferred embodiments, the inbound data receiving circuit 153 provides proper termination for the inbound data and/or power distribution lines and reforms the data signal for input into decode circuit 173. The inbound data receiving circuit 153 preferably includes a band reject filter for minimizing cross talk from the outbound data lines or coils to the inbound data lines or coils. In preferred embodiments, the inbound data demodulated and/or sampled by decode circuit 173 is preferably then remodulated and/or re-sampled by encode circuit 172. The remodulated and/or re-sampled signal is then output through inbound data driver circuit 150.

FIG. 41 shows a detailed block diagram of one of the preferred embodiments of the encoder, decoder, and/or link control circuits 154. Referring to FIG. 41, outbound data from receiver 152 is input into a first digital phase locked loop (DPLL) 156. The first DPLL 156 includes an edge detector 155, phase detector 157, filter 158, and numerically controlled oscillator (NCO) 159. The phase detector 157 outputs one or more signals indicative of whether the phase output from the NCO 159 is earlier, later, or the same as the phase of the signal detected by edge detector 155. The phase detector 157 may be implemented by an XOR gate or other suitable circuitry. The filter 158 is utilized to provide low pass filtering to screen out any transient abnormalities caused by, for example, noise. The filter 158 may be implemented by a divide by N counter or other suitable circuitry. The adjusted output from the NCO 159 is then input back into the phase detector 157 to complete the loop. The output from the DPLL 156 (designated BPSK CLK) may be configured to be any multiple of the carrier frequency but is preferably equal to the carrier frequency (fco) of the outbound data received from receiver 152.

A phase demodulator 160 may be included where it is desirable to recover data bit information. Phase demodulator 160 preferably receives outbound data from receiver 152. The output of demodulator 160 is preferably input into a second digital phase locked loop 164 to recover a bit rate clock. The bit rate clock is equal to the data rate of the outbound data which, in some of the preferred embodiments, is set to 4 kbps. The second DPLL 164 includes a bit edge detector 155', a phase detector 157', a filter 158', and a NCO 159' in a similar arrangement as the first DPLL 156.

The bit rate clock from the second DPLL 164 and the demodulated data from phase demodulator 160 are input into sampler 161. Sampler 161 samples the demodulated data in synchronization with the bit rate clock. The output from the sampler is non-return-to-zero (NRZ) data. The NRZ data is input into a bi-phase modulator 163 and is utilized to modulate the BPSK clock from the first DPLL 156. In this manner, the outbound data on a subsequent communication channel segment may be transferred in synchronism with a clock signal derived from data transferred in the immediately preceding communication channel segment. The output from the bi-phase modulator 163 is then preferably output to the outbound data driver 151 for transmission across the subsequent cable segment.

The inbound data portion of FIG. 41 shows a sampler/ phase demodulator 166 for sampling the inbound data in conjunction with a Manchester clock (MANCLK) which is an even multiple of, or preferably equal to the inbound data carrier frequency (fci). In the illustrated embodiment, the inbound data is sampled at the inbound data carrier frequency (fci). The Manchester clock MANCLK is generated by a third DPLL 165. The third DPLL 165 includes a bit edge detector 155", a phase detector 157", a filter 158", and a NCO 159" in a similar arrangement as the first DPLL 156.

Sampler 167 inputs the Manchester data from sampler 166 and re-samples this data in synchronism with the BPSK CLK output from the first DPLL 156. A divide by N circuit, such as a counter, may be used to divide the BPSK CLK signal down to the inbound data carrier frequency, which in the preferred embodiment is 32 kHz. Sampler 167 uses the divided BPSK CLK signal to sample inbound data. In this manner, the inbound data may be synchronized with the outbound data without having to demodulate the inbound data.

Figure 42A:
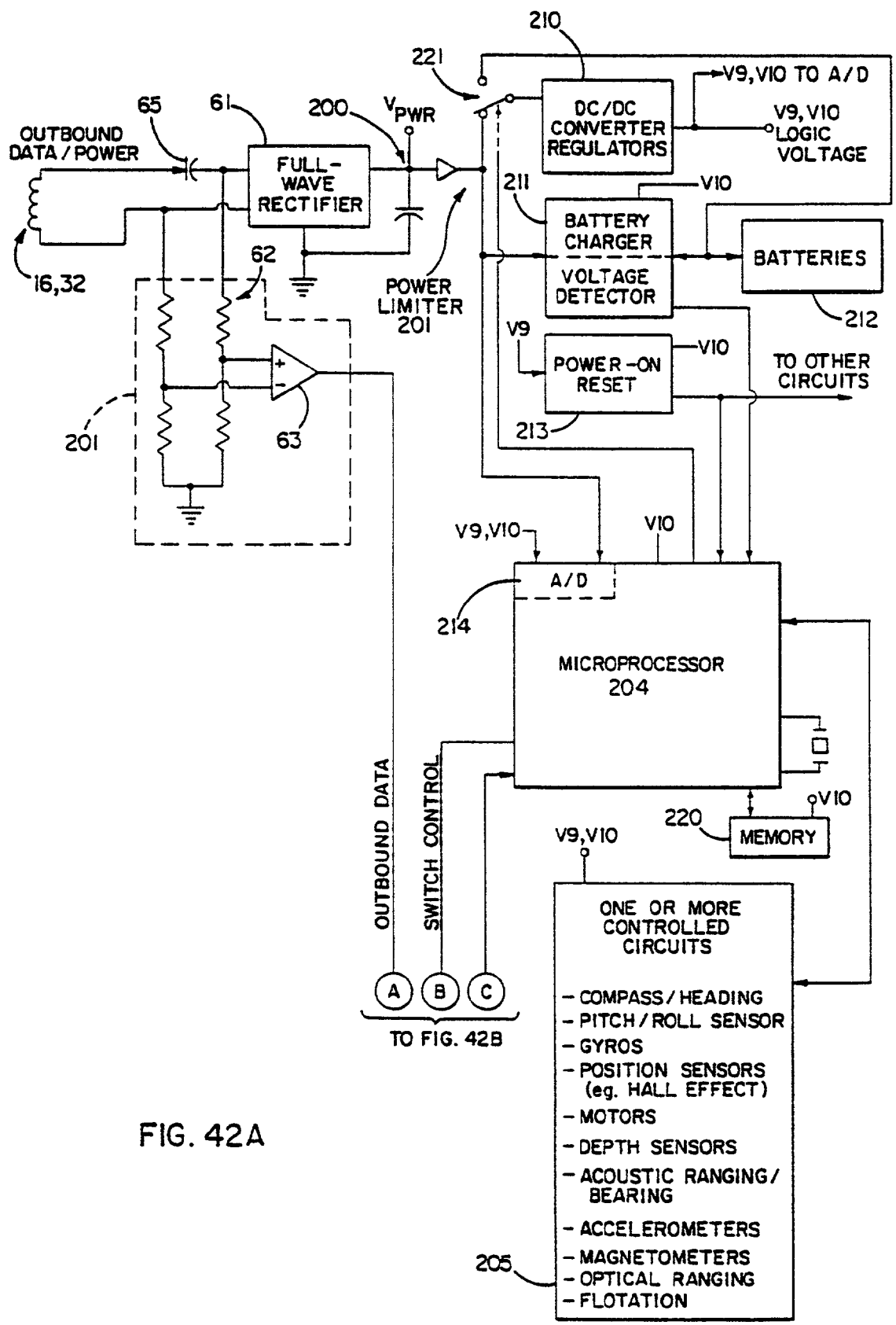
FIGS. 42A, 42B are a partial block/partial circuit diagram of an embodiment of a electrical device.
Figure 42B:
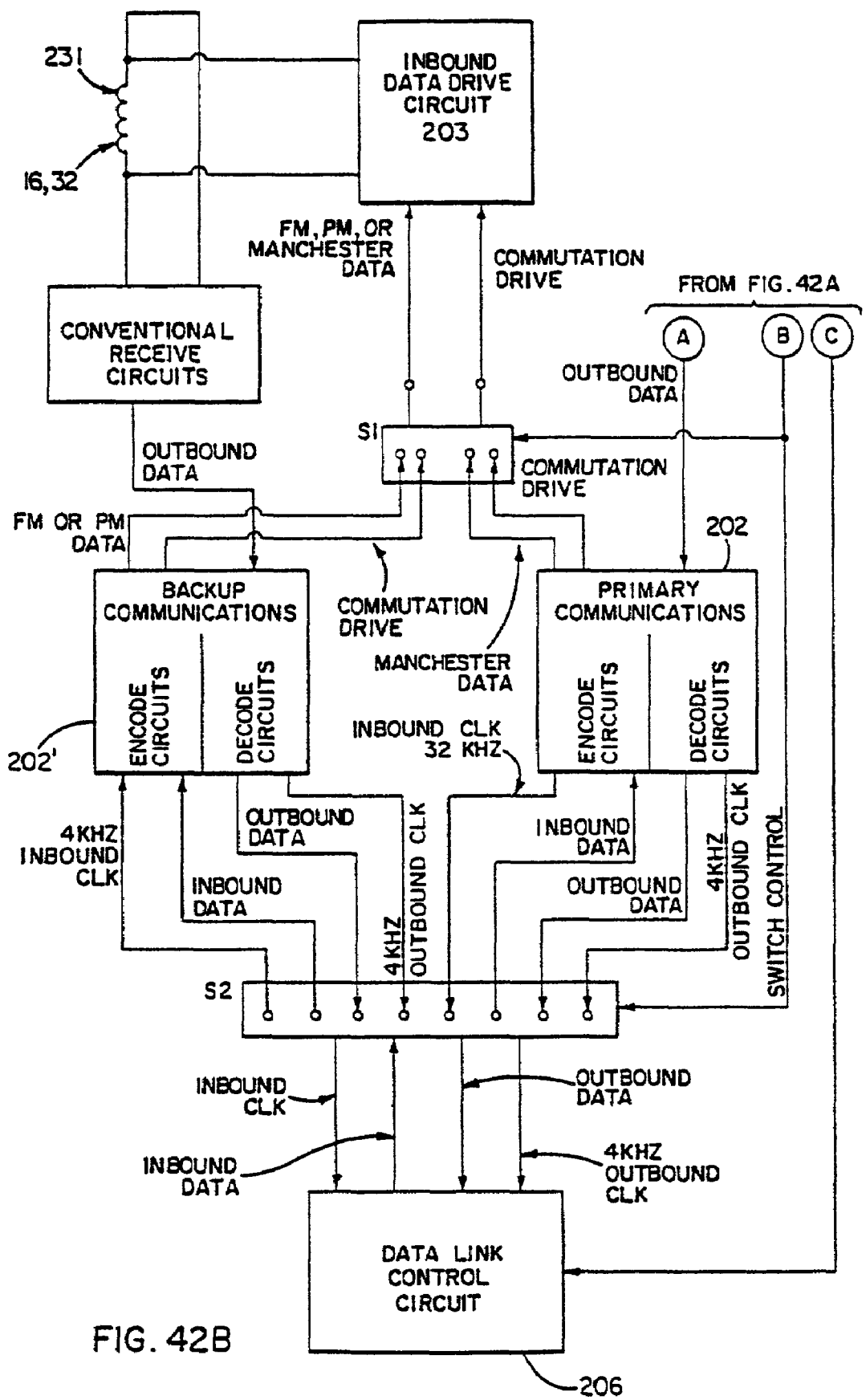

FIGS. 42A and 42B shows a block diagram of a preferred configuration of the electrical devices 18 (e.g., a wet or in-streamer unit 30, 31) for use in embodiments of the underwater cable power distribution and/or data communication system 20. Referring to FIGS. 42A and 42B, the electrical device 18 may receive power at a power supply 200 from a battery, a combined inbound data/power, outbound data/power, and/or a dedicated power distribution line. In the illustrated embodiment, the power supply 200 receives power from a combined outbound data and power distribution line.

Power supply 200 may be variously configured to be any circuit capable of converting received power into regulated DC power. In the illustrated embodiment, the power received from the outbound data/power distribution lines is preferably AC power. As discussed above with regard to FIG. 11, a full-wave bridge rectifier 61 may be utilized to rectify the AC signal and a capacitor 64 may be utilized to smooth the rectified signal into a DC power signal (Vpwr). A power limiter 201 is preferably included to limit the amount of power a device can draw from the cable. A power limiter can also be used to limit the power drawn from the batteries. The DC power signal may thereafter be regulated by, for example, a DC voltage regulator or other appropriate DC to DC converter 210 to provide operational power to the circuits contained in the electrical devices 18.

In some embodiments, it may be desirable for the electrical devices 18 to include one or more batteries 212. In some of the preferred embodiments, where batteries are included, the batteries are rechargeable via battery charger 211. If batteries are included, the batteries may supply operational power in the event that power is not available from the underwater cable 2. The batteries 212 may be switched into an operating mode by, for example, a diode or an electronic switch. If an electronic switch 221 is utilized, the battery charger circuits 211 preferably include a low voltage detector which outputs a low voltage signal to the microprocessor 204. Microprocessor 204 may then actuate the electronic switch 221 responsive to the low voltage detection signal. Alternatively, the microprocessor 204 may detect a low voltage directly via A/D 214. In still other embodiments, the electronic switch 221 may be controlled directly by the voltage detector 211 in response to, for example, a low voltage condition.

In some of the preferred embodiments, the A/D converter 214 receives a voltage from the input to the voltage regulators 210 and a separate voltage from the output of the voltage regulators 210. In this manner, the microprocessor 204 can monitor the voltage received from the underwater cable 2 as well as the voltage supplied from the batteries (when present and active). The voltage regulators 210 preferably include a shut-down mode which may be utilized to isolate the input from the output when power is inadequate at the input to the voltage regulators 210. The microprocessor 204 may control one or more controlled circuits 205 based on the voltage values detected by the A/D converter 214.

A/D converter 214 may be integral with the microprocessor 204 as, for example, with the Motorola 68HC11, or be a separate unit coupled to the microprocessor 204. As discussed in more detail below, the A/D converter 214 may be utilized by the microprocessor 204 to initiate various actions by one or more controlled circuits 205 disposed within the electrical devices 18.

A power-on reset circuit 213 may be utilized to reset the electrical device should operational power be lost from the underwater cable 2 and should the batteries be not present or present and inoperative.

The electrical devices 18 may also include outbound data receive circuits 201 and inbound data driver circuits 203 coupled to encode/decode circuits 202. The outbound data receive circuits 201 may include a voltage divider 62 and a comparator 63 which may operate to reform the outbound data signals prior to decoding by the encode/decode circuits 202.

The inbound data driver circuits 203 may be variously configured to include any suitable driver circuit capable of driving an inbound data signal across any number of suitable coupling arrangements between the electrical device 18 and the underwater cable 2. In the preferred embodiments, the driver circuit 203 is configured to drive an inbound data coupling transformer which inductively couples the wet unit 30 to the underwater cable 2.

The inbound data coupling transformer may include a secondary side comprising the coil disposed in the outer sheath 15 of the underwater cable 2 and a primary side comprising the coil disposed in the electrical device 18. In some embodiments, the inbound data coupling transformer may have a leakage inductance of about 70% or more, for example, about 94% or more (i.e., a coupling coefficient of about 0.3 or less, for example, about 0.06 or less). In this environment, the inbound driver 203 driving the primary side of the inbound coupling transformer may drive an inductive load where about 94% or more of the load is the leakage inductance. The inbound driver circuit 203 preferably drives the primary of the inbound data coupling transformer with a signal which enables the desired data signal (e.g., a Manchester signal) to be reproduced on the secondary side of the transformer.

Figure 43:
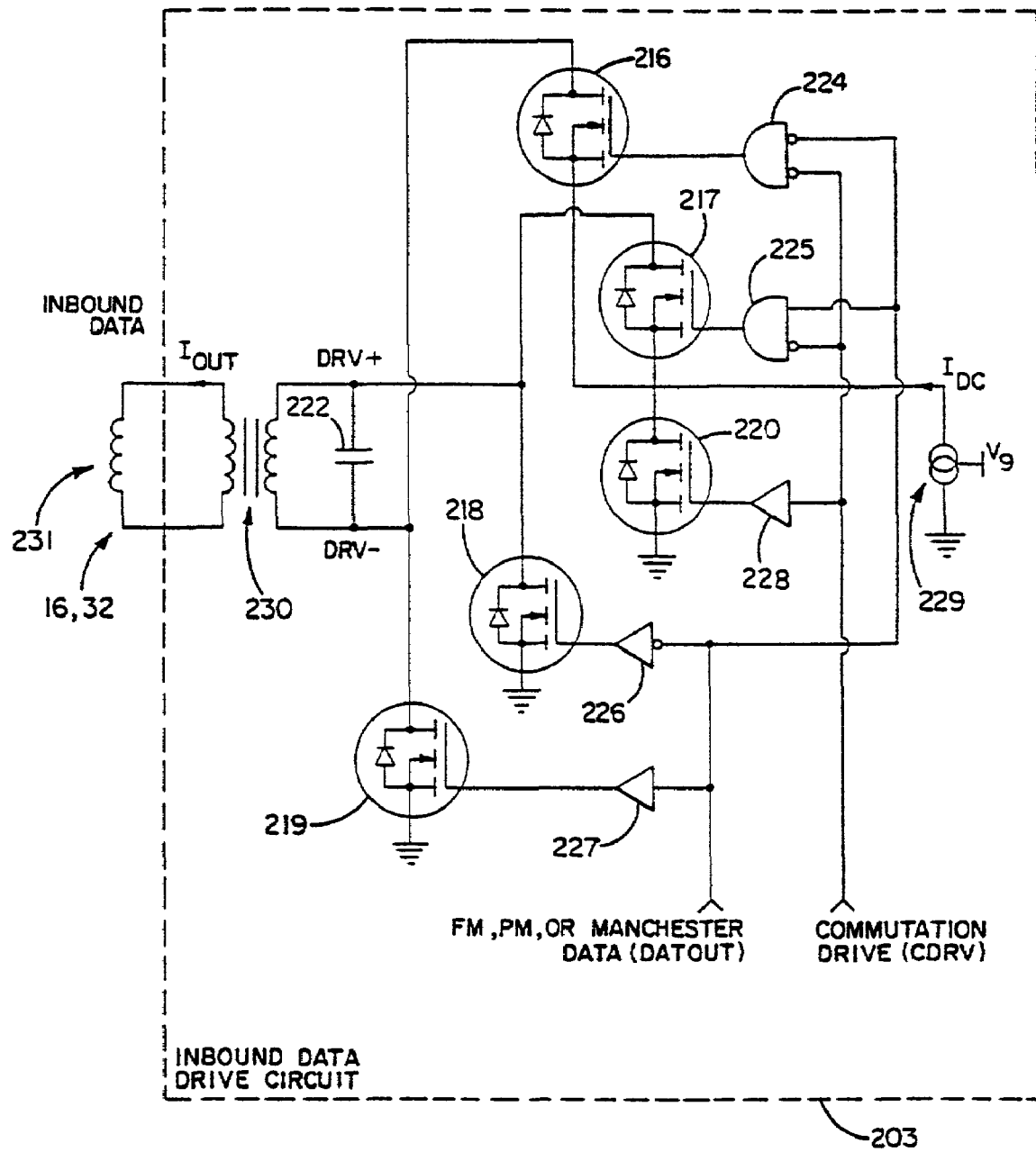
FIG. 43 is a circuit diagram of an inbound data driver circuit.
Figure 44:
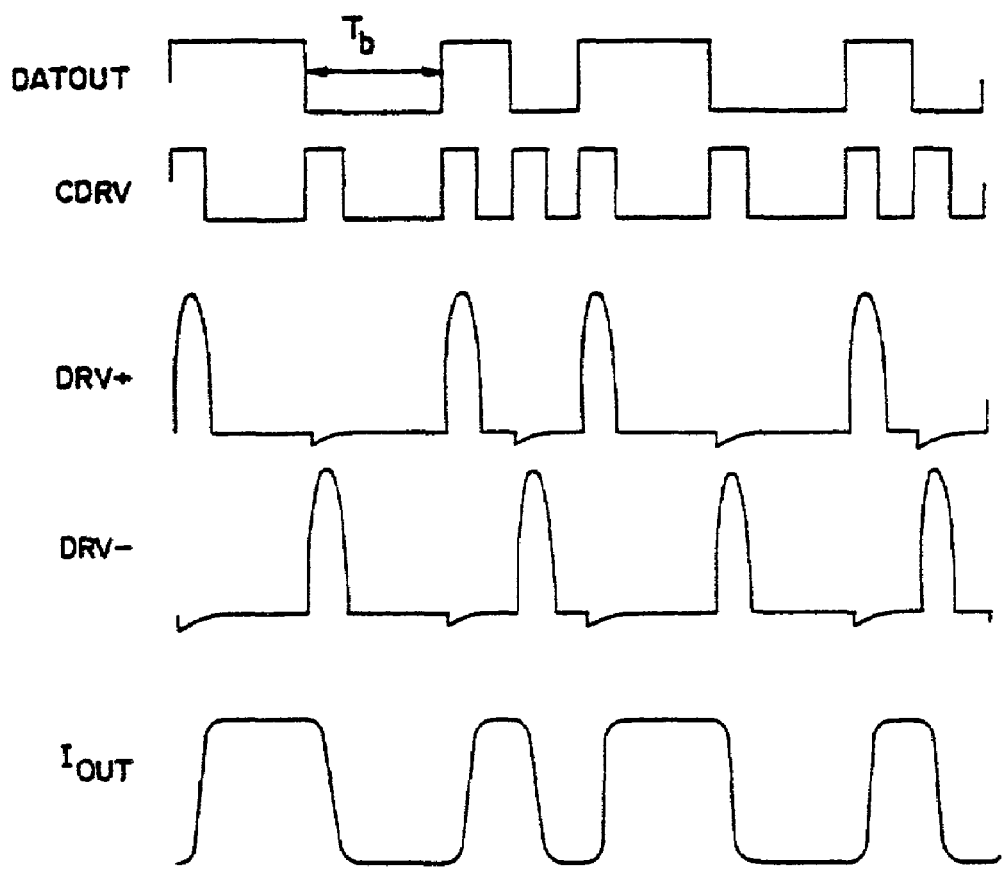
FIG. 44 is a timing diagram of signals related to the transmission of inbound data.

The operation of the inbound driver circuit 203 may be seen with reference to FIG. 43. In operation, transistors 216 and 218 are normally both in the ON state with the output current Iout negative. A negative to positive transition of the inbound signal on the inbound data lines in the underwater cable 2 is initiated by momentarily turning OFF transistor 216 and turning ON transistor 220. Transistor 216 may be turned OFF for a period equal to half of the resonance period of capacitor 222 and inductor 231 (e.g., about ¼ a bit time). Since the current in the inductor cannot change instantaneously, the current flows into capacitor 222 during the next quarter of the resonance cycle. The current then reverses and flows from the capacitor 222 to the inductor 231 in the opposite direction. This produces a negative to positive transition of the inbound signal on the inbound data distribution lines. Transistor 220 is OFF and transistors 217 and 219 are both in the ON state with the current Iout positive.

Similarly, a positive to negative transition of the inbound signal on the inbound data distribution lines in the underwater cable 2 is initiated by momentarily turning OFF transistor 217 and turning on transistor 220. Transistor 219 may be turned OFF for a period equal to half of the resonance period of capacitor 222 and inductor 231 (e.g., one fourth of a bit period). Since the current in the inductor cannot change instantaneously, the current flows into capacitor 222 during the next quarter of the resonance cycle. The current then reverses and flows from the capacitor 222 to the inductor 231 in the opposite direction. This produces a positive to negative transition of the inbound signal on the inbound data distribution lines.

The resonance period of the driver circuit 203 is determined by the resonance circuit formed by the inductor 231 and the capacitor 222. The illustrated driver circuit is particularly advantageous because the energy is stored in the capacitor 222 while the current is changing directions such that energy dissipation is minimized. Energy is alternately transferred between the inductor and the capacitors to conserve energy.

In some embodiments, the inbound data coupling transformer has a relatively low coupling coefficient and has a secondary coupled to a relatively low load impedance. Consequently, the inbound driver circuit 203 may be required to generate a relatively large current in the primary of transformer 230 (e.g., 3.6 amps or more). In the illustrated embodiment of the driver circuit 203, virtually the entire current flowing in the circuit (e.g., 3.6 amps) may be reversed in direction with only a minimum of dissipation. This is a remarkable result since the inbound driver circuit 203 may draw from V9 only a small fraction of the current flowing in the transformer 230. In the circuit illustrated in FIG. 43, the inbound data driver circuit 203 only requires an input of a fraction of an amp (e.g., 0.24 amps from a 10V supply). In exemplary embodiments, a 3.6 amp current flowing in the primary side of the inbound data coupling transformer may generate a 1.1V peak/peak signal on the inbound data line even where the leakage inductance of the transformer is large. A current source, such as a switchmode current source 229, supplies the operating current Idc (e.g., 3.6 amps or more) from source V9 at an efficiency of about 85% or greater.

Operation of the control logic 224–228 can be seen with reference to FIGS. 36A, 36B. The Manchester data (DATOUT) from the encode/decode circuits 202 is input into an inverted input of AND gate 224, into an input of AND gate 225, into an inverting buffer 226 and into a buffer 227. A commutation drive signal CDRV is input into the inverted inputs of AND gates 224 and 225 and into buffer 228.

The signals output from AND gates 224 and 225 and buffers 226–228 drive the gates of MOS power transistors 216–220. As shown in FIG. 43, the DRV+ signal is pulsed positive for ¼ a bit time (Tb) whenever it is desirable for the inbound data signal appearing on the inbound data distribution lines in the underwater cable to make a negative to positive transition. Similarly, the DRV− signal is pulsed positive for ¼ a bit time (Tb) whenever it is desirable for the inbound data signal appearing on the inbound data distribution lines in the underwater cable 2 to make a positive to negative transition.

The illustrated MOS power transistors 216–220 and the driver circuit control logic 224–228 are exemplary of one embodiment of the invention and may be replaced with any suitable alternative arrangement. For example, a bipolar transistor with a diode connected between the emitter and collector may be substituted for the MOS power transistors 216–220. Further, in some embodiments, the input to the gate drivers 224–228 may be controlled directly by microprocessor 204 or with other suitable control logic to produce the DRV+ and DRV− signals shown in FIG. 43.

Driver circuit 203 operates to couple inbound data from the electrical devices 18 to the underwater cable 2 after encoding by the encode/decode circuits 202. The inbound data drive circuits 203 may be configured to drive the inbound data signals with sufficient power to cause the couplers 16, 32 to substantially overpower any signal imparted on the inbound data distribution lines by the driver circuits 150 disposed in the repeaters 25 (See FIG. 40.) In some of the preferred embodiments, the inbound data channel of the repeaters is continuously active sending, for example, idle signals. The idle signals may originate as noise amplified by the aft most repeater. When an electrical device 18 is commanded by the control processor 21 (FIGS. 3–6) to respond, the electrical device 18 may be configured to simply "blast" a response onto the inbound data distribution lines by overpowering any existing signal being sent by a repeater circuit 25. The control processor 21 preferably time multiplexes requests to the electrical devices 18 such that the electrical devices 18 do not improperly conflict with each other.

During periods where no responses are being transmitted by the electrical devices 18, synchronization of the phase locked loops 165 (see FIG. 41) in the decode circuits 173 of repeaters 25 may be maintained by the idle signals. However, as discussed above, since the electrical devices 18 are synchronized with the repeaters, the electrical devices 18 may simply transmit a response onto the inbound data distribution line with sufficient force to mask any data/idle signals being transmitted by driver circuit 150 of a repeater coupled to an aft end of the inbound data distribution line. In this manner, a preamble may not be required to be added to the response sent on the inbound data distribution line by the electrical devices 18 to synchronize the phase locked loops in the repeaters. Accordingly, latency time is substantially reduced.

The encode/decode circuits 202 perform a similar function as the encode/decode and/or link control circuit 154 described above. The encode/decode circuits 202 may be coupled to microprocessor circuits 204 directly or through one or more data link control, circuits 206. If a data link control circuit 206 is utilized, in some of the preferred embodiments, the data link control circuit 206 is preferably a high level data link control (HDLC) integrated circuit part number MT8952, manufactured by Mitel. In these embodiments, data link control may be provided at the control processor 21 and at each of the electrical devices 18.

The microprocessor circuits 204 are preferably coupled to one or more circuits such as memory 220 and/or one or more controlled circuits 205. The microprocessor circuits 204 may include one or more microprocessors or other logic circuits such as a Motorola 68HC11 and/or Motorola 56002. Depending on the particular application, type, and location of the electrical device 18, the microprocessor circuits 204 may be configured to control one or more functions in the controlled circuits 205.

The controlled circuits 205 may be variously configured to include one or more functions. For example, the controlled circuits 205 may include one or more of the following functions: a) compass/heading, b) pitch/roll, c) acceleration, angular rates, magnetic field, optical ranging/bearing, flotation, position detection sensors such as hall effect sensors to monitor, for example, the position of the vanes, d) motors, e) depth sensors, and f) acoustic ranging devices. In some of the preferred embodiments, the compass function forms a first electrical device, the leveling related functions (motors, depth sensors, position detectors, pitch/roll detection) form a second electrical device, and the acoustic ranging functions form a third electrical device. Further, in some of the preferred embodiments, only the electrical device which includes the leveling function is equipped with batteries 212.

Figure 45:
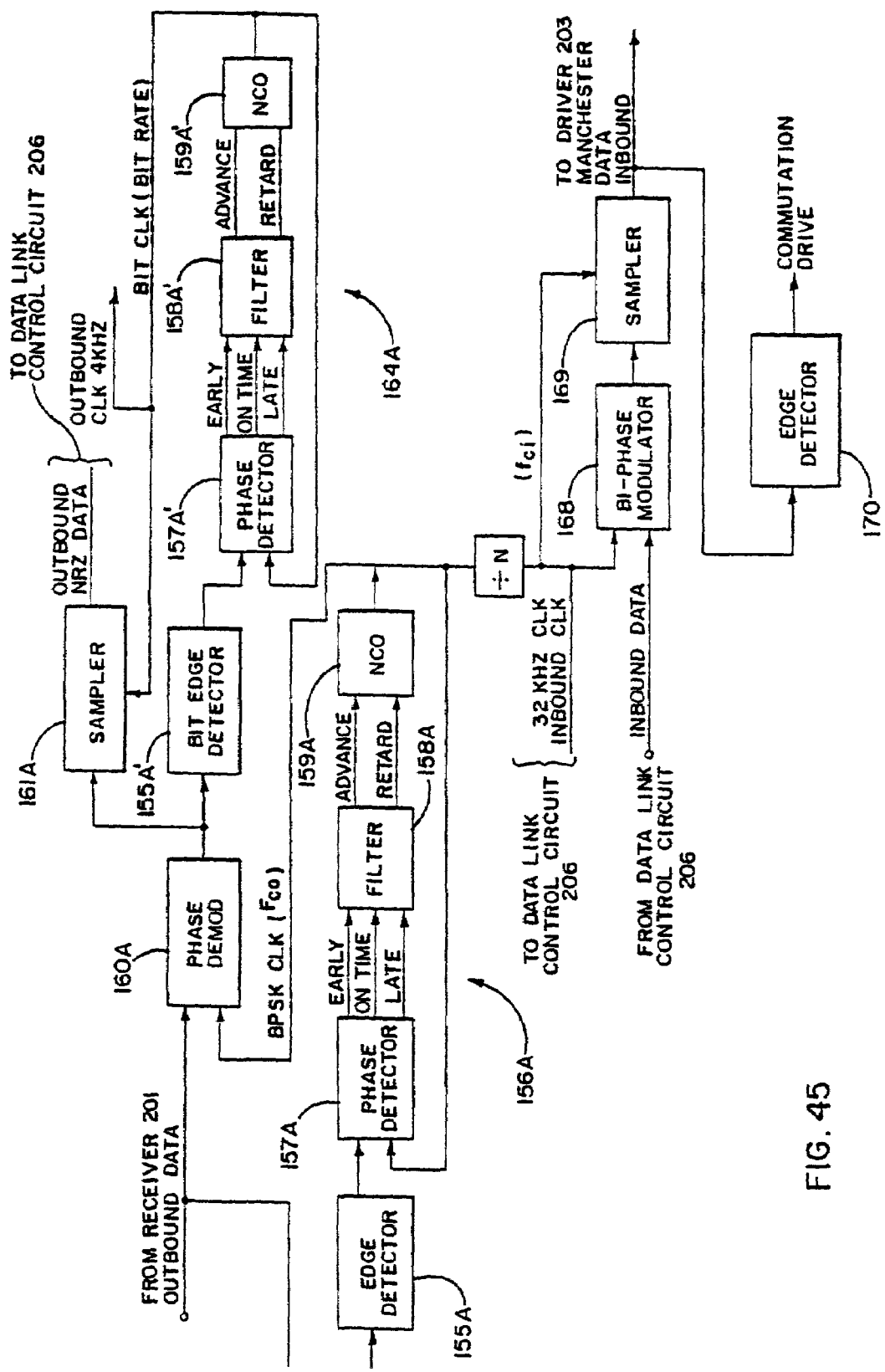
FIG. 45 is a detailed block diagram of the electrical device encode/decode circuits.

FIG. 45 shows a detailed block diagram of the encode/decode and/or clock recovery circuits 202 for one of the preferred embodiments of the electrical devices of the invention. The outbound data decode circuits of FIG. 45 are similar to the outbound data decode circuits of FIG. 41 and designated with similar numbers. For example, the operation of the circuits 155A–161A and 164A is substantially the same as the operation of the circuits 155–161 and 164 as discussed above with regard to FIG. 45. Details of the operation of these circuits are not repeated with regard to the operation of the electrical devices 18.

In the circuit illustrated in FIG. 45, the bit rate clock from the second DPLL 164A, the outbound non-return to zero (NRZ) data from sampler 161A, and the BPSK clock from the first DPLL 156A are output to the data link control circuit 203.

The inbound data portion of FIG. 45 shows a modulator 168 for modulating the inbound NRZ data from the data link control circuit 203 and a sampler 169 for sampling the inbound data. A divide by N circuit, such as a counter, divides the BPSK CLK signal down to the inbound carrier frequency, which in the preferred embodiment is 32 kHz. The divided BPSK CLK signal is input into sampler 169. Sampler 169 uses the divided BPSK CLK signal to sample inbound data. In this manner, the inbound data may be synchronized with the outbound data in each of the electrical devices 18.

Sampler 169 outputs a Manchester inbound data signal to inbound driver 203 (shown in FIGS. 42A, 42B) and to an edge detector 170. The edge detector 170 outputs a commutation drive signal (CDRV) to inbound driver 203.

Part V: Communicating with Underwater Cable Power Off

There are operating conditions of underwater cables where it may be preferable to communicate with in-streamer and wet units when main underwater cable power is OFF. To operate without power supplied from the cable, the in-streamer and wet units preferably include backup batteries. Because battery power is limited, a low power communications mode is preferred. One aspect of a low power communications mode preferably includes bypassing the repeaters along the outbound data lines, the inbound date lines, or both.

For example, referring to FIG. 40, one embodiment of the backup communications mode includes bypass switches 53 to bypass a repeater along the inbound data lines. The switches 53 are preferably magnetic latching relays, as they conserve power and have very low contact resistance. Control circuit 52 sets the switches to the bypass state when the main streamer power switches OFF. In the position indicated in FIG. 40, switches 53 are in the primary communications mode. Switches 53 preferably provide redundant contacts, as illustrated, to further increase reliability.

When control circuit 52 moves the switches 53 to a bypass position, the inbound data line becomes a continuous line throughout the cable, bypassing the repeaters. The inbound data windings of the couplers are connected across the inbound data line.

A conventional communication system may be used to communicate along the inbound data line running the entire length of the cable in a backup mode. For example, U.S. Pat. No. 4,912,684 discloses a conventional communications system which may function as the backup communications system of the present invention.

Another aspect of a backup communications mode includes circuitry within the individual devices to communicate over the continuous line. In the illustrated embodiment, the inbound data line preferably operates in half-duplex mode when the main cable power is OFF. As a consequence, the inbound data coils in the wet units and in streamer devices preferably include circuits capable of receiving data from the survey vessel. FIGS. 42A and 42B illustrate backup communications circuits 202', primary communications circuits 202, and switches S1 and S2, which switch between primary and backup communications mode in an electrical device. Microprocessor 204 preferably controls switches S1 and S2. When the main cable power is OFF, Vpwr approaches zero, and microprocessor 204 actuates switches S1, S2 to switch in backup communications circuit 202'. Backup communications circuits 202' preferably include encode and decode circuits configured to encode inbound data and decode outbound data using conventional modulation techniques, for example, frequency modulation (FM) or phase modulation (PM). In the backup mode, the devices may communicate at a lower bit rate (e.g. 4 kbps) than in the primary communications mode. In this manner, the electrical devices are able to communicate with the survey vessel when the main cable power is OFF and conserve battery power.

Part VI: Fault Tolerant Structures

A common failure mode of the underwater cable power distribution and/or data communication system 20 is the loss of one or more electrical devices 18 along the underwater cable 2. Efficient power distribution to the electrical devices 18 from the underwater cable 2 is preferably conducted using tuned power transfer circuits. However, it was found that the loss of one or more electrical devices 18 from along the underwater cable 2 often decreased the bandwidth of the tuned power transfer circuits making outbound data communication difficult in combined data/power embodiments.

Figure 46:
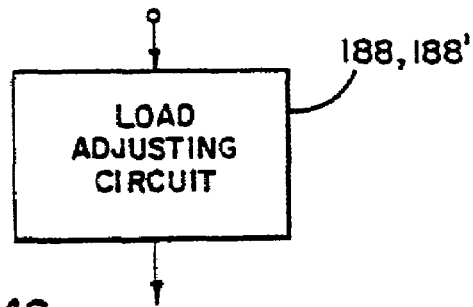
FIG. 46 is a block diagram of a load adjusting circuit for use in the underwater cable.

In accordance with the present invention, the reliability problems associated with this failure mode may be reduced by segmenting the data/power distribution lines as discussed above and/or by incorporating a load adjusting circuit 188 (see FIG. 46) into the underwater cable power distribution and/or data communication system 20. The load adjusting circuit 188 may be disposed at any location along one or more data/power distribution lines as, for example, in one or more in-streamer electrical devices 18, in the repeater driver circuits, or in the repeater receiver circuits, in the couplers, and/or in the terminators 34, 44.

A second common failure mode of the underwater cable power distribution and/or communication system is the intrusion of seawater which applies a shorting load to the power distribution and/or data communication lines. The shorting load may decrease the bandwidth of the tuned circuit in the driver 50, making outbound data communication difficult in combined data/power embodiments.

In accordance with the present invention, the reliability problems associated with this failure mode may be reduced by incorporating a load adjusting circuit 188' (see FIG. 46) into the underwater power distribution and/or data communication system. The load adjusting circuit 188' is preferably disposed in the driver circuit as shown in FIGS. 9 and 40.

In one of the preferred embodiments, the load compensating circuit 188, 188' includes two oppositely connected Zener diodes coupled across the power distribution line at or near the receiver 152. Of course, other locations are also suitable. By oppositely connected, it is meant that the Zener diodes are connected in series across the data/power distribution lines in a cathode to cathode or in an anode to anode configuration. For example, in FIG. 40, the load adjusting circuit 188, 188' is shown as two cathode connected Zener diodes connected across the outbound data and/or power distribution lines.

Other configurations of the load adjusting circuit are also possible. For example, the circuit may include one or more voltage sensors which monitor the voltage on the power distribution line and which switch in various amounts of resistance in response to a change in the voltage level. The load adjusting circuits operate to control the change in bandwidth of the power transfer circuits due to, for example, loss of one or more inductively coupled loads along the underwater cable. Also, the system is simpler to deploy, not requiring a load from a wet unit 30 at unused locations.

In preferred embodiments, it may be desirable to size the load adjustment circuit (e.g., the Zener diodes) such that the voltage rise associated with a misalignment of the coils in the coupler within the tolerance range (e.g., the pole face length/width) does not trigger the load adjustment circuit to activate. Activation of some embodiments of the load adjustment circuit may cause a loss of power transfer efficiency along the data/power distribution lines. Accordingly, the load adjustment circuit 188, 188' may be designed to engage just above the voltage rise that may be attributed to one or more couplers being misaligned within the coupler tolerance.

When a fault along the data/power distribution line occurs, load may be removed. When load is removed, the voltage along the power distribution line typically rises because the Q of the distributed filter rises. The load adjusting circuit is preferably configured to add dissipation to the circuit to keep the Q of the circuit relatively constant so that the bandwidth of the distributed filter does not change.

In preferred embodiments, the load adjusting circuit 188, 188' may enable the Q to increase about 10% or more before the load adjustment takes place and reduces the peaks of the waveform. This is particularly important where power and data are distributed on the same line. Where data and power are distributed on the same line, it may be desirable to maintain the load resistance near design nominal for the distributed filter to operate with the proper data bandwidth. If the voltage on the power distribution line increases above a nominal design value, the bandwidth of the filter may contract and the data waveform may become distorted. Accordingly, it may be difficult to demodulate the data at the next repeater, and hence the communication channel may be interrupted.

A load control circuit 188, 188', which includes Zener diodes, may be particularly advantageous because when all electrical devices 18 are operational, the diodes do not conduct and therefore do not consume precious power resources. Further, the Zener diodes are simple, easy to implement, and do not add significant weight to the underwater cable 2.

Part VII: Hierarchical Load Shedding

The main power line 23 in the underwater cable 2 powers a plurality of spaced electrical devices 18. Each of these electrical devices 18 may be designed to draw a predetermined current as determined by an overall power budget for the underwater cable 2. However, when a fault occurs along any one of the plurality of data/power distribution lines or in the electrical devices 18 coupled thereto, the current drawn from the data/power distribution lines may exceed the maximum allocated predetermined load. In extreme cases, the voltage on the main power line becomes degraded and the entire underwater cable becomes inoperative. In less extreme cases, and especially where power and data are coupled to a single data/power distribution line, data transfer through the plurality of repeaters may become inoperative over the faulty cable segment.

Accordingly, in many embodiments, it may be desirable to configure the second power circuit 52 of each power conversion circuit 50 (FIG. 8) as a current limited power source. In this way, power supplied to a power distribution line on a particular cable segment never exceeds the maximum allocated current. A fault along the cable segment simply causes the voltage along the cable segment to drop while the current remains substantially constant.

This drop in voltage may have an adverse effect on the electrical devices 18. Power transferred to the electrical device 18 may be reduced to the point where all of the electrical devices 18 cannot operate. However, by employing a hierarchical load shedding technique, it may be possible to maintain some electrical devices 18 and/or electrical device functions while disconnecting or shedding others. If some electrical devices and/or electrical device functions are to be shed, the loads associated with these functions are preferably shed in reverse order of the particular function's criticality to the underwater cable 2 and power distribution and/or data communication system 20.

Hierarchical load shedding may be controlled by any suitable circuit throughout the system including the control processor 21, the repeaters 25, and/or the electrical devices 18. Further, the hierarchical load shedding within each of these circuits may be variously configured. For example, in some embodiments, it may be desirable to shed one or more loads depending on the voltage level of one or more data/power distribution lines within the underwater cable 2. In other embodiments, it may be desirable to shed one or more loads based on other factors such as the loss of communications to the electrical devices 18.

Each electrical device 18 may be considered a load individually or may itself contain one or more loads. For example, each electrical device may include one or more functions such as indicated by the controlled circuits of FIGS. 42A, 42B. A load may be interpreted as being whatever electrical load is associated with one, a plurality, or all of the functions of an associated electrical device 18.

Further, the control for the load shedding may occur autonomously in each electrical device based on the presence, absence, and/or level of a signal (e.g., a power signal and/or data communication signal) in, for example, the underwater cable 2 and/or electrical devices 18. Additionally, the control and/or fault detection for initiating the load shedding may be co-located or distributed at a plurality of locations throughout the underwater cable.

For example, fault detection circuitry (e.g., a voltage detector and/or A/D converter) may be located in the individual electrical devices 18 and/or in the repeaters while control for the load shedding may be in the electrical devices, in the repeaters, and/or the control processor 21. Although control of the hierarchical load shedding may be controlled by a single processor (e.g., the control processor 21), in some of the preferred embodiments, the control for the hierarchical load shedding is distributed to the plurality of electrical devices 18 (e.g., programmed into microprocessors 204) which each act autonomously. This distributed control for the load shedding function has been found to provide enhanced reliability.

A first exemplary embodiment of a hierarchical load shedding function implemented in the underwater cable power distribution and/or data communication system 20 is illustrated in flow chart form in FIG. 47. Referring to FIG. 47, step 250 determines if the electrical device 18 is already in the low power mode. If power and/or data communications to the electrical device are at normal levels, step 251 is entered. In steps 251 and 252, the power level and/or data communications are continuously monitored to determine if a fault condition exists. When a fault condition is detected, step 253 is executed. In step 253, a single load (e.g., one of loads a–e) is removed by, for example, powering down the circuitry that controls and/or performs the functions associated with that load. This may be an entire electrical device 18 or portions of circuitry located within an electrical device 18. The particular load selected is preferably chosen in a hierarchical order, with some of the preferred orders being, for example, a) acoustic ranging, b) compass, c) depth setting to set a new depth, d) depth reporting to report the current depth, and e) depth control to maintain the current depth. In this embodiment, the least important/critical functions are removed first.

After a load (e.g., device or function within a device) has been removed, in embodiments where the load shedding control is distributed, the electrical device waits for other electrical devices 18 to also remove their loads (step 254). The electrical device may wait for a predetermined period of time and/or a variable period of time based on stability of a received voltage for a given period of time. Thereafter, the electrical device 18 then checks to determine if the fault condition is still active. If the fault condition is no longer present, the electrical device 18 sets the low power mode active (step 257) and returns to start. However, if the fault is still detected (step 256), the electrical device continues again at step 253 until all loads associated with a particular electrical device have been powered down.

If all loads have been powered down and the fault is still present (step 256), a depth control electrical device or bird preferably will maintain a substantially constant depth (possibly using only battery power) (step 259), set the low power mode active (step 257), and return to the start step. Other electrical devices 18 without a depth control function preferably will set the low power mode active (step 257) and return directly to the start step.

When the low power mode is active, in steps 260–261 the electrical devices 18 will preferably continue to monitor the underwater cable 2 to determine if the fault condition is still active. Where a voltage level is utilized to determine a fault condition, it is desirable to set the voltage level of clearing a fault to be higher than the voltage level for detecting a fault. These different voltage levels provide a hysteresis so that the system does not continuously oscillate between a fault present and a fault not present condition.

If the fault condition has been corrected, in step 262, loads are added in a reverse hierarchical order (one load per iteration) until the fault condition is cleared. By reverse hierarchical order it is meant that loads are preferably restored in the reverse order in which they were removed. In many cases, this order will be with the most important loads restored first (e.g., in order of loads e–a).

After adding a load, in a distributed control configuration, the controller waits for the other controllers to add loads in step 263. In step 264, a check is made to determine if all loads have been added. If all loads have been added, the low power mode is set inactive (step 265) and control is returned to the start step. If more loads remain inactive, step 260 is again initiated and the process continues as discussed above.

In step 256, the fault condition may simply be a determination to verify that communications with the control processor 21 are enabled. In other embodiments, the fault condition may be determined if the voltage received from the underwater cable 2 is below a fixed value (preferably programmable). In still other embodiments, the fault condition detection in step 256 may be based on a plurality of predetermined voltage threshold values (preferably programmable) with a different predetermined voltage level associated with each load identified in step 253. For example, on the first iteration, the electrical loads associated with the acoustic ranging function may be removed if the voltage received from the underwater cable is below a first predetermined voltage level, e.g., 9.5 volts. On the second iteration, the electrical loads associated with the compass function may be removed if the voltage received from the underwater cable is below a second predetermined voltage level, e.g., 9 volts. On the third iteration, the electrical loads associated with the depth setting and recording functions may be removed if the voltage received from the underwater cable is below a third predetermined voltage level, e.g., 8.5 volts. Step 258 then determines if there are any loads left to shed for a particular voltage level.

In alternate embodiments, the fault condition may be determined if the voltage received from the underwater cable 2 is below a predetermined value (preferably programmable) and rather than removing the loads individually as discussed above, all loads may be removed simultaneously in step 253. In this embodiment, if the voltage received from the underwater cable is below a predetermined voltage value (e.g., 9.5V, 9.0V, or 8.5V), then all loads are removed in step 253 simultaneously. The electrical devices may then return to the start mode and idle waiting for commands to be received from the repeaters 25 (when load shedding intelligence, e.g., a CPU is located in the repeaters) and/or control processor 21. The commands can then be utilized to selectively enable one or more loads on a faulty cable segment depending on the severity of the fault and the particular function required at that individual instance. In this manner, the control processor and/or repeater may manage a degraded mode operation where individual loads are time multiplexed to accommodate the faulty condition.

In still other alternate embodiments, once all loads have been removed in the single step 253, the program then proceeds to set the low power mode active and enter the low power mode of the program. In step 261, each load may then be replaced in a hierarchical order with the most critical loads being replaced first. For example, in exemplary embodiments, on the first iteration, the electrical loads associated with the depth setting, recording, and control functions may be activated if the voltage received from the underwater cable is above a first predetermined and/or programmable voltage level, e.g., 8.5 volts. On the second iteration, the electrical loads associated with the compass function may be activated if the voltage received from the underwater cable 2 is above a second predetermined and/or programmable voltage level, e.g., 9 volts. On the third iteration, the electrical loads associated with the acoustic ranging function may be activated if the voltage received from the underwater cable is above a third predetermined and/or programmable voltage level, e.g., 9.5 volts.

Other alternate modes may also be implemented to enable hierarchical load shedding. Control for these modes may be entirely within the electrical devices, repeaters, and/or control processor. Alternatively, control for the hierarchical load shedding may be distributed between one or more of the repeaters, electrical devices and/or control processor. For example, one of the preferred embodiments of hierarchical load shedding is illustrated by the state diagrams in FIGS. 48 and 49. FIG. 48 illustrates the hierarchical load shedding associated with devices, such as a dedicated depth-control device, or bird, a dedicated compass/heading device, or a dedicated acoustic device, each of which may have multiple functions to be shed hierarchically.

Referring to FIG. 48, from reset state 270, the electrical device may enter an idle state 271. In the idle state 271, communications with the device are enabled. If the voltage detected by the electrical device using, for example, the A/D converter 214 in FIG. 42A, 42B is less than $V_{LO}$, for example 7 volts, and the battery is dead, the electrical device enters shutdown state 272 and performs a clean shutdown of ongoing processes before powering off to a dead state. From the dead state, if the voltage Vpwr supplied by the main power line and detected by the electrical device exceeds $V_{HI}$, the device again enters the idle state 271. $V_{HI}$ is preferably about 9.5 volts for an acoustic device, about 9.0 volts for a compass/heading device, and 8.5 volts for a depth control device, or bird. In the idle state, communications between the electrical device and the control processor 21 are preferably enabled.

From the idle state 271, if the device receives a command signal (CMD), the device may enter a mains-powered active state 273 if Vpwr is greater than or equal to $V_{LO}$. The device may enter a battery-powered active state 274 if a command is received and Vpwr is less than $V_{LO}$. A command signal may originate from control processor 21 or from the repeaters. If the device is in either the mains powered active state 273 or the battery-powered active state 274, and the device receives a CMD signal, the device may reenter the idle state 271.

In mains-powered active state 273, if the electrical device detects that Vpwr is less than $V_{LO}$, the device may enter battery-powered active state 274. The hysteresis between $V_{LO}$ and $V_{HI}$ prevents the device from oscillating between battery-powered active and mains-powered active states.

In battery-powered active state 274, the electrical device may continuously monitor battery voltage level. If the battery voltage falls below a predetermined level, for example, about 7 volts, the device enters shutdown mode 272 before entering the dead state. As indicated above, the control processor 21 or the repeaters may instruct the device to enter the idle state 271 by sending a command signal (CMD).

If a device performs multiple functions, a device may shed one or more of those functions. For example, as shown in FIG. 47 loads can be shed hierarchically.

The hierarchical order of the load shedding may be controlled by the differing voltage levels set for each electrical device for entering an off/idle state and/or for returning to an idle/active state. For example, when the power supplied to the electrical devices 18 is below, for example, 9.5 volts, the acoustic function and/or device may be the only load to enter or remain in the off and/or idle state (e.g., the acoustic device may reactivate at 9.5 volts). In alternate embodiments, the acoustic device may be the first device to enter an off or idle state at, for example, 9.5 volts. If the voltage supplied to the electrical devices 18 is below, for example, 9 volts, the acoustic device and the compass may be in an off or idle state. Similarly, if the voltage supplied to the electrical devices 18 is below, for example, 8.5 volts, the bird may enter the battery back-up state and the acoustic device and the compass may be in an idle or inactive state.

Referring to one of the preferred embodiments illustrated in FIGS. 47–49, when the voltage is below 7 volts all of the electrical devices enter an idle state where only communications with the dry-end electronics 5 is maintained with other loads in the electrical devices 18 turned off. If the voltage is still below 7 volts, all of the electrical devices enter the Off state. From the Off state, in the illustrated embodiments, the leveling devices or birds re-enter the idle state when the voltage rises above 8.5 volts, the compass devices re-enter the idle state when the voltage rises above 9 volts, and the acoustic devices re-enter the idle state when the voltage rises above 9.5 volts. In this manner, the electrical devices in the illustrated embodiments may reactivate themselves autonomously responsive to programmable voltage levels keyed to the criticality of each electrical device function.

One feature of the embodiments of the electrical devices 18 shown in FIG. 49 is that the electrical devices perform the hierarchical load shedding autonomously. For example, each of the load shedding programs and state diagrams indicated by FIGS. 47–49 may be performed by microprocessor 204 without communication with other wet units and/or the control processor 21.

The term hierarchical load shedding is intended to broadly cover configurations where the load on the power line in the underwater cable is reduced in a specified order in response to one or more fault conditions as discussed herein.

Control of the communications modes may take place in the individual electrical devices. For example, in FIG. 49, if there is a power failure in the underwater cable or a shutdown of external power to the devices, Vpwr in FIGS. 42A, 42B goes to zero. The devices enter state 280 and enable backup communications mode, as discussed above. When power is restored, the devices enter primary communications mode, indicated by state 281.

In alternate embodiments, the repeaters may include a CPU, voltage sensors, and other control circuits configured to enable the control processor 21 and/or repeater to switch additional current to the affected data/power distribution lines in the event of a fault. For example, each repeater may include a redundant driver circuit which can optionally be switched into operation by the control processor 21 and/or by the individual repeaters in response to a fault on a particular distribution line. In this manner, instead of selectively reducing the load along a particular cable segment, power may be selectively increased to compensate for the fault.

A remarkable result of combining various aspects of embodiments of the present invention is that power may be reliably transferred to the wet units 30 with an overall power transfer efficiency of about 60% or more. This remarkable result allows wet units to be powered entirely from the underwater cable and has eliminated the necessity of supplying operational power using batteries in practical underwater streamer cable applications. Further, substantial improvements have been made in the reliability of the underwater cable power distribution and communication system 20. Additionally, the latency of data transferred from the electrical devices 18 even while employing repeaters has been minimized.

While the present invention has been shown in conjunction with a towed seismic streamer cable, it will be understood that it could be used in other instrumented underwater cables, such as any towed hydrophone cable, whether for geophysical, scientific, or military use, or with untowed, bottom-referenced cables. In any of these applications, the underwater cable may be oriented horizontally, vertically, or at any angle between horizontal and vertical.

While several exemplary power distribution and communication systems and elements embodying the present inventions have been shown, it will be understood, of course, that the inventions are not limited to these embodiments. Modifications may be made by those skilled in the art, particularly in light of the foregoing teachings. For example, in some embodiments, it may be desirable to distribute power to the electrical devices 18 on both the inbound and outbound data distribution lines. In this manner, the total amount of power distributed on any one line may be reduced. Further, elements from the various embodiments may be combined with and/or substituted for corresponding elements of another embodiment. Additionally, alternate embodiments of the inventions may include more or less components than those in the illustrated embodiments. For example, each of the embodiments shown may utilize one or more of the features, circuits, and/or functions of the other embodiments. It is, therefore, intended that the appended claims cover any such modifications in any combination which incorporate the features of this invention or encompass the spirit and scope of the invention.

It should be understood that the invention encompasses all possible combinations and subcombinations of the elements herein described. For example, each of the embodiments shown or described may utilize one or more of the features, components, and/or functions of the other embodiments. Further, the specification is divided into Parts I–VII to facilitate understanding of the invention. However, many aspects of the invention span more than one of the Parts. For example, the repeaters in an underwater cable may include structures which distribute power, synchronize data, and respond to faults. As a result, the repeaters appear in Part I: Power Distribution/Communication Structure, Part IV: Synchronization of Inbound/Outbound data, and Part VI: Fault Tolerant Structures. Other aspects of the invention span one or more of the Parts. The various aspects of the invention may be interrelated and are not limited to one or more of the Parts of the specification.

What is claimed is:

1. An underwater power distribution system for powering a plurality of devices comprising:
    an underwater cable, the devices being disposed along the underwater cable;
    a main power line extending through the underwater cable;
    a plurality of power distribution lines;
    a plurality of power distributors, each being electrically coupled between the main power line and one of the power distribution lines to transfer power from the main power line to the power distribution line; and
    a plurality of power couplers disposed at selected locations along the underwater cable, each power distribution line being coupled to one or more power couplers and each power coupler being disposed proximate one of the devices for coupling power to the proximate device.

2. An underwater power distribution system for powering a plurality of devices comprising:
    an underwater cable including a plurality of cable segments, at least one of the devices being disposed along each cable segment, and a plurality of streamer electronics modules alternately arranged with the cable segments and spaced from the devices;
    a main power line extending through the underwater cable;
    a plurality of power distribution lines, at least one power distribution line extending through each cable segment and each streamer electronics module including a circuit for coupling electric power from the main power line to an adjacent power distribution line; and
    a plurality of power couplers disposed at selected locations along the underwater cable, each power distribution line being coupled to one or more power couplers and each power coupler being disposed proximate one of the devices for coupling power to the proximate device.

3. A method for distributing power underwater comprising:
    transmitting power at a first frequency on a main power line of an underwater cable;
    converting the power on the main power line to a second frequency, higher than the first frequency; and
    distributing the power at the second frequency on a plurality of power distribution lines within the underwater cable to a plurality of devices selectively disposed along the underwater cable.

4. The method of claim 3 wherein transmitting power at the first frequency includes transmitting power at a DC frequency of zero.

5. The method of claim 3 wherein transmitting power at the first frequency includes transmitting power at a frequency in the range from about 1 kHz to about 4 kHz.

6. The method of claim 5 wherein converting the power to the second frequency includes converting the power to a frequency in the range from about 25 kHz to about 400 kHz.

7. The method of claim 3 wherein converting the power to the second frequency includes converting the power to a frequency in the range from about 25 kHz to about 400 kHz.

8. The method of claim 3 wherein converting power on the main power line comprises converting the main power line signal to a DC signal and converting the DC signal to the higher frequency power distribution signal.

9. The method of claim 3 further comprising inductively coupling the higher frequency power distribution signal from the power distribution line across a sheath of the cable to the device.

10. The method of claim 3 further comprising transmitting data along the power distribution lines.

11. The method of claim 10 wherein transmitting data along the power distribution lines includes encoding data on the power distribution signal.

12. The method of claim 11 wherein encoding data on the power distribution signal includes encoding outbound data on the power distribution signal.

13. An underwater power distribution system for powering a plurality of devices comprising:
    an underwater cable, the devices being disposed along the underwater cable;
    a main power line extending through the underwater cable and arranged to transmit a main power signal at a first frequency; and
    a plurality of conversion circuits disposed at spaced locations along the underwater cable and respectively coupled between the main power line and the plurality of devices, each conversion circuit being positioned within the underwater cable and arranged to convert the main power signal into a power distribution signal at a second frequency higher than the first frequency.

14. The underwater cable of claim 13 wherein the each conversion circuit is arranged to convert the main power signal into a DC signal and then to convert the DC signal into the power distribution signal.

15. The system of claim 13 wherein each power conversion circuit is arranged to convert a DC main power signal to an AC power distribution signal having a frequency in the range from about 25 kHz to about 400 kHz.

16. The system of claim 13 wherein each power conversion circuit is arranged to convert an AC main power signal having a frequency in the range from about 1 kHz to about 4 kHz to an AC power distribution signal having a frequency in the range from about 25 kHz to about 400 kHz.

17. The system of claim 13 further comprising a plurality of power distribution lines, each power distribution line being coupled to a power conversion circuit and arranged to transmit the power distribution signal.

18. The system of claim 17 wherein first and second power distribution lines extend in opposite directions from a power conversion circuit along the underwater cable.

19. The system of claim 17 wherein the underwater cable includes an outer sheath to which devices are attached, the power distribution system further comprising one or more couplers electrically connected to a power distribution line to inductively couple the power distribution signal through the sheath to the device.

20. The system of claim 13 further comprising an encoding circuit coupled to a power conversion circuit to encode data on the power distribution signal.

21. The system of claim 20 wherein the encoding circuit is arranged to encode outbound data on the power distribution signal.

22. The system of claim 20 further comprising a power distribution line coupled to a conversion circuit and a driver coupled to the power distribution line to drive a power distribution signal having data and power along the power distribution line.

23. The system of claim 13 further comprising a data channel extending along the cable and a plurality of hydrophones disposed along the cable, wherein the hydrophones transmit hydrophone data over the data channel.

24. An underwater system for transferring power comprising:
a plurality of wet units, each having a first inductor for receiving power;
an underwater cable having the plurality of wet units selectively spaced therealong and including a plurality of second inductors respectively disposed adjacent to the first inductors in the wet units;
a plurality of hydrophones disposed along the underwater cable and having one or more first operating frequency bands; and
a plurality of power conversion circuits positioned within the underwater cable and respectively coupled to one or more of the second inductors to output a signal having a second operating frequency band to the wet units, wherein the first operating frequency bands and the second operating frequency band do not overlap.

25. The underwater system of claim 24 including a plurality of power distribution lines extending along the underwater cable, each power distribution line being coupled between one of the power conversion circuits and associated one or more second inductors and being arranged to transmit power to the second inductors, wherein the power distribution lines include lumped and distributed parameters and wherein the lumped and distributed parameters of each power distribution line form a distributed bandpass filter centered about the second operating frequency band.

26. A method of transferring power underwater comprising:
having a plurality of hydrophones in an underwater cable which operate at one or more first frequency bands; and
transferring power inductively from an underwater cable to a plurality of wet units using a second frequency band which does not overlap the one or more first frequency bands.

27. An underwater power distribution system for a plurality of devices comprising:
an underwater cable having an outer sheath and being filled with a lossy dielectric material having a dissipation factor of about 0.01 or greater, the devices being disposed along the underwater cable;
a main power line extending through the underwater cable; and
a plurality of insulated twisted pair transmission wires extending through the underwater cable and coupled between the main power line and the devices, each twisted pair transmission wire having an outer sheath and a dissipation factor of less than about 0.01, when surrounded by the lossy dielectric material.

28. An underwater coupling system comprising:
an underwater cable;
at least one coupler disposed in the underwater cable; and
a plurality of inductive coils selectively disposed outside the underwater cable at circumferentially spaced locations about the coupler.

29. An underwater coupling system comprising:
an underwater cable;
at least one coupler disposed in the underwater cable; and
a plurality of inductive coils circumferentially spaced inside the coupler.

30. An underwater coupling system comprising:
an underwater cable; and
a plurality of inductive couplers disposed at selected locations along the underwater cable, each coupler including one or more coils having a core having a substantially triangular-shaped cross section and a winding wound around the substantially triangular-shaped core.

31. An underwater coupling system comprising:
an underwater cable;
first and second lines extending through the underwater cable; and
a plurality of couplers disposed at selected locations along the underwater cable, each coupler including a first coil connected to the first line and second and third coils connected to the second line, wherein the first and second coils are spaced from each other and the first and third coil are in close proximity for controlling cross-talk between the first and second coils.

32. An underwater coupling system comprising:
an underwater cable;
first and second lines, extending through the underwater cable; and
a plurality of couplers disposed at selected locations along the underwater cable, each coupler including an integral core having first and second portions and first and second coils respectively wound around the first and second portions of the integral core, the first and second lines being respectively connected to the first and second coils.

33. An underwater communication system for communicating with a plurality of devices comprising:
an underwater cable, the devices being disposed along the cable;

a plurality of data distribution lines extending through portions of the underwater cable, each data distribution line being coupled to one or more devices and being tuned to resonate at a first frequency with a predetermined bandwidth;

a plurality of repeater circuits coupled between adjacent data distribution lines to form a data communication channel; and a plurality of load adjusting circuits respectively associated with the data distribution lines to maintain each data distribution line tuned to about the first frequency with the predetermined bandwidth in response to a failure mode.

34. The underwater communication system of claim 33 wherein at least one of the load adjusting circuits includes first and second Zener diodes oppositely connected in series.

35. An underwater power distribution system for powering a plurality of devices, each having one or more loads, comprising:

an underwater cable having the plurality of devices selectively spaced therealong;

a first line extending through the underwater cable and being coupled to the plurality of devices;

fault detection circuitry coupled to the first line to detect when a fault is present; and disabling circuitry coupled to the fault detection circuitry to disable one or more loads in a hierarchical order in response to a fault.

36. An underwater power distribution system for powering a plurality of devices, each having one or more loads, comprising:

an underwater cable having the plurality of devices selectively spaced therealong;

a power line extending through the underwater cable and being coupled to the plurality of devices;

a current limited driver circuit coupled to the power line to output a power signal having not more than a predetermined current level on the power line;

fault detection circuitry coupled to the power line and including a voltage detection circuit for detecting the voltage on the power line, whereby a fault may be indicated by a change in voltage on the power line.

37. A method of distributing power along an underwater transmission system comprising:

transferring electrical signals along an underwater cable having a plurality of devices spaced therealong, each device having one or more loads;

detecting a fault in the underwater transmission system;

removing loads along the underwater cable in a hierarchical order in response to the fault; and powering the remaining loads.

38. A method for power distribution and communication along an underwater cable comprising:

transferring power and data along a line in an underwater cable having a plurality of spaced devices coupled thereto, each device including one or more electrical loads;

detecting a fault; and selectively removing one or more of the electrical loads from the underwater cable according to a predetermined hierarchy in response to the fault.

39. An underwater electrical device for an underwater cable comprising:

a housing arranged to be attached along the underwater cable;

a load circuit disposed in the housing;

an inductor circuit coupled to the load circuit to transfer a power signal from the underwater cable to the load circuit, the load circuit loading the power signal; and a control circuit coupled to at least one of the inductor circuit and the load circuit to reduce the loading in response to a power level of the power signal falling below a predetermined value.

40. An underwater electrical device for an underwater cable which includes a line having a voltage, the underwater electrical device comprising:

a housing arranged to be attached along the underwater cable;

at least one electrical load disposed in the housing; and a control circuit disposed in the housing and including circuitry for monitoring the voltage on the line, the control circuit being coupled to the electrical load to reduce the load in response to the voltage falling below a predetermined value.

41. An underwater electrical device for an underwater cable comprising:

a controller circuit arranged to be coupled to and receive power from the underwater cable, the controller circuit including fault detection circuitry to detect a fault and load shedding circuitry to reduce the amount of power received from the underwater cable in a hierarchical order responsive to the fault.

42. An underwater communication system for communicating with a plurality of devices comprising:

an underwater cable having the devices selectively spaced therealong an inbound data distribution line and an outbound data distribution line extending through the underwater cable and coupled to one or more of the devices;

at least one repeater circuit disposed in the underwater cable wherein the repeater circuit includes synchronization circuitry coupled to the inbound and outbound data distribution lines to derive clock data from the outbound data and to transmit the inbound data in accordance with the derived clock data, whereby a timing relationship exists between inbound and outbound data.

43. A method of communicating data underwater comprising:

transmitting outbound data and inbound data through a repeater circuit in an underwater cable to or from devices selectively spaced along the underwater cable;

decoding the outbound data in the repeater circuit to recover clock data; and transmitting inbound data from the repeater circuit in synchronism with the clock data.

44. An underwater electrical device for an underwater cable comprising:

a housing arranged to be attached along the underwater cable;

an input circuit disposed in the housing and arranged to input data from the underwater cable, the input circuit including synchronization circuitry to derive a timing signal from the data; and an output circuit coupled to the input circuit and arranged to output data to the underwater cable in synchronism with the timing signal.

45. A method of communicating underwater comprising:

receiving outbound data for devices selectively spaced along an underwater cable;

decoding the outbound data to recover a data clock; and transmitting inbound data from the devices along the underwater cable in synchronism with the data clock.

46. An underwater electrical device for an underwater cable comprising:
   an inductor; and
   a drive circuit coupled to the inductor to control a current flowing through the inductor responsive to an inbound data bit having a bit time, the drive circuit including a capacitor coupled to the inductor to form a resonant circuit having a resonant period of about between 1/16 of the bit time and the bit time.

47. An underwater electrical device for an underwater cable comprising:
   an inductor; and
   a drive circuit including a plurality of driving transistors, a transformer coupled in parallel with the inductor, and a capacitor coupled in parallel with the transformer, wherein the primary and secondary of the transformer are coupled between the electrical device and the underwater cable.

48. An underwater data communications system for communicating with a plurality of electrical devices comprising:
   a primary data communications circuit;
   a backup data communications circuit;
   circuitry coupled to the primary data communications circuit and the backup data communications circuit to switch between the primary data communications circuit and the secondary data communications circuit in response to a loss of power to the electrical devices.

49. An underwater data communication system for communicating with a plurality of electrical devices comprising:
   an underwater cable, the devices being disposed along the underwater cable;
   a first data communications circuit disposed along the underwater cable;
   a second data communications circuit disposed along the underwater cable wherein communications over the second data communications circuit is at a lower bit rate than over the first data communications circuit; and
   circuitry coupled to the first data communications circuit and the second data communications circuit to switch between the first data communications circuit and the second data communications circuit.

50. An underwater data communication system as in claim 49 wherein the circuitry coupled to the first data communications circuit and the second data communications circuit includes a switch.

51. An underwater data communication system as in claim 49 wherein the circuitry coupled to the first data communications circuit and the second data communications circuit includes a microprocessor to switch between the first data communications circuit and the second data communications circuit.

52. An underwater data communication system as in claim 49 further comprising a plurality of repeaters disposed along the cable, wherein the circuitry coupled to the first and second data communications circuits includes a plurality of switches disposed along the cable each associated with a corresponding repeater, wherein the first data communications circuit includes the first data line segments connected between consecutive repeaters, wherein the second data communications circuit includes second data line segments connected between consecutive switches and coupled to the devices and wherein the switches connect the second data line segments to the repeaters in a first mode of operation and cause the second data line segments to bypass the repeaters in a second mode of operation.

53. An underwater communication system as in claim 52 wherein the second mode of operation is characterized by a loss of power.

54. An underwater communication system as in claim 52 further comprising a plurality of hydrophones disposed along the cable and link control circuits adapted to digitize signals from the hydrophones for transmission by the repeaters along the first data communications circuit.

55. An underwater communication system as in claim 52 wherein the first data communications circuit includes a fiber optic cable.

56. An underwater communication system as in claim 49 further comprising a plurality of repeaters disposed along the cable, the first data communications circuit including a first data line serially linking the repeaters along the cable, the second data communications circuit including a second data line extending along the cable and including couplers coupling the second data line to the devices, and the circuitry coupled to the first and second data communications circuits including a control circuit that switches the underwater communication system between a first communications mode in which the second data line links the repeaters serially and a second communications mode in which the second data line bypasses the repeaters along the cable.

57. An underwater communication system as in claims 56 wherein the circuitry coupled to the first and second data communications circuits further includes a plurality of switches connected between the second data line and the repeaters and wherein the control circuit moves the switches from a first position connecting the second data line to the repeaters in the first communications mode to a second position bypassing the repeaters in the second communications mode.

58. An underwater communication system as in claim 56 wherein the first data line further comprises couplers coupling the first data line to the devices.

59. An underwater communication system as in claim 56 wherein the first data line includes a fiber optic cable.

60. An underwater communication system as in claim 56 wherein the first communications mode is the primary communications mode and the second communications mode is a backup communications mode.

61. An underwater communication system as in claim 56 wherein the control circuit selects the second communications mode upon a loss of power to the repeater.

62. An underwater communication system as in claim 56 wherein communications in the second communications mode is at a lower bit rate than in the first communications mode.

* * * * *